United States Patent
Usui et al.

(10) Patent No.: US 6,560,016 B2
(45) Date of Patent: May 6, 2003

(54) ZOOM LENS AND PHOTOGRAPHING APPARATUS USING THE SAME

(75) Inventors: Fumiaki Usui, Tochigi (JP); Ryuji Nurishi, Tochigi (JP); Kiyoshi Fukami, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,357

(22) Filed: Mar. 29, 2001

(65) Prior Publication Data

US 2002/0018297 A1 Feb. 14, 2002

(30) Foreign Application Priority Data

Mar. 31, 2000 (JP) ........................................ 2000-099295
Mar. 23, 2001 (JP) ........................................ 2001-084545

(51) Int. Cl.[7] .......................... G02B 27/64; G02B 15/02
(52) U.S. Cl. ........................ 359/557; 359/554; 359/676; 359/688
(58) Field of Search ................................. 359/554–557, 359/676–677, 686, 688; 396/52–55; 348/208

(56) References Cited

U.S. PATENT DOCUMENTS

| 4,927,250 A | | 5/1990 | Suda ........................... 359/557 |
| 5,039,211 A | | 8/1991 | Maruyama ................... 359/557 |
| 5,270,857 A | | 12/1993 | Oizumi et al. ............... 359/554 |
| 5,668,666 A | * | 9/1997 | Suzuki ........................ 359/674 |
| 5,721,641 A | | 2/1998 | Aoki ........................... 359/557 |
| 5,760,957 A | | 6/1998 | Suzuki ........................ 359/557 |
| 5,966,246 A | * | 10/1999 | Yoshikawa .................. 359/686 |
| 6,025,962 A | | 2/2000 | Suzuki ........................ 359/557 |
| 6,285,501 B1 | * | 9/2001 | Suzuki ........................ 359/554 |

FOREIGN PATENT DOCUMENTS

JP 02 100010 A 4/1990
JP 10 123416 5/1998

OTHER PUBLICATIONS

Patent Abstract of JP 10 123416A, May 15, 1998.
Patent Abstract of JP 02 100010A, Apr. 12, 1990.

* cited by examiner

Primary Examiner—Thong Nguyen
(74) Attorney, Agent, or Firm—Morgan & Finnegan, LLP

(57) ABSTRACT

A zoom lens includes, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power. The fourth lens unit has a focal-length changeover subunit arranged to be insertable onto and detachable from an optical axis of the zoom lens and provided for changing the focal length of the zoom lens, and an image-stabilizing lens subunit different from the focal-length changeover subunit. The image-stabilizing lens subunit is movable in such a way as to have a component perpendicular to the optical axis so as to displace an image.

19 Claims, 41 Drawing Sheets

Fno / 1.7 e-LINE, g-LINE

-0.40    0.40
SPHERICAL ABERRATION

ω = 32.9°

ΔS  ΔM

-0.40    0.40
ASTIGMATISM

ω = 32.9°

-10.00   10.00
DISTORTION (%)

Fno / 1.7 g-LINE, e-LINE

-0.40    0.40
SPHERICAL ABERRATION

ω = 6.2°

ΔS  ΔM

-0.40    0.40
ASTIGMATISM

ω = 6.2°

-10.00   10.00
DISTORTION (%)

Fno / 2.0 e-LINE, g-LINE

-0.40    0.40
SPHERICAL ABERRATION

ω = 2.5°

ΔS
ΔM

-0.40    0.40
ASTIGMATISM

ω = 2.5°

-10.00   10.00
DISTORTION (%)

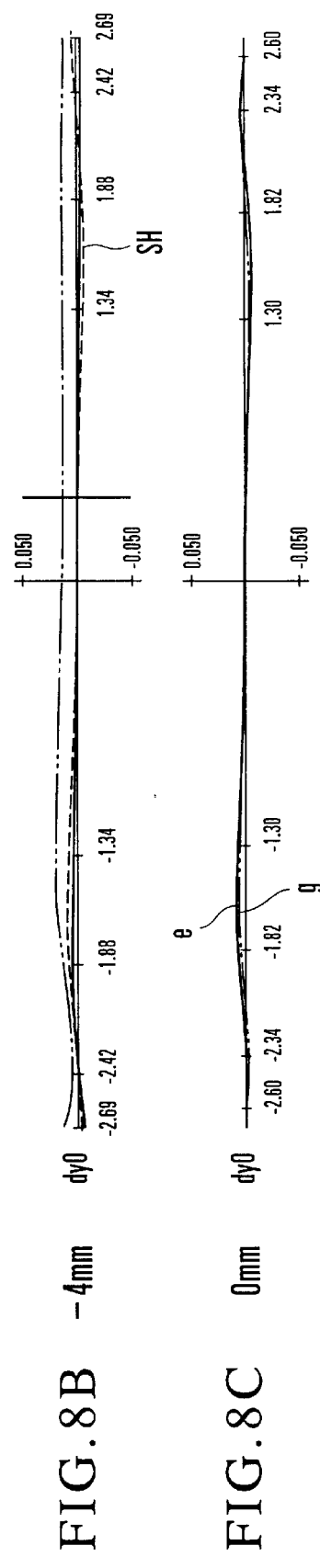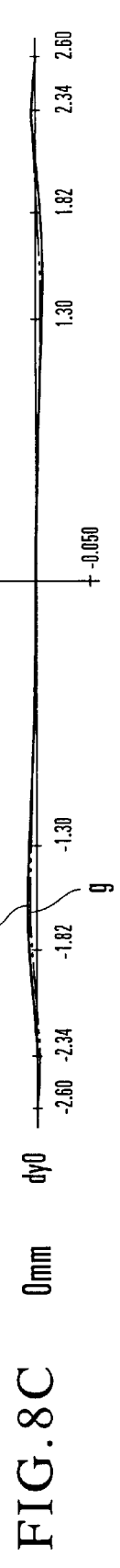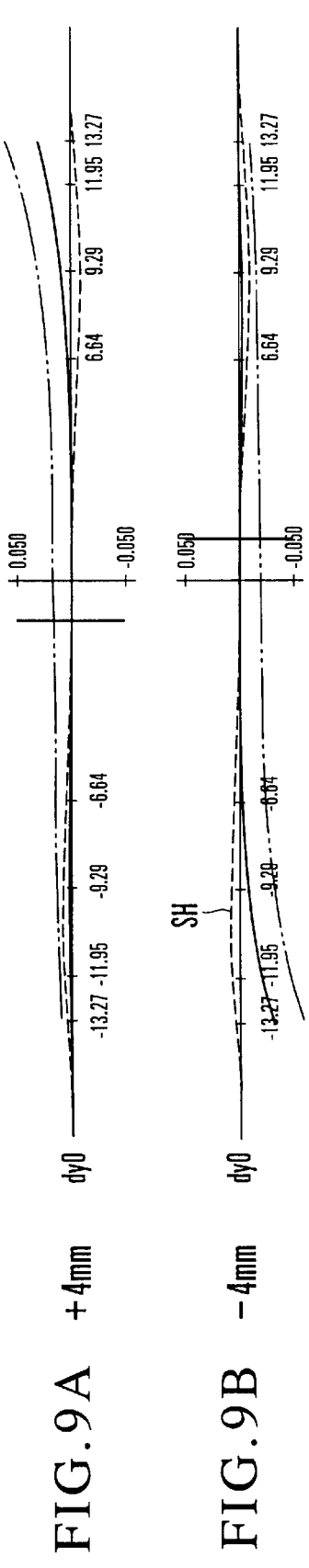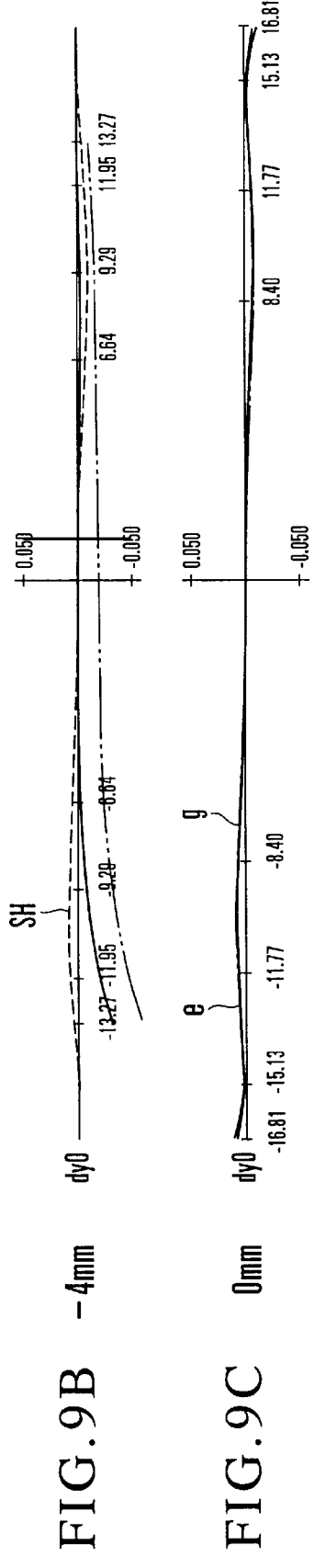

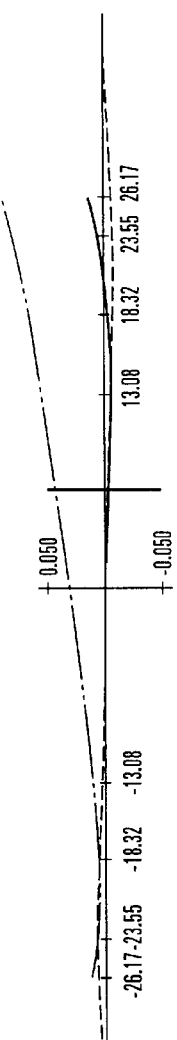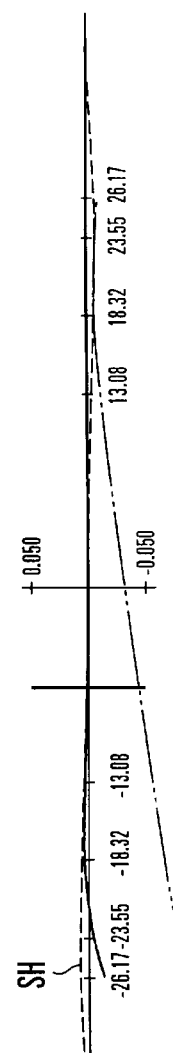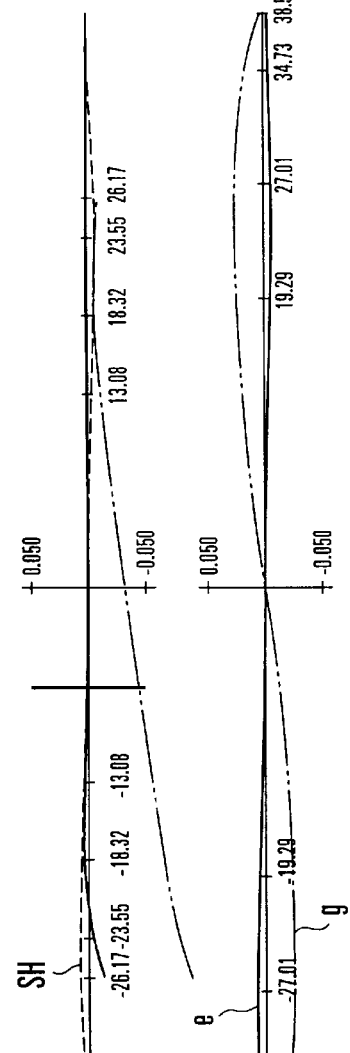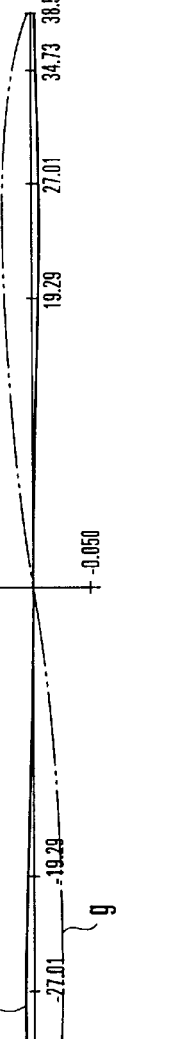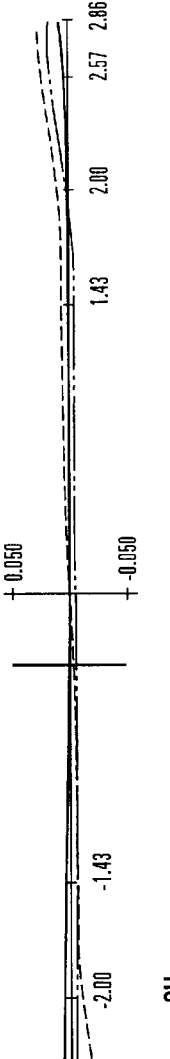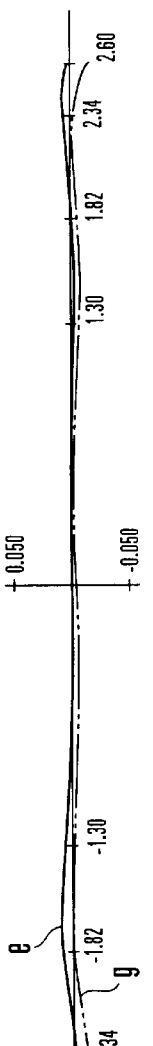
FIG. 10A +4mm
FIG. 10B −4mm
FIG. 10C 0mm
FIG. 11A +4mm
FIG. 11B −4mm
FIG. 11C 0mm

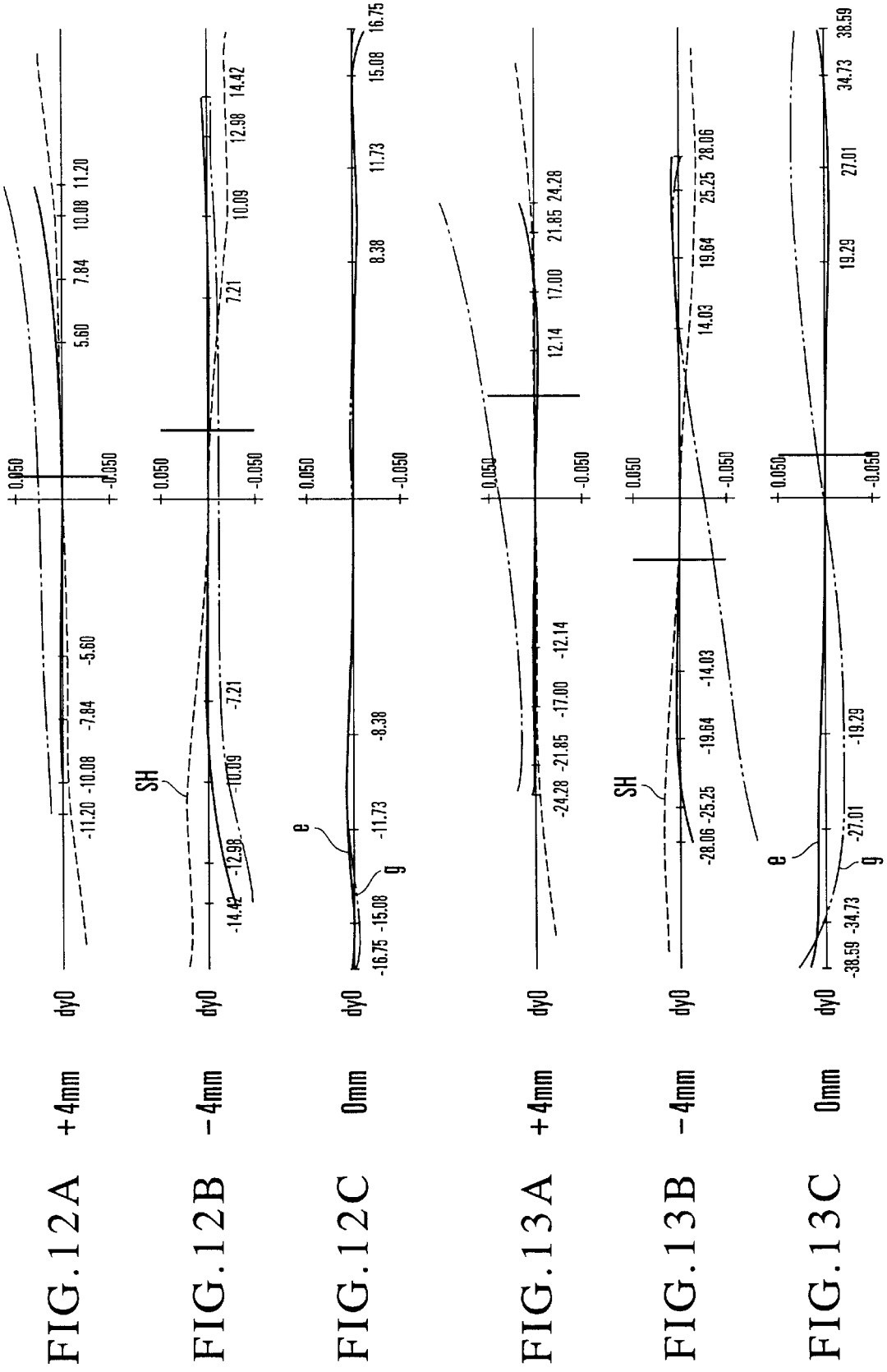

FNO / 1.7

SPHERICAL ABERRATION

ω = 32.9°

ASTIGMATISM

ω = 32.9°

DISTORTION (%)

FNO / 1.7

SPHERICAL ABERRATION

ω = 6.2°

ASTIGMATISM

ω = 6.2°

DISTORTION (%)

FNO / 2.0

SPHERICAL ABERRATION

ω = 2.5°

ASTIGMATISM

ω = 2.5°

DISTORTION (%)

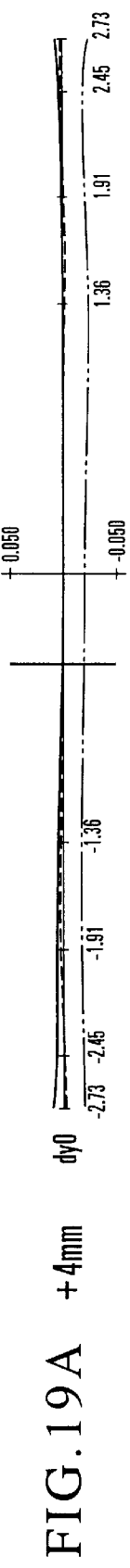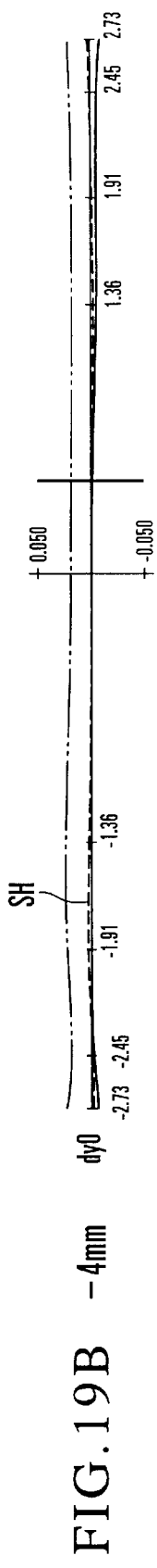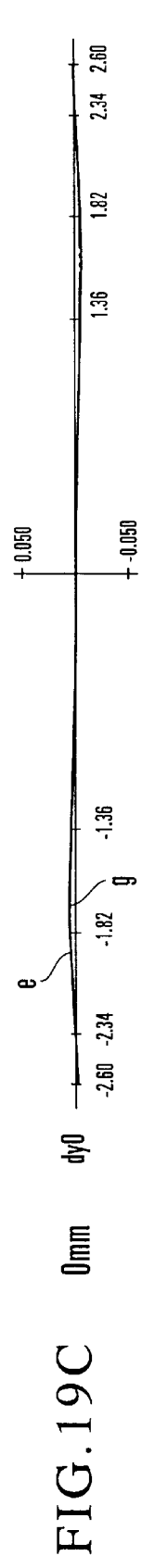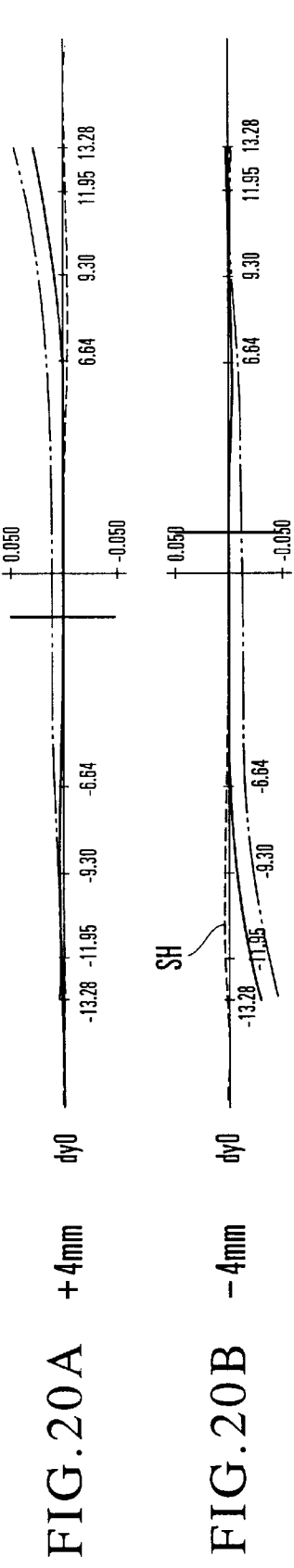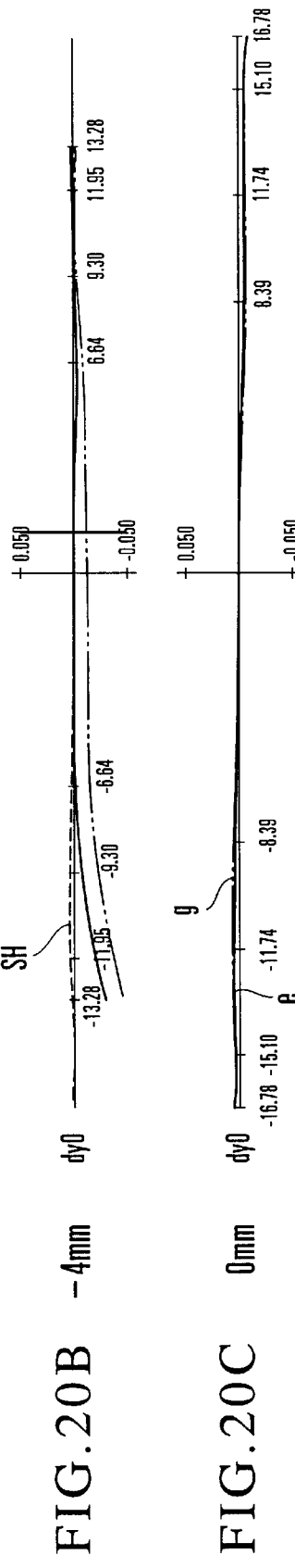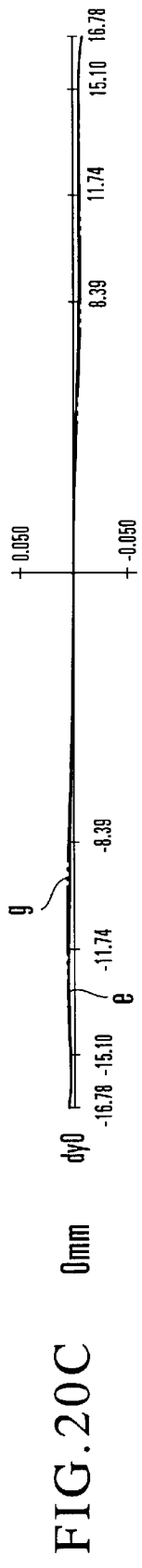

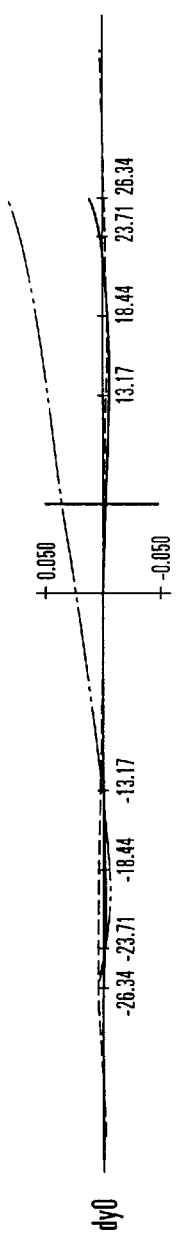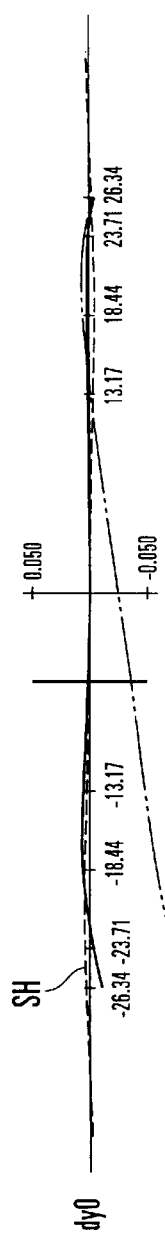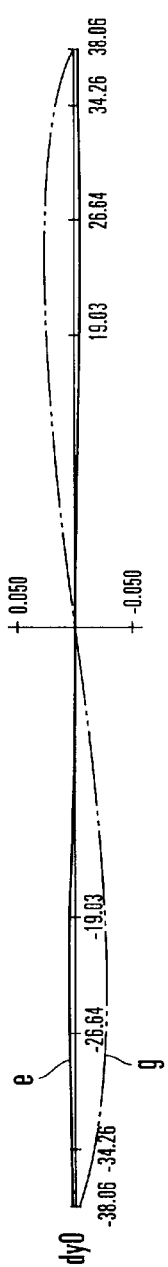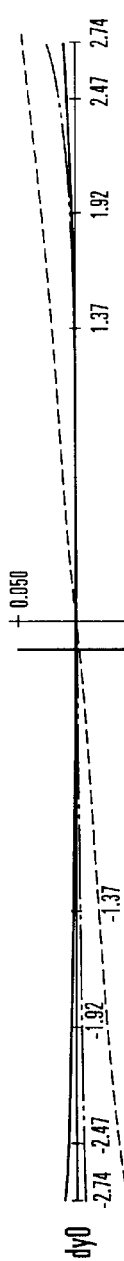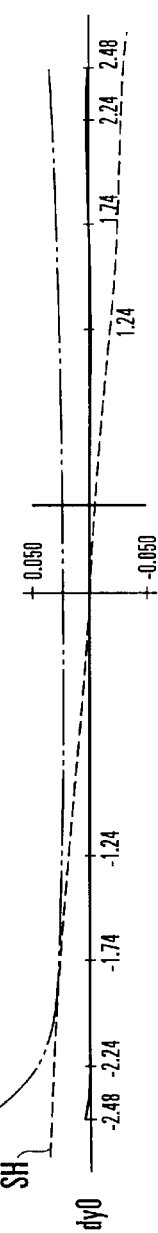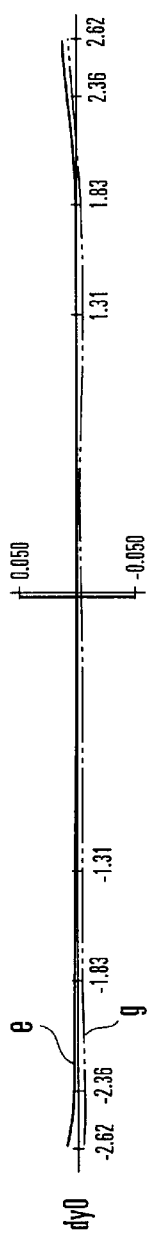
FIG. 21A  +4mm
FIG. 21B  −4mm
FIG. 21C  0mm
FIG. 22A  +4mm
FIG. 22B  −4mm
FIG. 22C  0mm

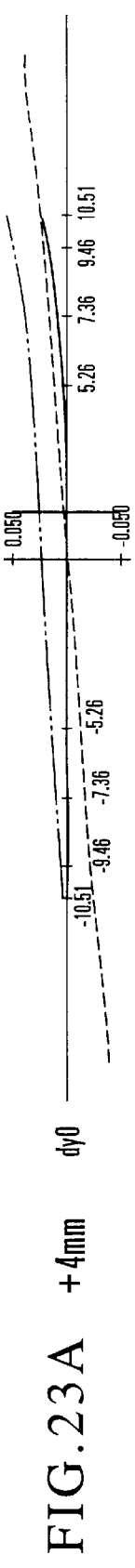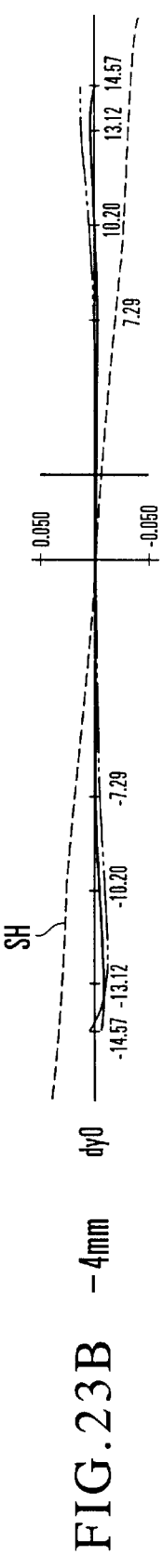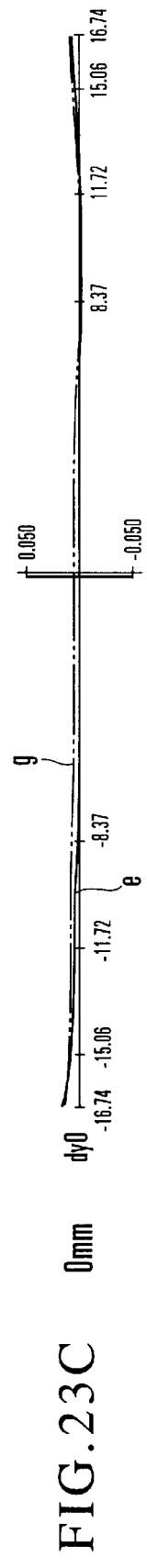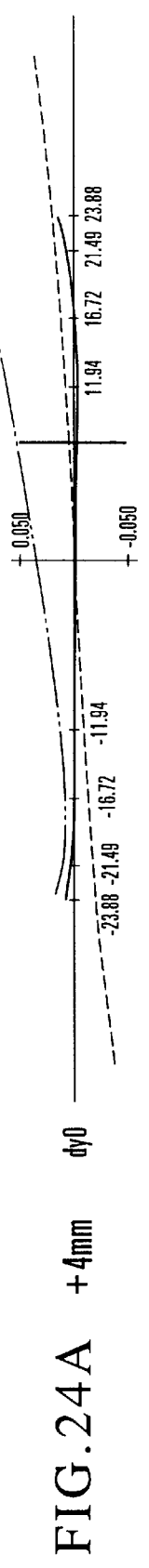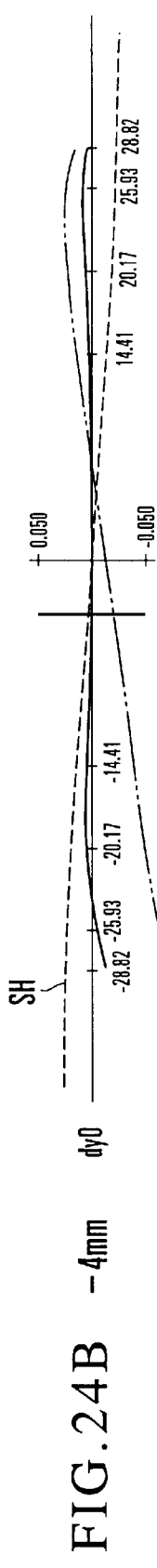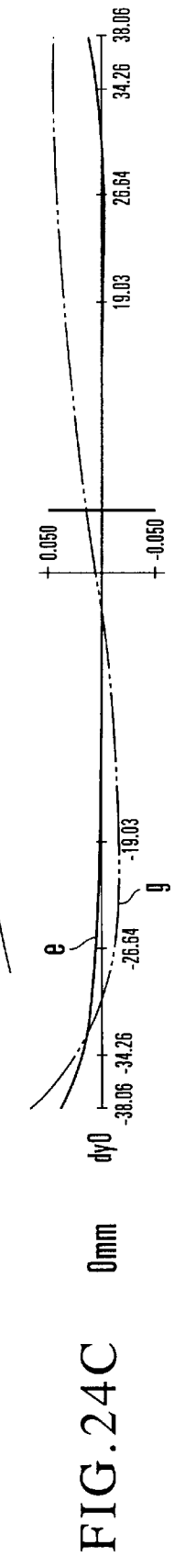
FIG.23A +4mm
FIG.23B −4mm
FIG.23C 0mm
FIG.24A +4mm
FIG.24B −4mm
FIG.24C 0mm

FNO/1.7
SPHERICAL ABERRATION

ω = 32.9°
ASTIGMATISM

ω = 32.9°
DISTORTION (%)

FNO/1.7
SPHERICAL ABERRATION

ω = 6.2°
ASTIGMATISM

ω = 6.2°
DISTORTION (%)

FNO/2.0
SPHERICAL ABERRATION

ω = 2.5°
ASTIGMATISM

ω = 2.5°
DISTORTION (%)

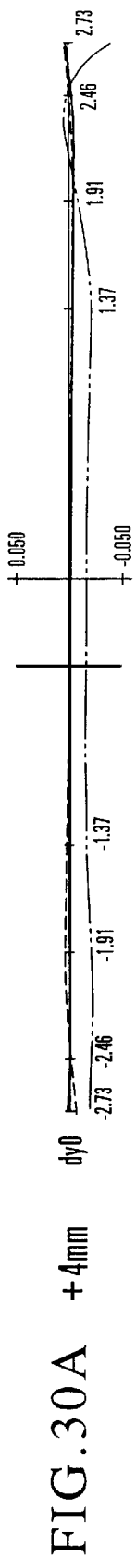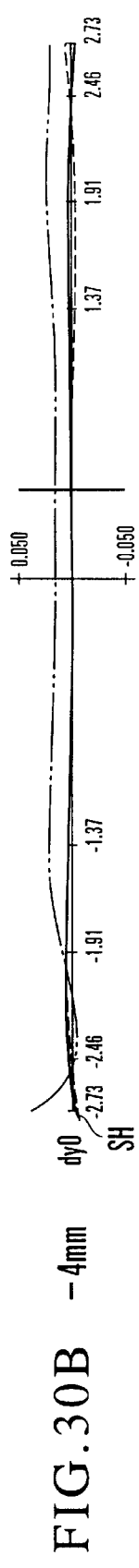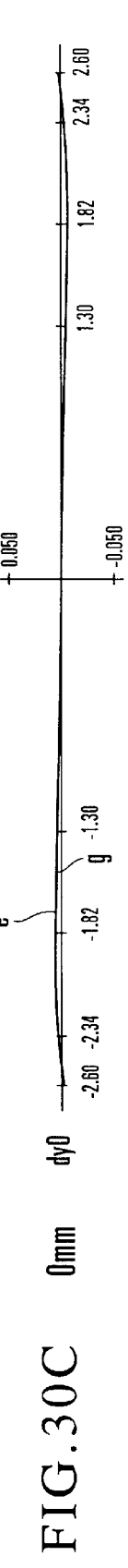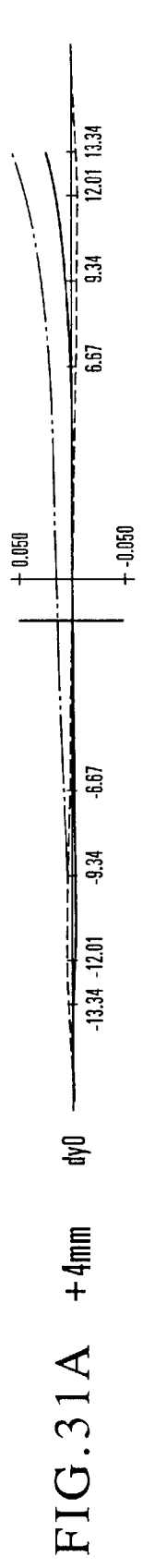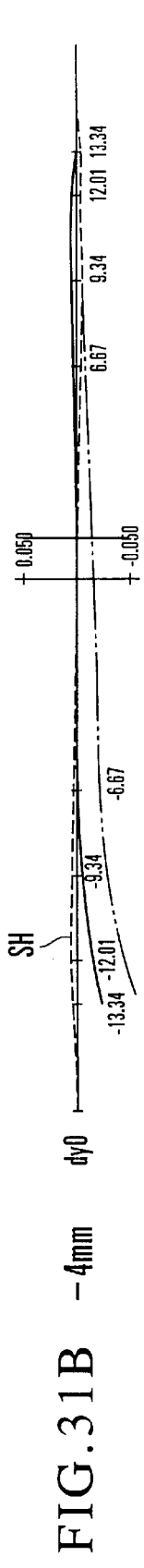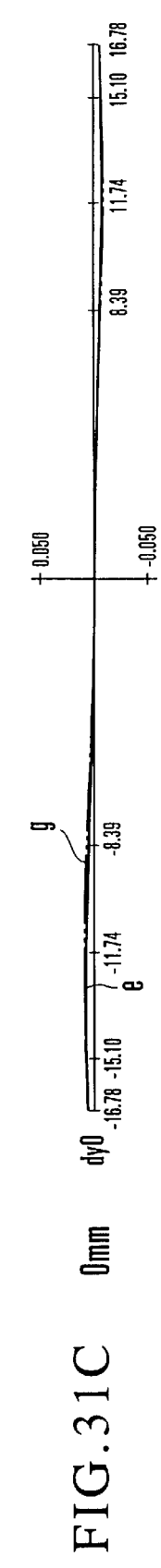
FIG.30A +4mm  FIG.30B −4mm  FIG.30C 0mm  FIG.31A +4mm  FIG.31B −4mm  FIG.31C 0mm

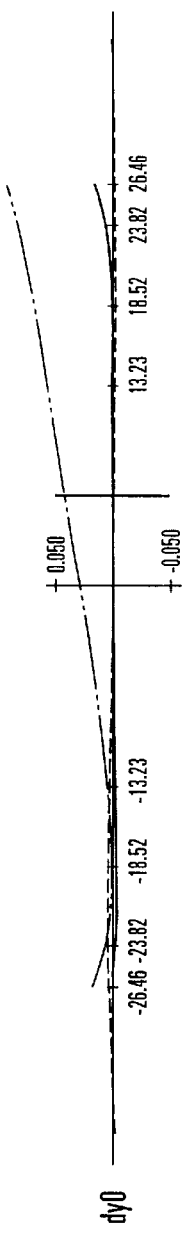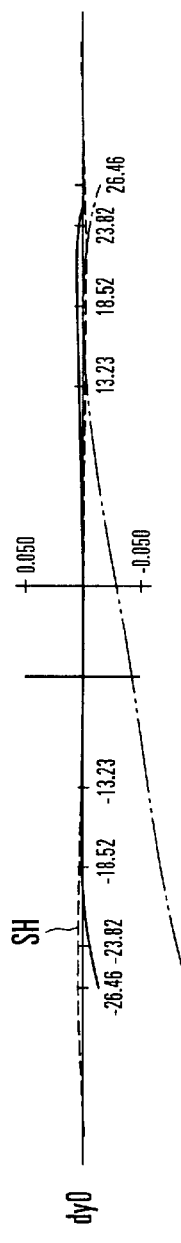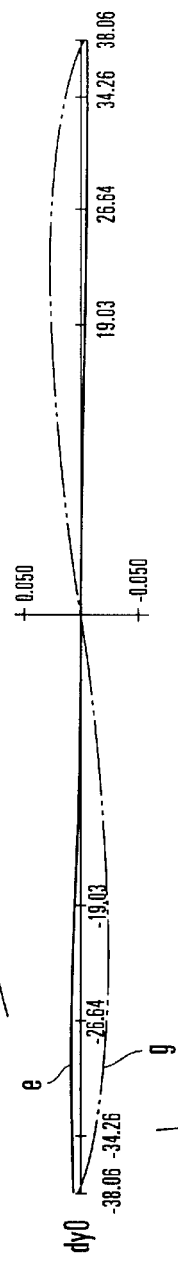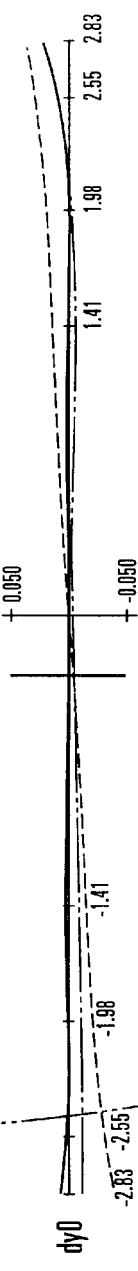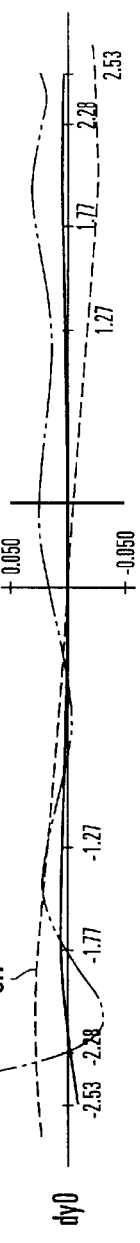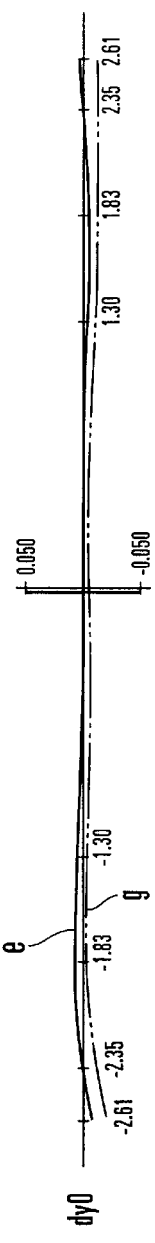
FIG.32A +4mm FIG.32B −4mm FIG.32C 0mm FIG.33A +4mm FIG.33B −4mm FIG.33C 0mm

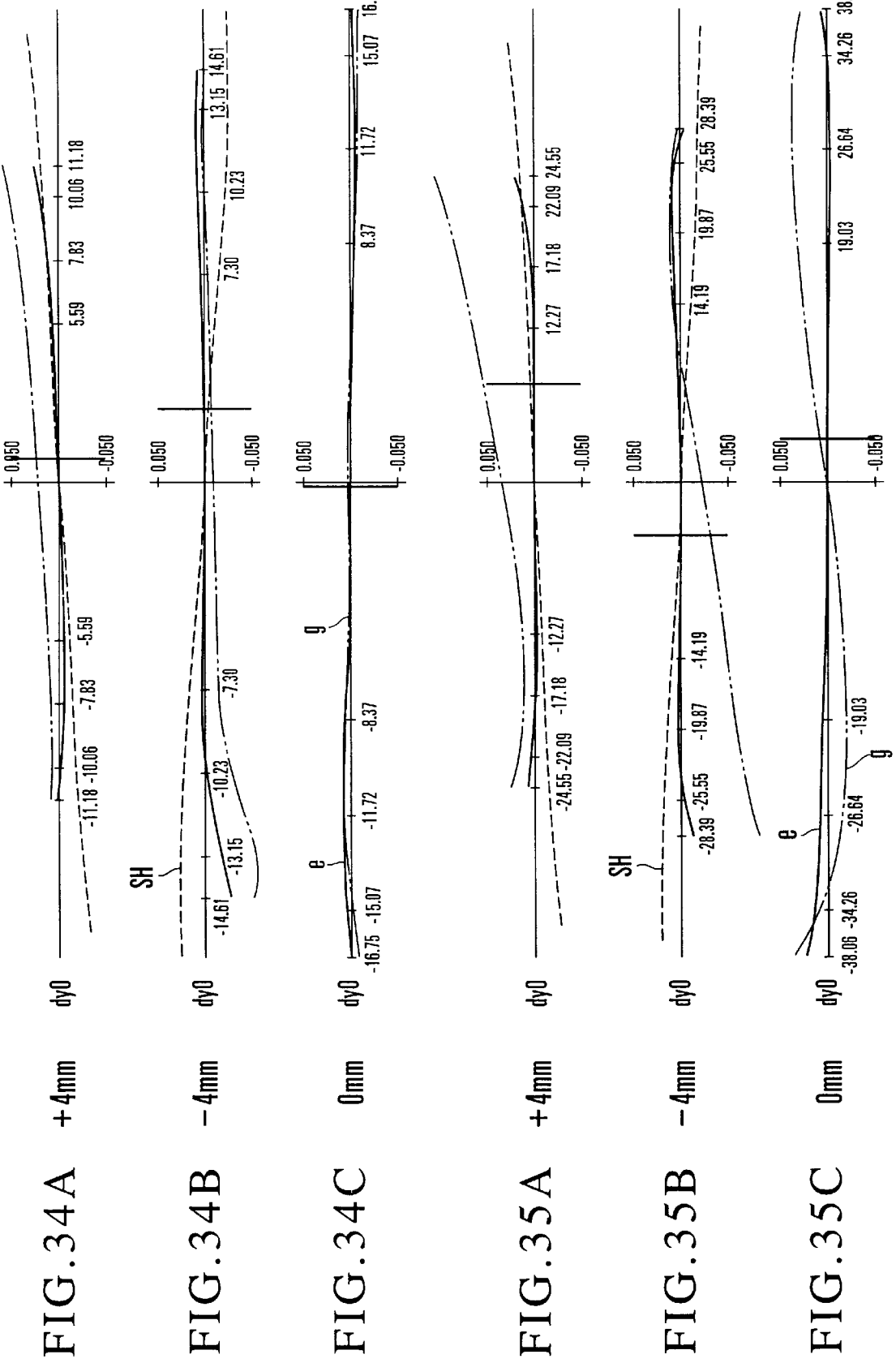

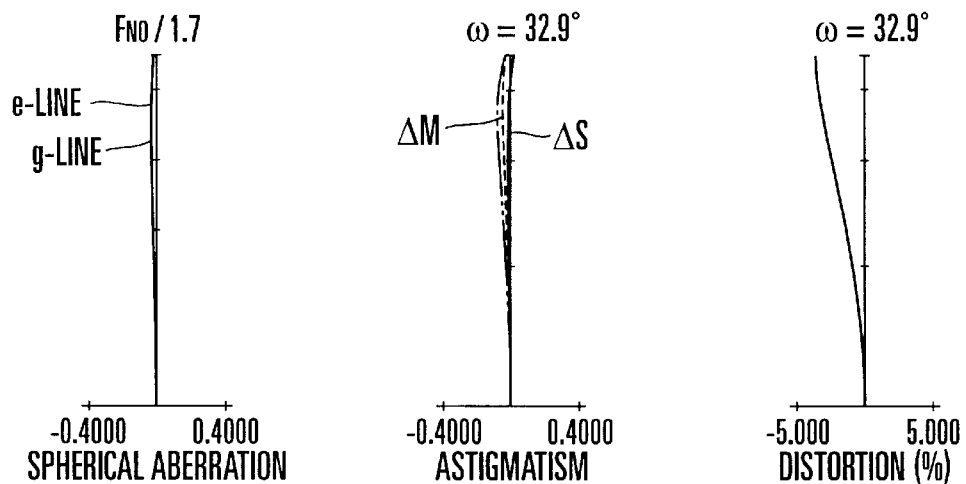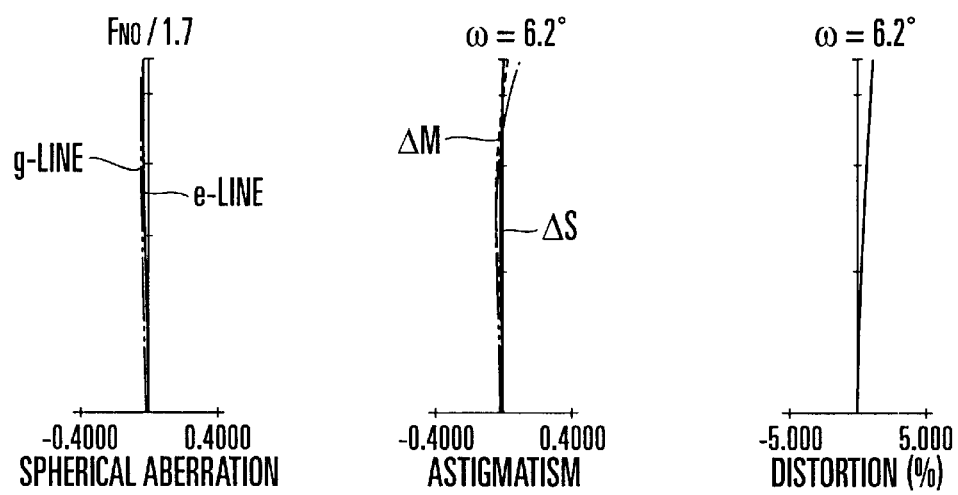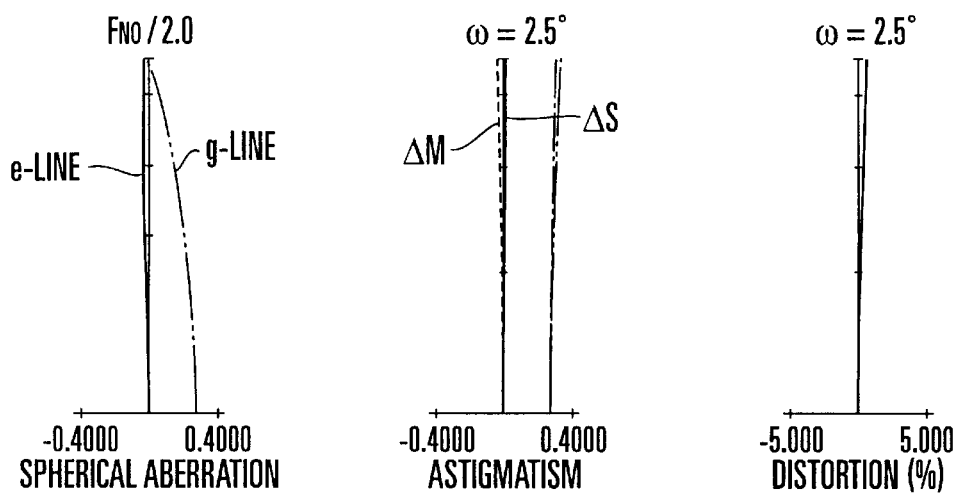

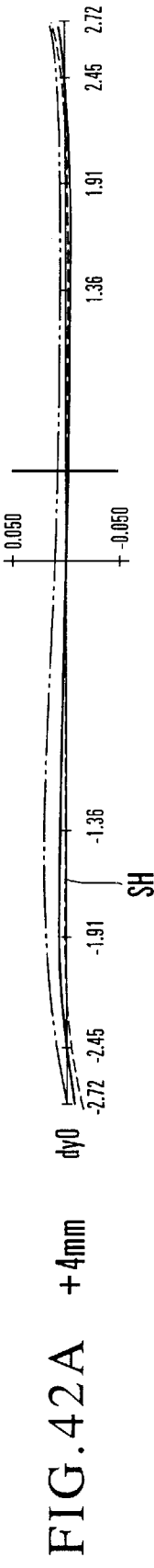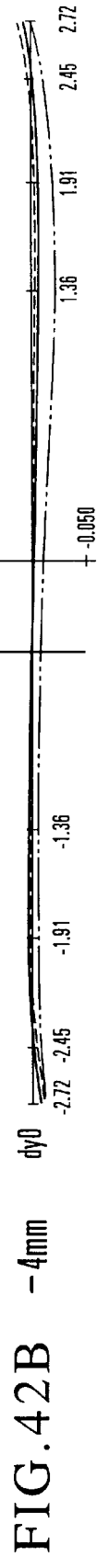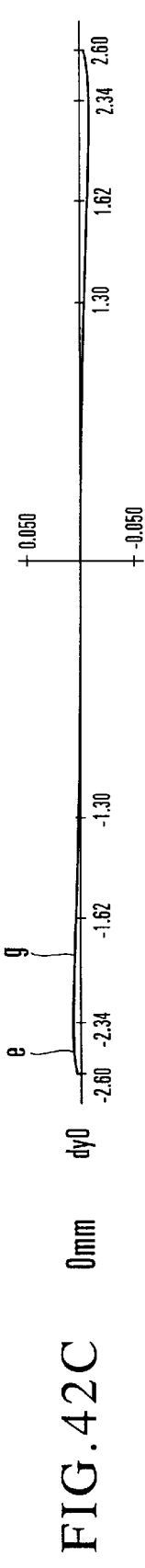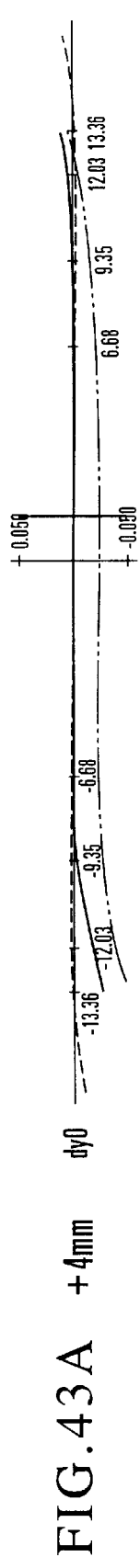
FIG. 42A  +4mm
FIG. 42B  −4mm
FIG. 42C  0mm
FIG. 43A  +4mm
FIG. 43B  −4mm
FIG. 43C  0mm

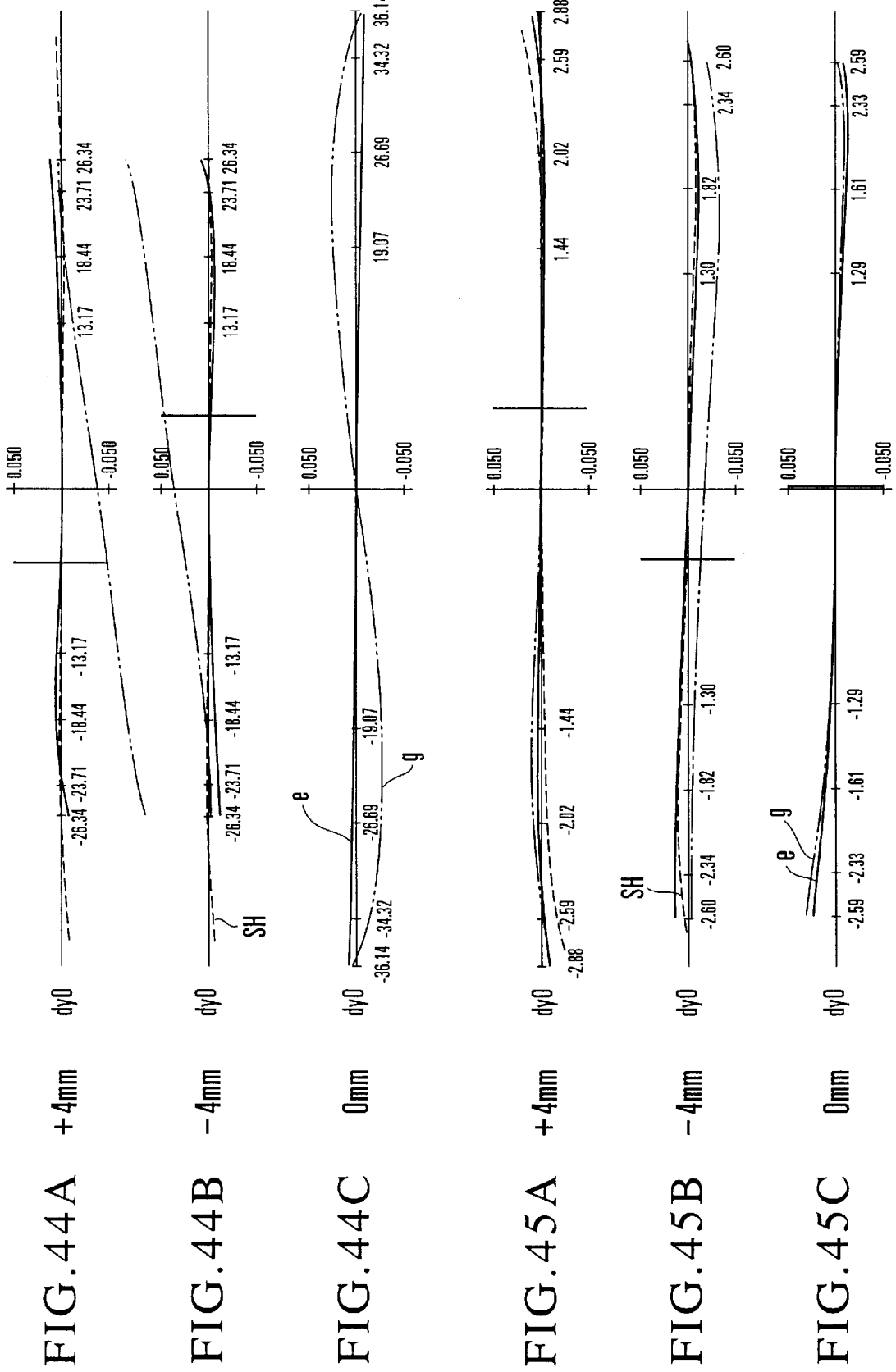

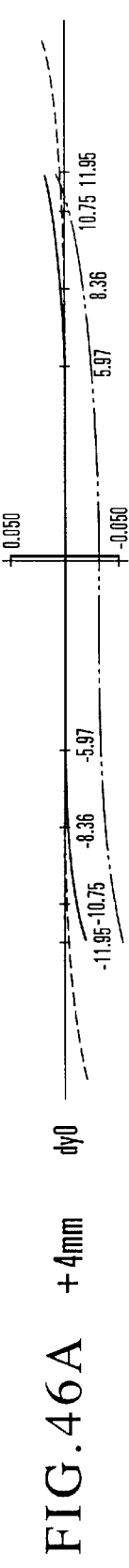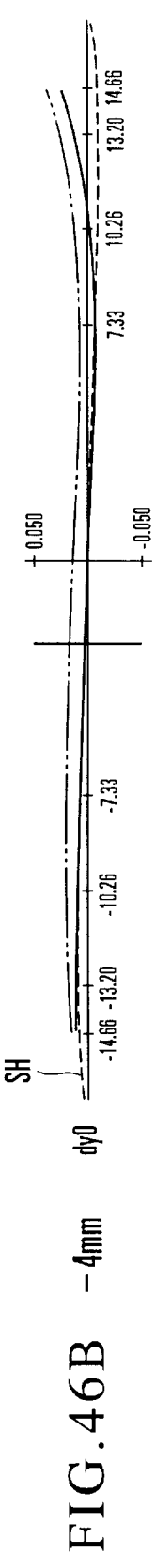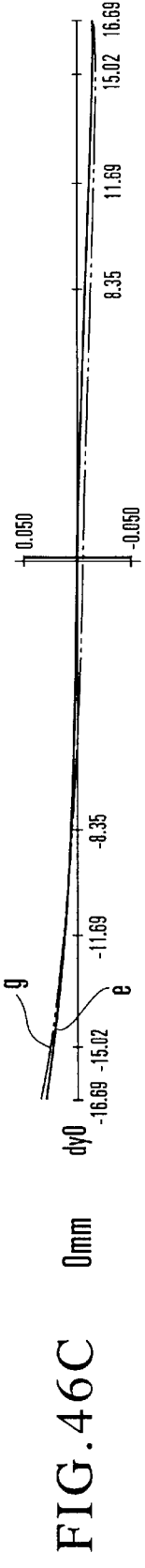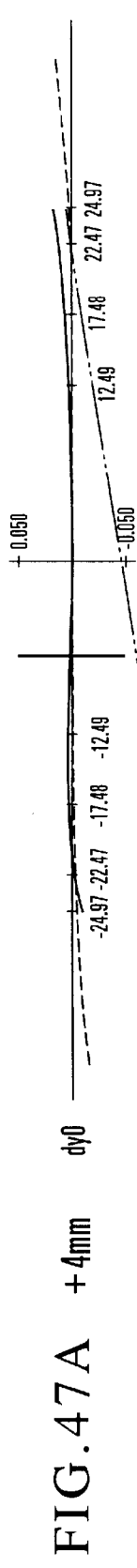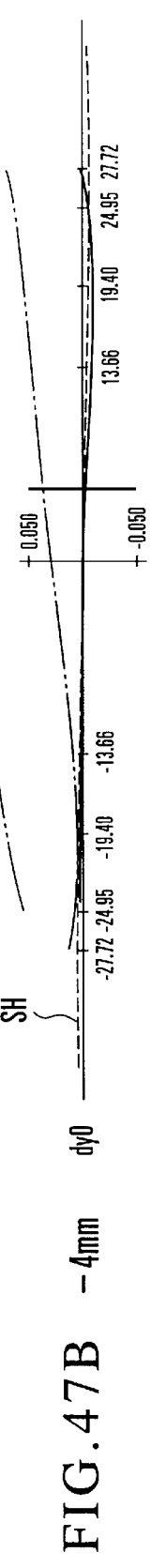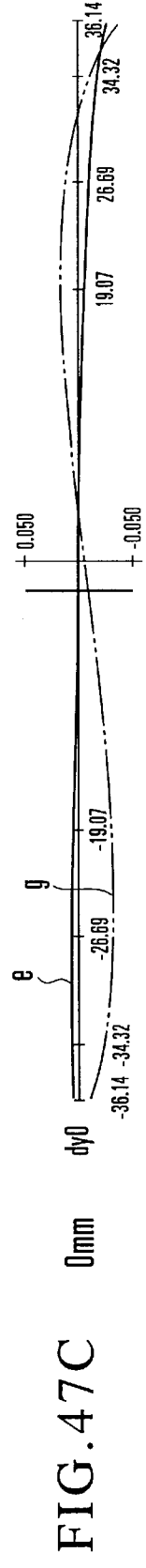
FIG. 46A +4mm  FIG. 46B −4mm  FIG. 46C 0mm  FIG. 47A +4mm  FIG. 47B −4mm  FIG. 47C 0mm

FIG. 50A
FNO/1.7
e-LINE, g-LINE
-0.4000  0.4000
SPHERICAL ABERRATION
FIG. 50B
ω = 32.9°
ΔM, ΔS
-0.4000  0.4000
ASTIGMATISM
FIG. 50C
ω = 32.9°
-5.000  5.000
DISTORTION (%)
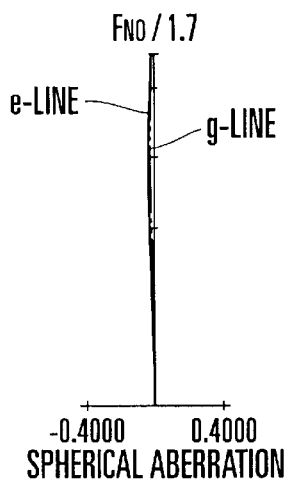
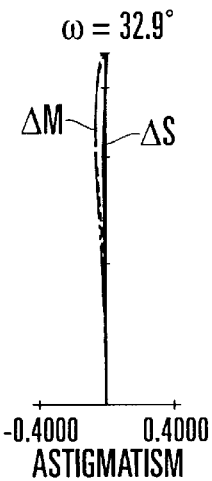
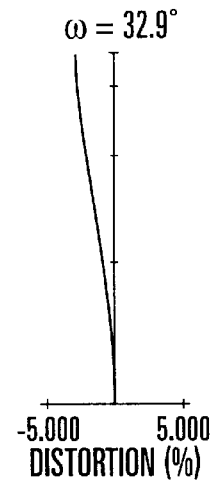
FIG. 51A
FNO/1.7
g-LINE, e-LINE
-0.4000  0.4000
SPHERICAL ABERRATION
FIG. 51B
ω = 6.2°
ΔM, ΔS
-0.4000  0.4000
ASTIGMATISM
FIG. 51C
ω = 6.2°
-5.000  5.000
DISTORTION (%)
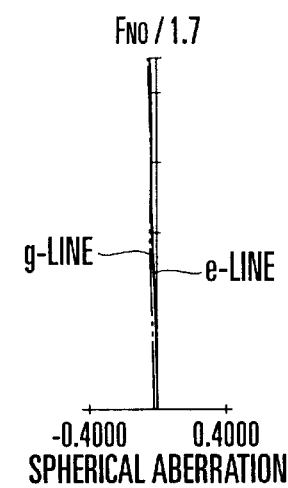
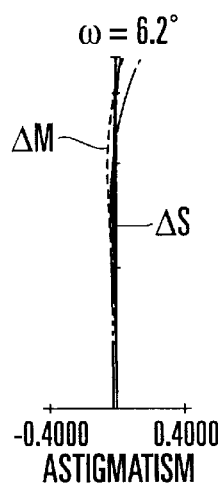
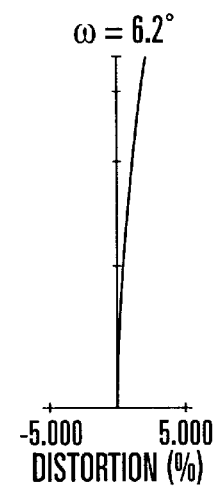
FIG. 52A
FNO/2.0
e-LINE, g-LINE
-0.4000  0.4000
SPHERICAL ABERRATION
FIG. 52B
ω = 2.5°
ΔM, ΔS
-0.4000  0.4000
ASTIGMATISM
FIG. 52C
ω = 2.5°
-5.000  5.000
DISTORTION (%)
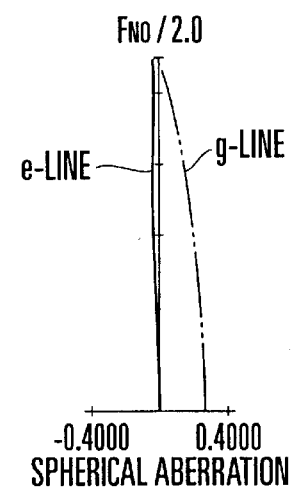
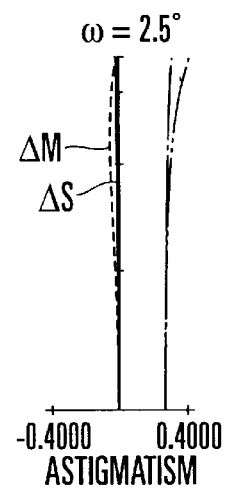
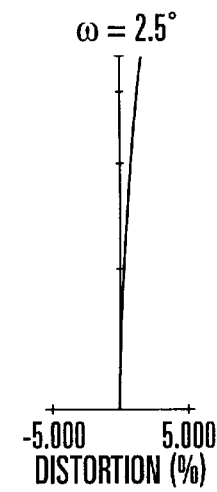

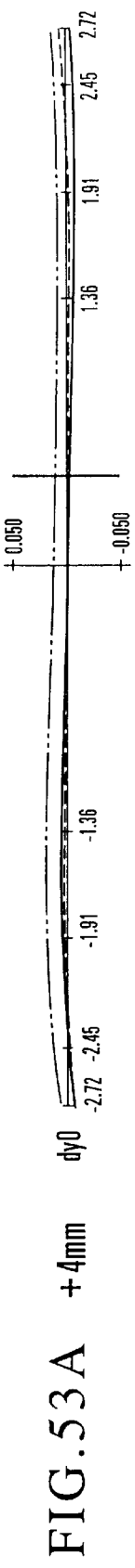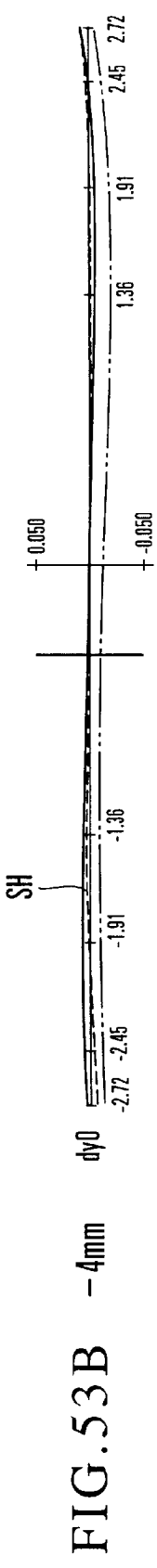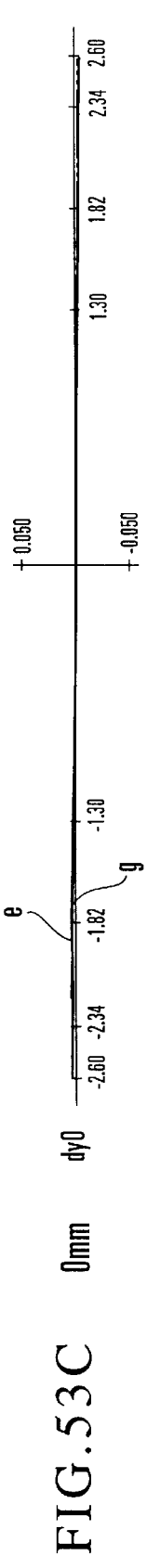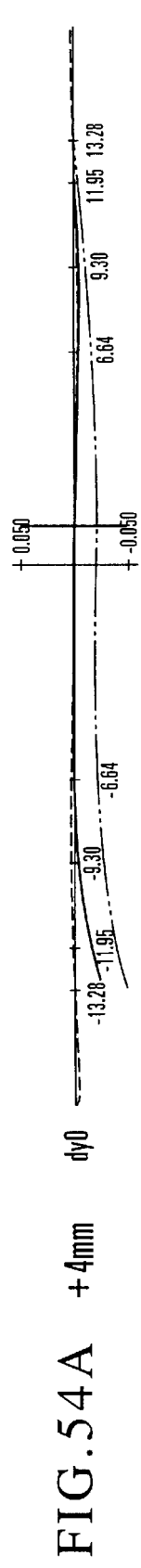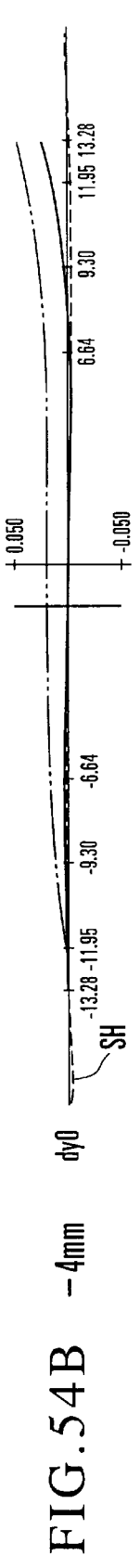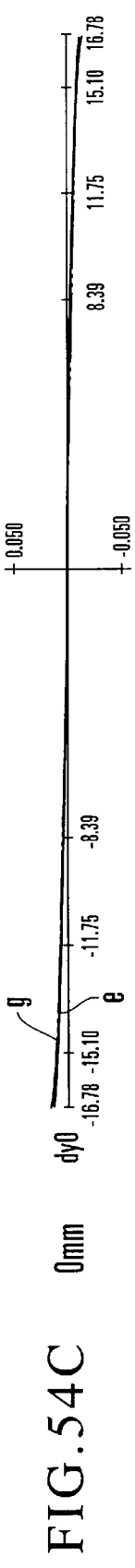
FIG.53A +4mm
FIG.53B −4mm
FIG.53C 0mm
FIG.54A +4mm
FIG.54B −4mm
FIG.54C 0mm

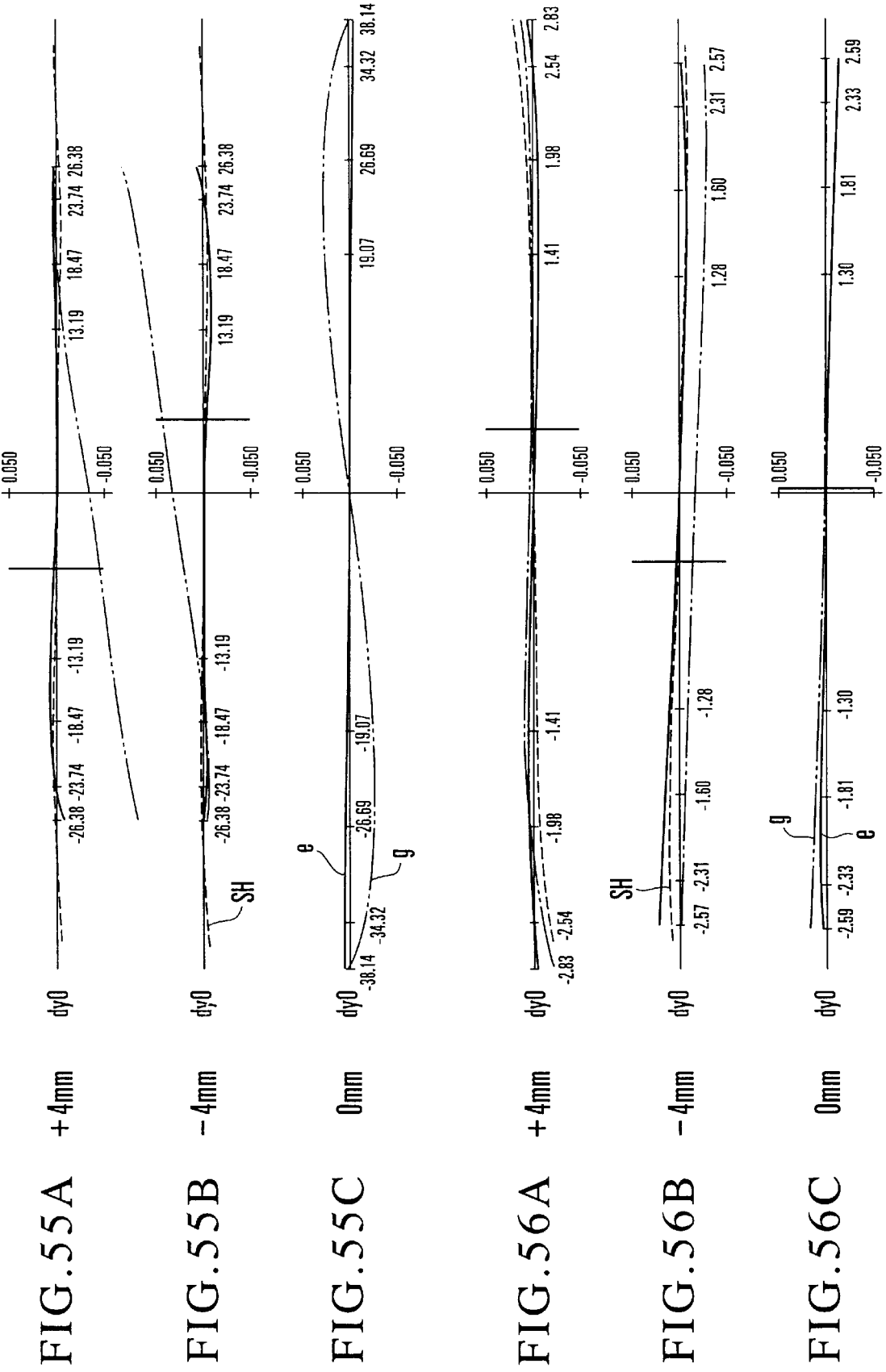

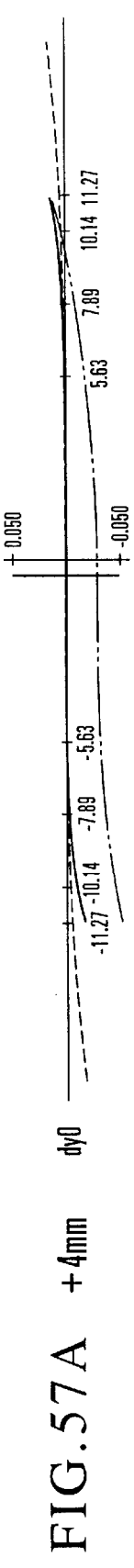
FIG.57A +4mm
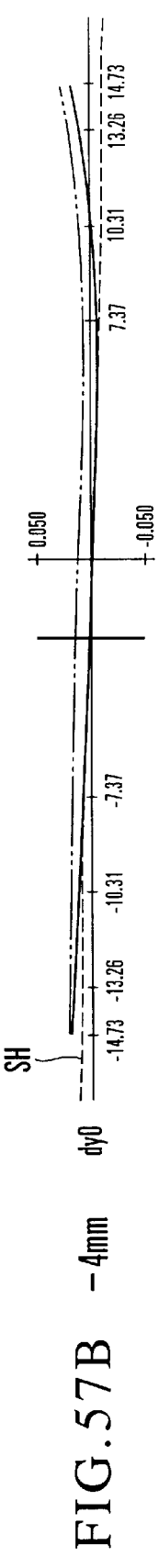
FIG.57B −4mm
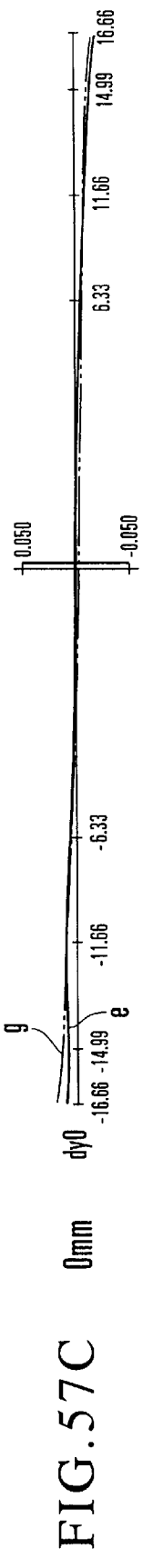
FIG.57C 0mm
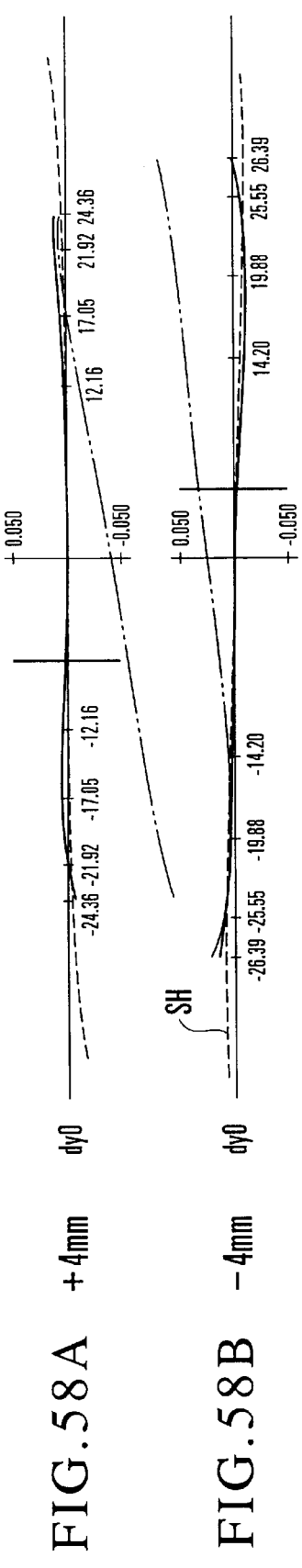
FIG.58A +4mm
FIG.58B −4mm
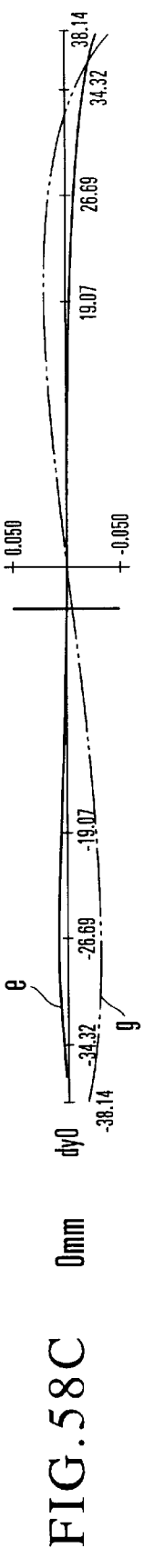
FIG.58C 0mm Fno / 1.7
e-LINE, g-LINE
SPHERICAL ABERRATION
-0.4000 — 0.4000

ω = 32.9°
ΔM, ΔS
ASTIGMATISM
-0.4000 — 0.4000

ω = 32.9°
DISTORTION (%)
-5.000 — 5.000

Fno / 1.7
e-LINE, g-LINE
SPHERICAL ABERRATION
-0.4000 — 0.4000

ω = 6.2°
ΔM, ΔS
ASTIGMATISM
-0.4000 — 0.4000

ω = 6.2°
DISTORTION (%)
-5.000 — 5.000

Fno / 2.0
e-LINE, g-LINE
SPHERICAL ABERRATION
-0.4000 — 0.4000

ω = 2.5°
ΔM, ΔS
ASTIGMATISM
-0.4000 — 0.4000

ω = 2.5°
DISTORTION (%)
-5.000 — 5.000

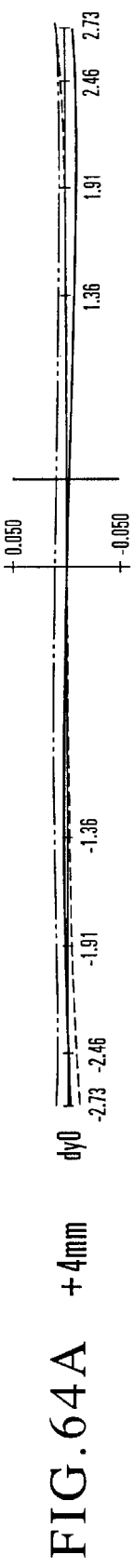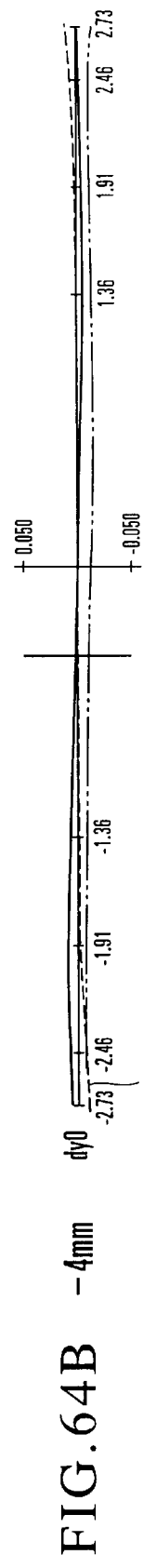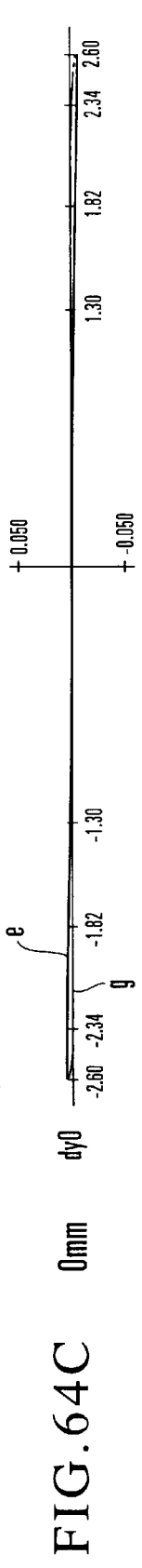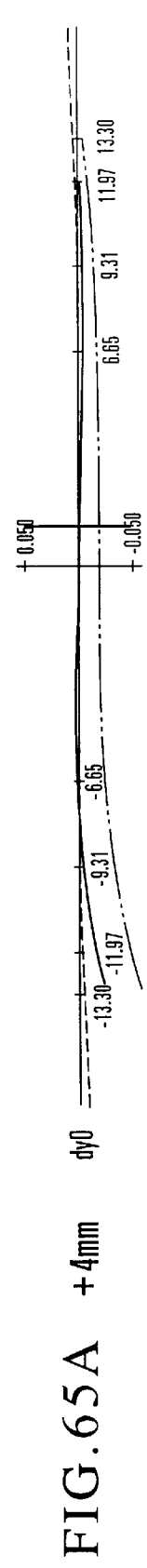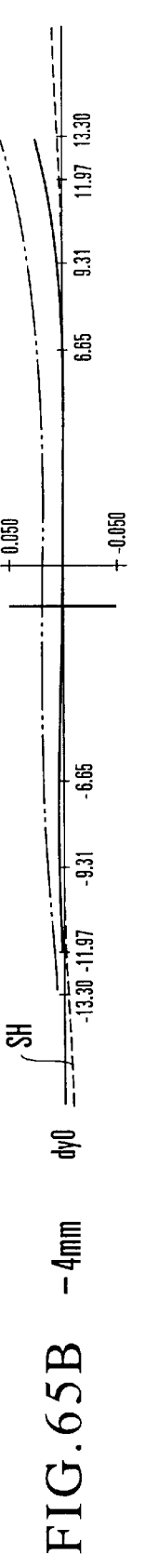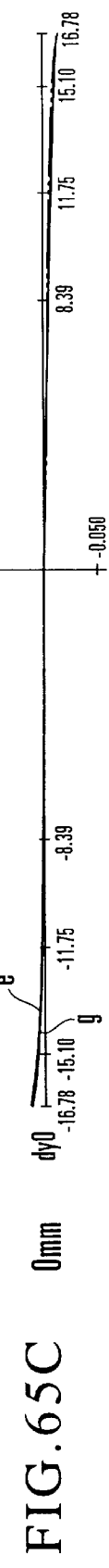
FIG.64A +4mm  FIG.64B -4mm  FIG.64C 0mm  FIG.65A +4mm  FIG.65B -4mm  FIG.65C 0mm

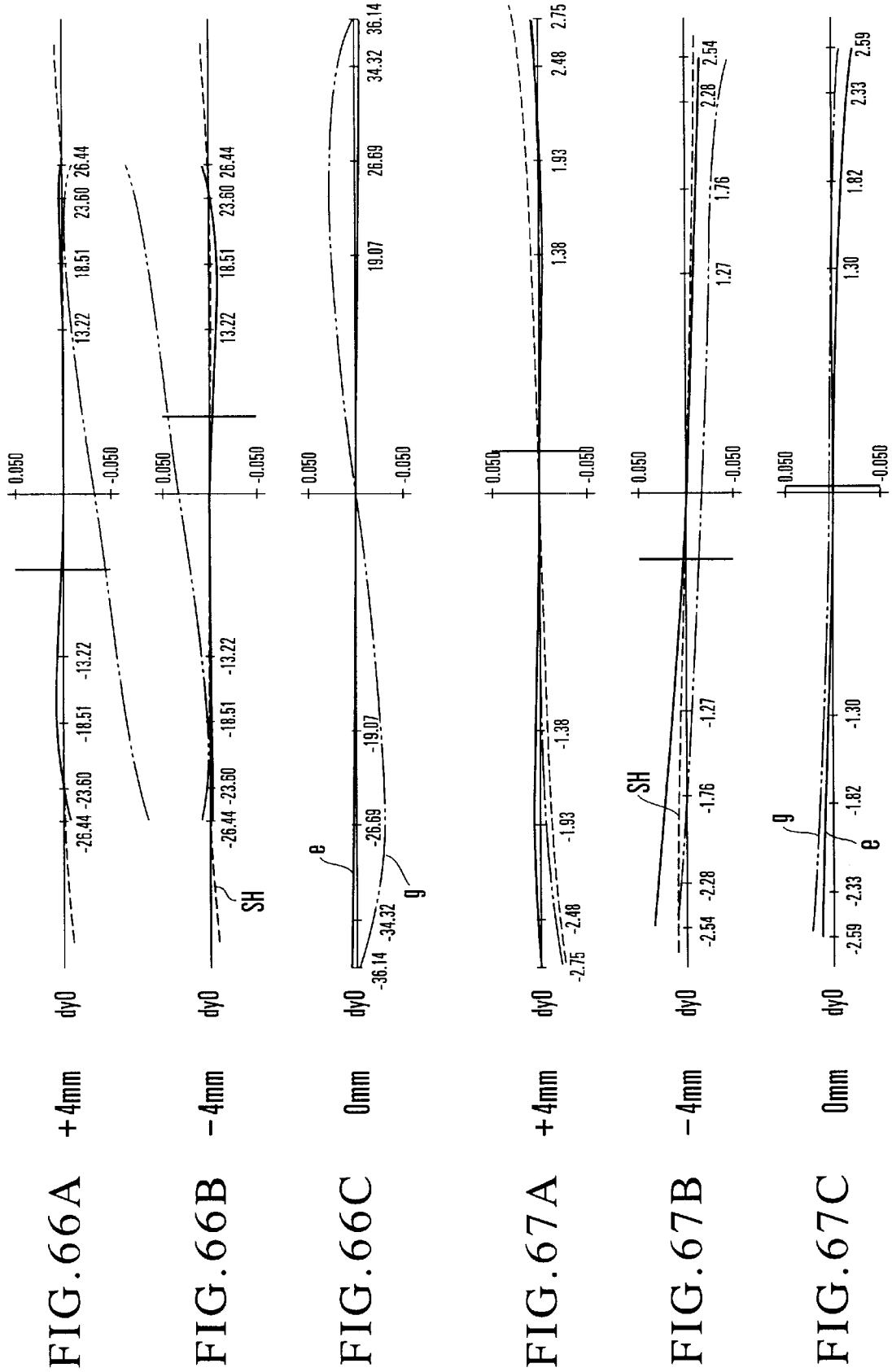

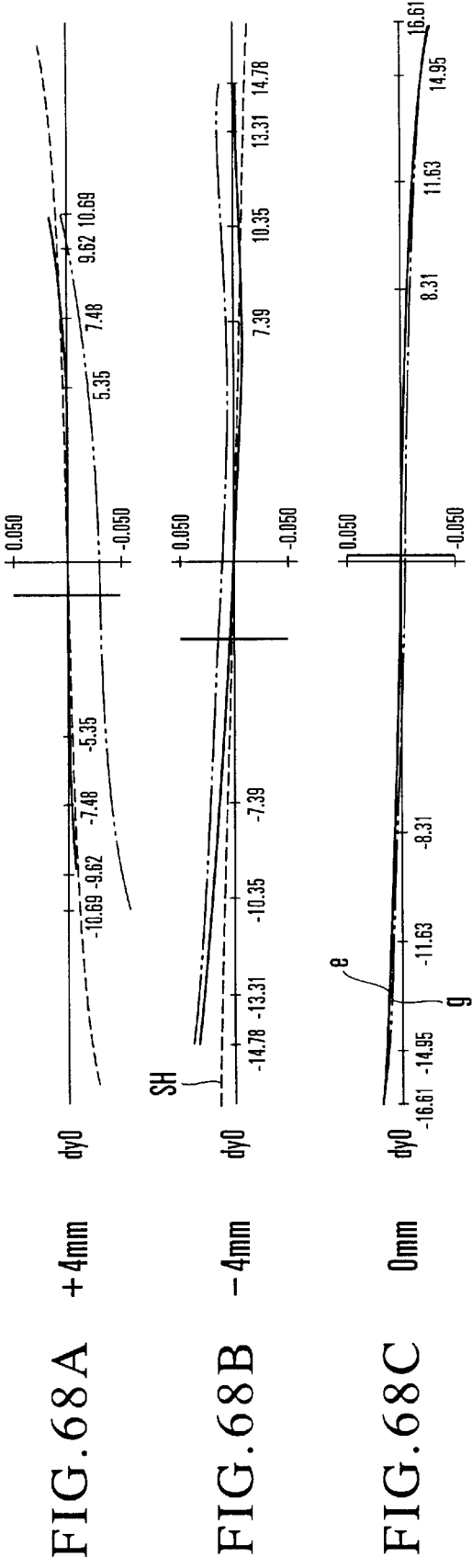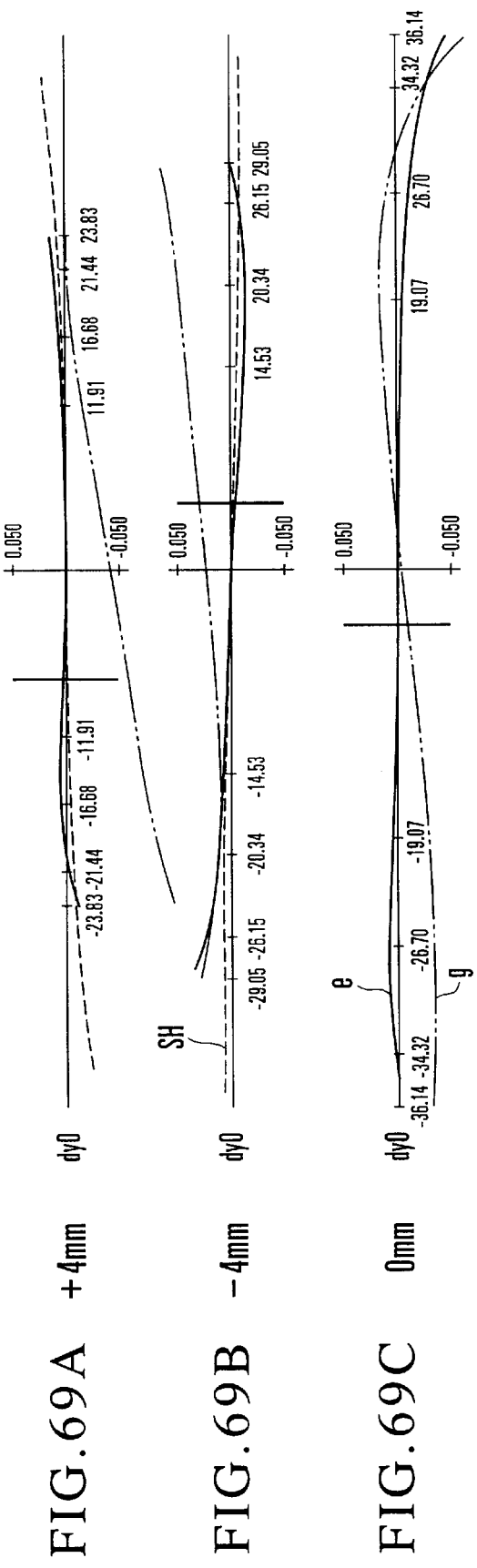

ZOOM LENS AND PHOTOGRAPHING APPARATUS USING THE SAME

BACKGROUND OF THE INVENTION

1. Field of the Invention

The present invention relates to an image-stabilizing zoom lens, and, more particularly, to an image-stabilizing zoom lens which is suited for a television camera, a photographic camera, a video camera or the like, and which has high optical performance over the entire range of variable magnification even during an image stabilizing operation, with the refractive power arrangement of the whole zoom lens, the arrangement of the moving lens units for the variation of magnification, and the construction of the fourth lens unit appropriately set.

2. Description of Related Art

Heretofore, for use with a television camera, a photographic camera, a video camera or the like, there has been a demand for a zoom lens having high optical performance while having a large relative aperture and a high variable magnification ratio. In addition to such a demand, in the case of a color television camera for broadcasting, in particular, importance is attached to operability and mobility. In response to such a requirement, the usage of a CCD (charge-coupled device) of ⅔ inch or ½ inch has become the mainstream for an image pickup device in the color television camera. Since the CCD has an almost uniform resolution over the entire image pickup range, a zoom lens to be associated with the CCD is also required to have an almost uniform resolution from the center of an image plane to the periphery thereof. For example, the zoom lens is required to have the various aberrations, such as coma, astigmatism and distortion, corrected well and to have high optical performance over the entire image plane. In addition, the zoom lens is required to have a large relative aperture, a wide angle of view and a high variable magnification ratio while being small in size and light in weight, and moreover to have a long back focal distance for enabling a color separation optical system and a variety of filters to be disposed in front of an image pickup means.

In addition, it has become a large problem to suppress an image shake caused by the vibration of a photographing system which has a long focal length or by the vibration of hands holding the photographing system. Accordingly, a demand for an image stabilizing function of preventing an image shake has risen. Under the circumstances, there have been proposed a variety of types of image stabilizing methods.

For example, in Japanese Laid-Open Patent Application No. Sho 61-223819 (corresponding to U.S. Pat. No. 4,927,250), there has been proposed a photographing system in which a refraction-type variable angle prism is disposed on the most object side (the side nearest to the object) of the photographing system so as to stabilize an image by varying an apex angle of the refraction-type variable angle prism according to the vibration of the photographing system.

Further, in Japanese Laid-Open Patent Application No. Hei 1-116619 (corresponding to U.S. Pat. No. 5,270,857 and Japanese Laid-Open Patent Application No. Hei 2-124521 (corresponding to U.S. Pat. No. 5,039,211), there has been proposed a method of obtaining a stationary image by detecting the vibration of a photographing system by means of an acceleration sensor or the like and causing a lens unit that is a part of the photographing system to shift in a direction perpendicular to the optical axis according to a signal obtained by the acceleration sensor or the like.

Further, in Japanese Laid-Open Patent Application No. Hei 8-29738 (corresponding to U.S. Pat. No. 5,721,641), there has been proposed a zoom lens comprising four lens units, i.e., in order from the object side, a first lens unit of positive refractive power, a second lens unit of negative refractive power, a third lens unit of negative refractive power and a fourth lens unit of positive refractive power, in which the fourth lens unit is composed of a front lens subunit of positive refractive power and a rear lens subunit of positive refractive power, and the shaking of a photographed image caused by the vibration of the zoom lens is corrected by moving the front lens subunit in a direction perpendicular to the optical axis.

Further, in Japanese Laid-Open Patent Application No. Hei 10-90601 (corresponding to U.S. Pat. No. 6,025,962), there has been proposed a zoom lens comprising five lens units, i.e., in order from the object side, a first lens unit of positive refractive power, a second lens unit of negative refractive power, a third lens unit of positive refractive power, a fourth lens unit of negative refractive power and a fifth lens unit of positive refractive power, in which the shaking of a photographed image caused by the vibration of the zoom lens is corrected by moving the fourth lens unit in a direction perpendicular to the optical axis.

Further, in Japanese Laid-Open Patent Application No. Hei 7-27978 (corresponding to U.S. Pat. No. 5,760,957), there has been proposed a zoom lens comprising four lens units, i.e., in order from the object side, a first lens unit of positive refractive power, a second lens unit of negative refractive power, a third lens unit of negative refractive power and a fourth lens unit of positive refractive power, in which the fourth lens unit is composed of a front lens subunit of positive refractive power and a rear lens subunit of positive refractive power, and the shaking of a photographed image caused by the vibration of the zoom lens is corrected by moving the third lens unit or the front lens subunit in a direction perpendicular to the optical axis.

In general, the method of obtaining a stationary image by disposing an image-stabilizing optical system in front of a photographing system and driving and controlling a movable lens unit that is a part of the image-stabilizing optical system to prevent the shaking of a photographed image would cause the whole apparatus to become large in size and a moving mechanism for moving the movable lens unit to become complicated.

In an optical system in which the image stabilization is performed by means of a variable angle prism, the amount of occurrence of decentering lateral chromatic aberration would become large, in particular, on the telephoto side during the image stabilization.

On the other hand, in an optical system in which the image stabilization is performed by causing a lens unit that is a part of a photographing system to decenter in a direction perpendicular to the optical axis, although there is such an advantage that it is unnecessary to provide a specific optical system used for the image stabilization, a space would be required for the lens unit to be moved and the amount of occurrence of decentering aberration during the image stabilization would become large.

In particular, in the four-unit zoom lens composed of four lens units of positive, negative, negative and positive refractive powers, respectively, in which the image stabilization is performed by moving the front lens subunit of positive refractive power of the fourth lens unit in a direction perpendicular to the optical axis, as proposed in the above-mentioned Japanese Laid-Open Patent Application No. Hei 8-29738, the front lens subunit, serving as an image-stabilizing lens unit, is a positive lens unit having a relatively small image-stabilizing effect (the amount of movement of the optical axis relative to the amount of decentering being small), and, as a result, there is a possibility that the amount of movement of the image-stabilizing lens unit becomes large to cause an increase of the size of a driving mechanism for the image-stabilizing lens unit.

Further, in particular, in the five-unit zoom lens composed of five lens units of positive, negative, positive, negative and positive refractive powers, respectively, in which the image stabilization is performed by moving the fourth lens unit in a direction perpendicular to the optical axis, as proposed in the above-mentioned Japanese Laid-Open Patent Application No. Hei 10-90601, since the fourth lens unit is a lens unit arranged to move in the optical axis direction during the variation of magnification, a driving control mechanism for the fourth lens unit would become complicated.

BRIEF SUMMARY OF THE INVENTION

It is an object of the invention to provide a zoom lens having high optical performance over the entire range of variable magnification even during an image stabilizing operation, with the whole mechanism of the zoom lens reduced in size and weight, and a photographing apparatus using the zoom lens.

To attain the above object, in accordance with a first aspect of the invention, there is provided a zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has a focal-length changeover subunit arranged to be insertable onto and detachable from an optical axis of the zoom lens and provided for changing the focal length of the zoom lens, and an image-stabilizing lens subunit disposed on the object side of the focal-length changeover subunit, and the image-stabilizing lens subunit is movable in such a way as to have a component perpendicular to the optical axis so as to displace an image.

In accordance with a preferred aspect of the invention, in the zoom lens, the image-stabilizing lens subunit has a positive refractive power.

In accordance with a preferred aspect of the invention, in the zoom lens, the image-stabilizing lens subunit has at least one positive lens and at least one negative lens.

In accordance with a preferred aspect of the invention, in the zoom lens, the image-stabilizing lens subunit is disposed within a diverging light flux exiting from the third lens unit, and the following condition is satisfied:

$$0.45 < (\alpha' - \alpha)$$

where $\alpha$ is a converted inclination angle of incidence of a ray entering the fourth lens unit, and $\alpha'$ is a converted inclination angle of exit of a ray exiting from the image-stabilizing lens subunit.

In accordance with a preferred aspect of the invention, in the zoom lens, the following condition is satisfied:

$$30 < (vp - vn)$$

where vp is, when the image-stabilizing lens subunit includes only one positive lens, an Abbe number of the positive lens included in the image-stabilizing lens subunit or, when the image-stabilizing lens subunit includes a plurality of positive lenses, a mean value of Abbe numbers of all the positive lenses included in the image-stabilizing lens subunit, and vn is, when the image-stabilizing lens subunit includes only one negative lens, an Abbe number of the negative lens included in the image-stabilizing lens subunit or, when the image-stabilizing lens subunit includes a plurality of negative lenses, a mean value of Abbe numbers of all the negative lenses included in the image-stabilizing lens subunit.

In accordance with a preferred aspect of the invention, in the zoom lens, the image-stabilizing lens subunit has a negative refractive power.

In accordance with a preferred aspect of the invention, in the zoom lens, the image-stabilizing lens subunit has at least one negative lens and at least one positive lens.

In accordance with a preferred aspect of the invention, in the zoom lens, the following condition is satisfied:

$$-0.45 > (\alpha 2' - \alpha 2)$$

where $\alpha 2$ is a converted inclination angle of incidence of a ray entering the image-stabilizing lens subunit, and $\alpha 2'$ is a converted inclination angle of exit of a ray exiting from the image-stabilizing lens subunit.

In accordance with a preferred aspect of the invention, in the zoom lens, the following condition is satisfied:

$$10 < (vn2 - vp2)$$

where vn2 is, when the image-stabilizing lens subunit includes only one negative lens, an Abbe number of the negative lens included in the image-stabilizing lens subunit or, when the image-stabilizing lens subunit includes a plurality of negative lenses, a mean value of Abbe numbers of all the negative lenses included in the image-stabilizing lens subunit, and vp2 is, when the image-stabilizing lens subunit includes only one positive lens, an Abbe number of the positive lens included in the image-stabilizing lens subunit or, when the image-stabilizing lens subunit includes a plurality of positive lenses, a mean value of Abbe numbers of all the positive lenses included in the image-stabilizing lens subunit.

In accordance with a preferred aspect of the invention, in the zoom lens, a lens subunit disposed on the image side of the image-stabilizing lens subunit in the fourth lens unit includes a plurality of positive lenses and at least one negative lens.

In accordance with a preferred aspect of the invention, in the zoom lens, the following condition is satisfied:

$$10 < (vp(4R) - vn(4R))$$

where vp(4R) is a mean value of Abbe numbers of all the positive lenses included in the lens subunit disposed on the image side of the image-stabilizing lens subunit in the fourth lens unit, and vn(4R) is, when the lens subunit disposed on the image side of the image-stabilizing lens subunit in the fourth lens unit includes only one negative lens, an Abbe number of the negative lens included in the lens subunit disposed on the image side of the image-stabilizing lens subunit in the fourth lens unit or, when the lens subunit disposed on the image side of the image-stabilizing lens subunit in the fourth lens unit includes a plurality of negative lenses, a mean value of Abbe numbers of all the negative lenses included in the lens subunit disposed on the image side of the image-stabilizing lens subunit in the fourth lens unit.

In accordance with a preferred aspect of the invention, the zoom lens further comprises an aperture stop disposed in a space close to the image-stabilizing lens subunit on the object side or the image side thereof.

In accordance with a preferred aspect of the invention, in the zoom lens, the third lens unit includes at least one positive lens and at least one negative lens.

To attain the above object, in accordance with a second aspect of the invention, there is provided a zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has an image-stabilizing lens subunit of positive refractive power including at least one positive lens and at least one negative lens and disposed within a diverging light flux exiting from the third lens unit, the image-stabilizing lens subunit being movable in such a way as to have a component perpendicular to an optical axis of the zoom lens so as to displace an image, and the following condition is satisfied:

$$0.45 < (\alpha' - \alpha)$$

where α is a converted inclination angle of incidence of a ray entering the fourth lens unit, and α' is a converted inclination angle of exit of a ray exiting from the image-stabilizing lens subunit.

To attain the above object, in accordance with a third aspect of the invention, there is provided a zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has an image-stabilizing lens subunit of negative refractive power, and the image-stabilizing lens subunit is movable in such a way as to have a component perpendicular to an optical axis of the zoom lens so as to displace an image.

In accordance with a preferred aspect of the invention, in the zoom lens, the image-stabilizing lens subunit includes at least one negative lens and at least one positive lens, and the following condition is satisfied:

$$-0.45 > (\alpha 2' - \alpha 2)$$

where α2 is a converted inclination angle of incidence of a ray entering the image-stabilizing lens subunit, and α2' is a converted inclination angle of exit of a ray exiting from the image-stabilizing lens subunit.

To attain the above object, in accordance with a fourth aspect of the invention, there is provided a photographing apparatus comprising a zoom lens and a casing arranged to hold the zoom lens, the zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has a focal-length changeover subunit arranged to be insertable onto and detachable from an optical axis of the zoom lens and provided for changing the focal length of the zoom lens, and an image-stabilizing lens subunit disposed on the object side of the focal-length changeover subunit, and the image-stabilizing lens subunit is movable in such a way as to have a component perpendicular to the optical axis so as to displace an image.

To attain the above object, in accordance with a fifth aspect of the invention, there is provided a photographing apparatus comprising a zoom lens and a casing arranged to hold the zoom lens, the zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has an image-stabilizing lens subunit of positive refractive power including at least one positive lens and at least one negative lens and disposed within a diverging light flux exiting from the third lens unit, the image-stabilizing lens subunit being movable in such a way as to have a component perpendicular to an optical axis of the zoom lens so as to displace an image, and the following condition is satisfied:

$$0.45 < (\alpha' - \alpha)$$

where α is a converted inclination angle of incidence of a ray entering the fourth lens unit, and α' is a converted inclination angle of exit of a ray exiting from the image-stabilizing lens subunit.

To attain the above object, in accordance with a sixth aspect of the invention, there is provided a photographing apparatus comprising a zoom lens and a casing arranged to hold the zoom lens, the zoom lens comprising, in order from an object side to an image side, a first lens unit of positive refractive power, a second lens unit of negative refractive power arranged to move during variation of magnification, a third lens unit of negative refractive power arranged to compensate for shift of an image plane due to the variation of magnification, and a fourth lens unit of positive refractive power, wherein the fourth lens unit has an image-stabilizing lens subunit of negative refractive power, and the image-stabilizing lens subunit is movable in such a way as to have a component perpendicular to an optical axis of the zoom lens so as to displace an image.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWINGS

FIGS. 8A to 8C are aberration diagrams showing lateral aberrations at the wide-angle end in the zoom lens according to the numerical example 1.

FIGS. 9A to 9C are aberration diagrams showing lateral aberrations at the middle focal length in the zoom lens according to the numerical example 1.

FIGS. 10A to 10C are aberration diagrams showing lateral aberrations at the telephoto end in the zoom lens according to the numerical example 1.

FIGS. 11A to 11C are aberration diagrams showing lateral aberrations, with the image height being ±4 mm and 0 mm, respectively, when an image-stabilizing lens subunit has shifted 1.5 mm at the wide-angle end in the zoom lens according to the numerical example 1.

FIGS. 12A to 12C are aberration diagrams showing lateral aberrations, with the image height being ±4 mm and 0 mm, respectively, when the image-stabilizing lens subunit has shifted 1.5 mm at the middle focal length in the zoom lens according to the numerical example 1.

FIGS. 13A to 13C are aberration diagrams showing lateral aberrations, with the image height being ±4 mm and 0 mm, respectively, when the image-stabilizing lens subunit has shifted 1.5 mm at the telephoto end in the zoom lens according to the numerical example 1.

FIGS. 19A to 19C are aberration diagrams showing lateral aberrations at the wide-angle end in the zoom lens according to the numerical example 2.

FIGS. 20A to 20C are aberration diagrams showing lateral aberrations at the middle focal length in the zoom lens according to the numerical example 2.

FIGS. 21A to 21C are aberration diagrams showing lateral aberrations at the telephoto end in the zoom lens according to the numerical example 2.

FIGS. 22A to 22C are aberration diagrams showing lateral aberrations, with the image height being ±4 mm and 0 mm, respectively, when an image-stabilizing lens subunit has shifted 1.5 mm at the wide-angle end in the zoom lens according to the numerical example 2.

FIGS. 23A to 23C are aberration diagrams showing lateral aberrations, with the image height being ±4 mm and 0 mm, respectively, when the image-stabilizing lens subunit has shifted 1.5 mm at the middle focal length in the zoom lens according to the numerical example 2.

FIGS. 24A to 24C are aberration diagrams showing lateral aberrations, with the image height being ±4 mm and 0 mm, respectively, when the image-stabilizing lens subunit has shifted 1.5 mm at the telephoto end in the zoom lens according to the numerical example 2.

FIGS. 30A to 30C are aberration diagrams showing lateral aberrations at the wide-angle end in the zoom lens according to the numerical example 3.

FIGS. 31A to 31C are aberration diagrams showing lateral aberrations at the middle focal length in the zoom lens according to the numerical example 3.

FIGS. 32A to 32C are aberration diagrams showing lateral aberrations at the telephoto end in the zoom lens according to the numerical example 3.

FIGS. 33A to 33C are aberration diagrams showing lateral aberrations, with the image height being ±4 mm and 0 mm, respectively, when an image-stabilizing lens subunit has shifted 1.0 mm at the wide-angle end in the zoom lens according to the numerical example 3.

FIGS. 34A to 34C are aberration diagrams showing lateral aberrations, with the image height being ±4 mm and 0 mm, respectively, when the image-stabilizing lens subunit has shifted 1.0 mm at the middle focal length in the zoom lens according to the numerical example 3.

FIGS. 35A to 35C are aberration diagrams showing lateral aberrations, with the image height being ±4 mm and 0 mm, respectively, when the image-stabilizing lens subunit has shifted 1.0 mm at the telephoto end in the zoom lens according to the numerical example 3.

FIGS. 39A to 39C are aberration diagrams showing longitudinal aberrations at the wide-angle end in the zoom lens according to the numerical example 4.

FIGS. 40A to 40C are aberration diagrams showing longitudinal aberrations at the middle focal length in the zoom lens according to the numerical example 4.

FIGS. 41A to 41C are aberration diagrams showing longitudinal aberrations at the telephoto end in the zoom lens according to the numerical example 4.

FIGS. 42A to 42C are aberration diagrams showing lateral aberrations at the wide-angle end in the zoom lens according to the numerical example 4.

FIGS. 43A to 43C are aberration diagrams showing lateral aberrations at the middle focal length in the zoom lens according to the numerical example 4.

FIGS. 44A to 44C are aberration diagrams showing lateral aberrations at the telephoto end in the zoom lens according to the numerical example 4.

FIGS. 45A to 45C are aberration diagrams showing lateral aberrations, with the image height being ±4 mm and 0 mm, respectively, when an image-stabilizing lens subunit has shifted 1.0 mm at the wide-angle end in the zoom lens according to the numerical example 4.

FIGS. 46A to 46C are aberration diagrams showing lateral aberrations, with the image height being ±4 mm and 0 mm, respectively, when the image-stabilizing lens subunit has shifted 1.0 mm at the middle focal length in the zoom lens according to the numerical example 4.

FIGS. 47A to 47C are aberration diagrams showing lateral aberrations, with the image height being ±4 mm and 0 mm, respectively, when the image-stabilizing lens subunit has shifted 1.0 mm at the telephoto end in the zoom lens according to the numerical example 4.

FIGS. 50A to 50C are aberration diagrams showing longitudinal aberrations at the wide-angle end in the zoom lens according to the numerical example 5.

FIGS. 51A to 51C are aberration diagrams showing longitudinal aberrations at the middle focal length in the zoom lens according to the numerical example 5.

FIGS. 52A to 52C are aberration diagrams showing longitudinal aberrations at the telephoto end in the zoom lens according to the numerical example 5.

FIGS. 53A to 53C are aberration diagrams showing lateral aberrations at the wide-angle end in the zoom lens according to the numerical example 5.

FIGS. 54A to 54C are aberration diagrams showing lateral aberrations at the middle focal length in the zoom lens according to the numerical example 5.

FIGS. 55A to 55C are aberration diagrams showing lateral aberrations at the telephoto end in the zoom lens according to the numerical example 5.

FIGS. 56A to 56C are aberration diagrams showing lateral aberrations, with the image height being ±4 mm and 0 mm, respectively, when an image-stabilizing lens subunit has shifted 1.0 mm at the wide-angle end in the zoom lens according to the numerical example 5.

FIGS. 57A to 57C are aberration diagrams showing lateral aberrations, with the image height being ±4 mm and 0 mm, respectively, when the image-stabilizing lens subunit has shifted 1.0 mm at the middle focal length in the zoom lens according to the numerical example 5.

FIGS. 58A to 58C are aberration diagrams showing lateral aberrations, with the image height being ±4 mm and 0 mm, respectively, when the image-stabilizing lens subunit has shifted 1.0 mm at the telephoto end in the zoom lens according to the numerical example 5.

FIGS. 64A to 64C are aberration diagrams showing lateral aberrations at the wide-angle end in the zoom lens according to the numerical example 6.

FIGS. 65A to 65C are aberration diagrams showing lateral aberrations at the middle focal length in the zoom lens according to the numerical example 6.

FIGS. 66A to 66C are aberration diagrams showing lateral aberrations at the telephoto end in the zoom lens according to the numerical example 6.

FIGS. 67A to 67C are aberration diagrams showing lateral aberrations, with the image height being ±4 mm and 0 mm, respectively, when an image-stabilizing lens subunit has shifted 1.0 mm at the wide-angle end in the zoom lens according to the numerical example 6.

FIGS. 68A to 68C are aberration diagrams showing lateral aberrations, with the image height being ±4 mm and 0 mm, respectively, when the image-stabilizing lens subunit has shifted 1.0 mm at the middle focal length in the zoom lens according to the numerical example 6.

FIGS. 69A to 69C are aberration diagrams showing lateral aberrations, with the image height being ±4 mm and 0 mm, respectively, when the image-stabilizing lens subunit has shifted 1.0 mm at the telephoto end in the zoom lens according to the numerical example 6.

DETAILED DESCRIPTION OF THE INVENTION

Figure 1:
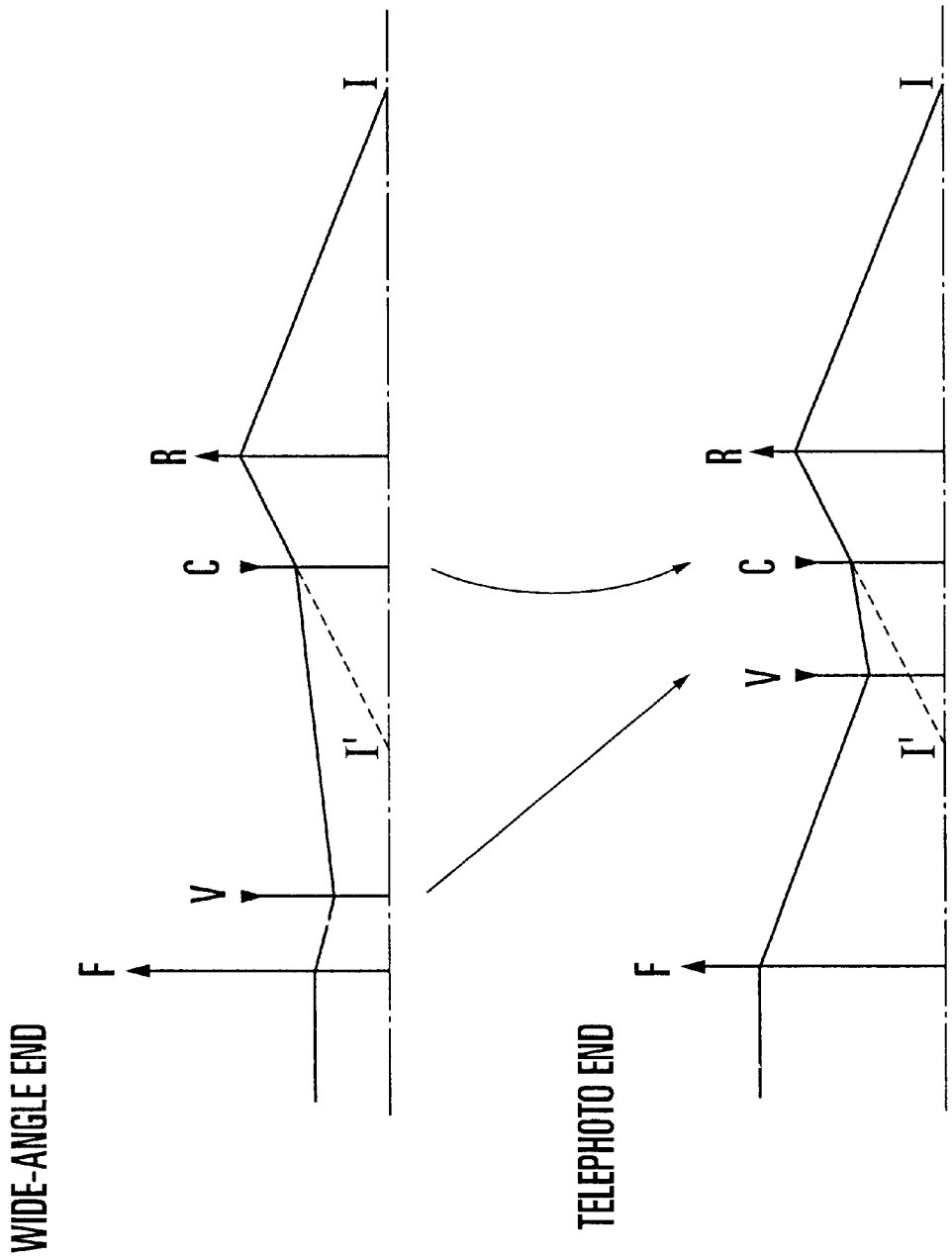
FIG. 1 is a conceptual optical path diagram for explaining the action of an image-stabilizing zoom lens according to the invention.

Hereinafter, preferred embodiments of the invention will be described in detail with reference to the drawings.

First, the occurrence of decentering aberration when a lens unit that is a part of an optical system has been moved to decenter in a direction perpendicular to the optical axis will be discussed, from the standpoint of aberration theory, on the basis of the method shown by Matsui in the 23rd Applied Physics Lecture Meeting in Japan (1962). Twelve equations (a), (b), (c), (d), (e), (f), (g), (h), (i), (j), (k) and (l) to be used in the description here are as follows:

$$\Delta'Y = \Delta Y + \Delta Y(E) \tag{a}$$

$$\Delta Y(E) = -\frac{E}{2\alpha'_k}[R^2(2 + \cos 2\phi_R)(IIE) + \tag{b}$$
$$2R(N_1 \tan\omega)[\{2\cos(\phi_R - \phi_\omega) + \cos(\phi_R + \phi_\omega)\}(IIIE) + \cos\phi_R\phi_\omega(PE)] +$$
$$(N_1 \tan\omega)^2\{(2 + 2\cos\phi_\omega)(VEI) - (VE2)\}] - \frac{1}{2\alpha'_k}\{E(\Delta E)\}$$

$$(IIE) = \alpha'_p II_q - \alpha_p(II_p + II_q) - \overline{\alpha'_p} I_q + \overline{\alpha_p}(I_p + I_q) \tag{c}$$

$$(IIIE) = \alpha'_p III_q - \alpha_p(III_p III_q) - \overline{\alpha'_p} II_q + \overline{\alpha'_p}(II_p + II_q) \tag{d}$$

$$(PE) = \alpha'_p P_q - \alpha_p (P_p + P_q) \quad (e)$$

$$(VE1) = \alpha'_p V_q - \alpha_p (V_p + V_q) - \overline{\alpha'_p} III_q + \overline{\alpha'_p}(III_p + III_q) \quad (f)$$

$$(VE2) = \overline{\alpha'_p} P_q - \overline{\alpha_p}(P_p + P_q) \quad (g)$$

$$(\Delta E) = -2(\alpha'_p - \alpha_p) \quad (h)$$

$$\Delta cYa = \Delta cY + \Delta cY(E) \quad (i)$$

$$\Delta cY = -\frac{1}{\alpha'_k}\{LR\cos\phi_R + TN\tan\omega\cos\phi_\omega\} \quad (j)$$

$$\Delta cY(E) = -\frac{E}{\alpha'_k}(TE) \quad (k)$$

$$(TE) = \alpha'_p T_q - \alpha_p(T_p + T_q) - \overline{\alpha'_p}L_q + \overline{\alpha_p}(L_p + L_q) \quad (l)$$

The amount of aberration Δ'Y of the entire lens system occurring when a lens unit p that is a part of the photographic lens is parallel-decentered by a distance E becomes the sum of the amount of aberration ΔY occurring before the parallel-decentering and the amount of decentering aberration ΔY (E) produced by the parallel-decentering, as shown in the equation (a).

Here, the amount of decentering aberration ΔY (E) is represented, as shown in the equation (b), by using primary decentering coma (IIE), primary decentering astigmatism (IIIE), primary decentering curvature of field (PE), primary decentering distortion (VE1), primary decentering surplus distortion (VE2) and primary original point shift ΔE.

Also, the various aberrations (IIE) to (ΔE) shown in the equations (c) to (h) are represented by using aberration coefficients $I_p$, $II_p$, $III_p$, $P_p$ and $V_p$ of the decentering lens unit and aberration coefficients $I_q$, $II_q$, $III_q$, $P_q$ and $V_q$ of a lens system disposed on the image side of the decentering lens unit, where, when the focal length of the entire lens system is normalized to "1", an incidence angle and an exit angle of an on-axial marginal ray of light on and from the decentering lens unit are denoted by $\alpha_p$ and $\alpha_p'$, respectively, and an incidence angle and an exit angle of a principal ray passing through the pupil center are denoted by $\overline{\alpha_p}$ and $\overline{\alpha'_p}$, respectively.

Similarly, the amount of chromatic aberration ΔcYa of the entire lens system occurring when the lens unit p is parallel-decentered by the distance E becomes the sum of the amount of chromatic aberration ΔcY occurring before the parallel-decentering and the amount of decentering chromatic aberration ΔcY(E) produced by the parallel-decentering, as shown in the equation (i).

Here, the amount of chromatic aberration ΔcY occurring before the parallel-decentering and the amount of decentering chromatic aberration ΔcY(E) produced by the parallel-decentering can be expressed by using longitudinal chromatic aberration L, lateral chromatic aberration T and primary decentering chromatic aberration TE, as shown in the equations (j) and (k).

Also, the primary decentering chromatic aberration TE in the equation (l) can be expressed by using chromatic aberration coefficients $L_p$ and $T_p$ of the lens unit p and chromatic aberration coefficients $L_q$ and $T_q$ of the whole lens system disposed on the image side of the decentering lens unit.

Among the above items, the one that represents the movement of an image caused by the decentering is the primary original point shift (ΔE), and the ones that influence the image forming performance are the primary decentering coma (IIE), primary decentering astigmatism (IIIE), primary decentering curvature of field (PE) and primary decentering chromatic aberration (TE).

In order to lessen the occurrence of decentering aberration, first, it is necessary to lessen the amount of decentering E of the lens unit p, as indicated in the equation (b).

In order to lessen the occurrence of decentering aberration, secondly, with a view to making the various decentering aberrations of the lens unit p shown in the equations (c) to (g) very small, it becomes necessary to set each of the various aberration coefficients $I_p$, $II_p$, $III_p$, $P_p$ and $V_p$ of the lens unit p to a small value, or it becomes necessary to set the various aberration coefficients $I_p$, $II_p$, $III_p$, $P_p$ and $V_p$ in a well-balanced manner in such a way as to cancel each other.

In particular, in order for each of the various decentering aberrations shown in the equations (c) to (g) to have a small value, it becomes necessary to set the converted inclination angles of a paraxial ray incident on and exiting from the parallel-decentering lens unit p, the tertiary aberration coefficients of the lens unit p, and the tertiary aberration coefficients of the whole lens unit q disposed on the image side of the lens unit p, to the respective appropriate values. In other words, in order to eliminate the deterioration of a central image occurring when the lens unit is parallel-decentered in a direction perpendicular to the optical axis, it becomes necessary to correct well, mainly, the primary decentering coma shown in the equation (c), and, at the same time, in order to correct well one-sided blurring occurring when the lens unit is parallel-decentered, it becomes necessary to correct well, mainly, the primary decentering curvature of field shown in the equation (d). As a matter of course, it is necessary to correct well the other various aberrations.

In order to lessen the occurrence of decentering aberration, thirdly, with a view to making the decentering chromatic aberration (TE) shown in the equation (l) very small, it becomes necessary to set the chromatic aberration coefficients of the lens unit p and the whole lens unit q disposed on the image side of the lens unit p, to the respective appropriate values.

The invention aims at providing an image-stabilizing zoom lens having high optical performance over the entire zooming range even during an image stabilizing operation, and at attaining the reduction in size of the whole image stabilizing device.

FIG. 1 is a conceptual diagram of the image-stabilizing zoom lens according to an embodiment of the invention. In FIG. 1, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system. Reference character SP denotes an aperture stop, and reference character R denotes a stationary relay lens unit, serving as a fourth lens unit, of positive refractive power as a whole. Since an image point I' formed by the lens unit F through the lens unit C does not vary in position during the variation of magnification, when taking into consideration the image forming relationship of the relay lens unit R only, the arrangement and the paraxial tracing value of the relay lens unit R are unvaried irrespective of the variation of magnification. Therefore, by disposing an image-stabilizing lens subunit in a lens unit disposed on the image side of the magnification varying lens units and arranged to be stationary during the variation of magnification, it is possible to prevent the variation of the various decentering aberrations due to the variation of magnification.

Next, an embodiment of the zoom lens in a case where the image-stabilizing lens subunit has a positive refractive power will be described in detail.

The amount of decentering EIS of the image-stabilizing lens subunit required for obtaining a predetermined amount of image-shake correction $\Delta Y$ on an image plane is expressed by the following equation (m) on the basis of the equation (b) with R=0, $\omega$=0 and $\alpha_k'$=1.

$$EIS=-\Delta Y/\{2(\Delta E)\} \tag{m}$$

Since the primary original point shift ($\Delta E$) is expressed by the equation (h), the amount of decentering EIS required for obtaining a necessary amount of image-shake correction $\Delta Y$ is defined by using a converted inclination angle of incidence $\alpha$ and a converted inclination angle of exit $\alpha'$ of an on-axial marginal ray on and from the image-stabilizing lens subunit.

Accordingly, the zoom lens according to the present embodiment is made to satisfy the following condition (1):

$$0.45<(\alpha'-\alpha) \tag{1}$$

If the condition (1) is not satisfied, the increase of the amount of decentering EIS causes the amount of movement of the image-stabilizing lens subunit to increase rapidly, and, in addition, the effective diameter of the image-stabilizing lens subunit is increased in consideration of the decentering, so that the required driving force increases rapidly, resulting in an increase in size of the whole mechanism. Further, in association with the increase of the amount of decentering EIS, the occurrence of decentering aberration becomes large, so that the optical performance during the image stabilizing operation deteriorates.

Further, in order for the condition (1) to be satisfied, it becomes necessary that a lens construction arranged to refract an on-axial light flux strongly should be included in the fourth lens unit. However, if such a lens construction is disposed near an exit portion of the zoom lens in which an on-axial light flux is refracted strongly, there would disadvantageously arise a problem in respect of an optical or mechanical interface with a television camera due to the arrangement of a driving device or the like. In addition, if such a lens construction is newly provided in the fourth lens unit, the number of constituent lens elements required for securing a refractive power or correcting aberration would be caused to increase, thereby increasing the size of the entire zoom lens.

Therefore, the refractive power arrangement of the first lens unit, the second lens unit and the third lens unit is appropriately set to cause rays passing through the third lens unit to have a diverging action, and a positive lens having an appropriate refractive power is disposed in a space in which the diverging action occurs, so that it becomes possible to relatively easily attain, while avoiding the above-mentioned problem, a lens construction arranged to refract an on-axial light flux strongly.

Since, from the viewpoint of the equations (c) to (g), in order to correct decentering aberrations caused by the image-stabilizing lens subunit, it is necessary to appropriately control the various shared values of aberration coefficients of the image-stabilizing lens subunit, it is preferable that the image-stabilizing lens subunit is composed of at least one positive lens and at least one negative lens. By this arrangement, it becomes easy to control the various shared values of aberration coefficients of the image-stabilizing lens subunit. Thus, it becomes easy to correct decentering aberrations, so that the various decentering aberrations, such as decentering coma and decentering curvature of field, can be prevented from easily occurring during the image stabilizing operation.

Further, from the viewpoint of the equation (l), in order to correct decentering chromatic aberrations caused by the image-stabilizing lens subunit, it is necessary to appropriately control the various shared values of chromatic aberration coefficients of the image-stabilizing lens subunit. Accordingly, the zoom lens is made to satisfy the following condition (2):

$$30<(\nu p-\nu n) \tag{2}$$

where $\nu p$ is, when the image-stabilizing lens subunit includes only one positive lens, an Abbe number of the positive lens included in the image-stabilizing lens subunit or, when the image-stabilizing lens subunit includes a plurality of positive lenses, a mean value of Abbe numbers of all the positive lenses included in the image-stabilizing lens subunit, and $\nu n$ is, when the image-stabilizing lens subunit includes only one negative lens, an Abbe number of the negative lens included in the image-stabilizing lens subunit or, when the image-stabilizing lens subunit includes a plurality of negative lenses, a mean value of Abbe numbers of all the negative lenses included in the image-stabilizing lens subunit.

If the condition (2) is not satisfied, it becomes difficult to control the various chromatic aberration coefficients of the image-stabilizing lens subunit. Thus, it becomes difficult to correct decentering chromatic aberrations, so that the asymmetry of color becomes apt to occur during the image stabilizing operation.

Next, an embodiment of the zoom lens in a case where the image-stabilizing lens subunit has a negative refractive power will be described in detail.

The amount of decentering E4s of the image-stabilizing lens subunit required for obtaining a predetermined amount of image-shake correction $\Delta Y$ on an image plane is expressed by the following equation (n) on the basis of the equation (b) with R=0, $\omega$=0 and $\alpha_k'$=1.

$$E4s=-\Delta Y/\{2(\Delta E)\} \tag{n}$$

Since the primary original point shift ($\Delta E$) is expressed by the equation (h), the amount of decentering E4s required for obtaining a necessary amount of image-shake correction $\Delta Y$ is defined by using a converted inclination angle of incidence $\alpha 2$ and a converted inclination angle of exit $\alpha 2'$ of an on-axial marginal ray on and from the image-stabilizing lens subunit.

Accordingly, the zoom lens according to the present embodiment is made to satisfy the following condition (3):

$$-0.45>(\alpha 2'-\alpha 2) \tag{3}$$

If the condition (3) is not satisfied, the increase of the amount of decentering E4s causes the amount of movement of the image-stabilizing lens subunit to increase rapidly, and, in addition, the effective diameter of the image-stabilizing lens subunit is increased in consideration of the decentering, so that the required driving force increases rapidly, resulting in an increase in size of the whole mechanism. Further, in association with the increase of the amount of decentering E4s, the occurrence of decentering aberration becomes large, so that the optical performance during the image stabilizing operation deteriorates.

Further, in order for the condition (3) to be satisfied, it becomes necessary that a lens construction arranged to refract an on-axial light flux strongly should be included in the fourth lens unit. However, if such a lens construction is disposed near an exit portion of the zoom lens in which an on-axial light flux is refracted strongly, there would disadvantageously arise a problem in respect of an optical or mechanical interface with a television camera due to the arrangement of a driving device or the like. In addition, if such a lens construction is newly provided in the fourth lens unit, the number of constituent lens elements required for securing a refractive power or correcting aberration would be caused to increase, thereby increasing the size of the entire zoom lens.

Therefore, the refractive power arrangement of the first lens unit, the second lens unit and the third lens unit is appropriately set to make the magnification varying part compact and to convert diverging rays exiting from the magnification varying part into converging rays by utilizing a plurality of lens elements on the object side of the fourth lens unit of positive refractive power.

As a result, it is possible to prevent the effective diameter of the whole fourth lens unit from increasing, and it is possible to reduce not only the size of the relay lens unit but also the size of a focal-length changeover subunit (to be described later in detail).

Then, a negative lens having an appropriate refractive power is disposed in a space of the fourth lens unit in which the diverging action occurs, so that it becomes possible to relatively easily attain, while avoiding the above-mentioned problem, a lens construction arranged to refract an on-axial light flux strongly.

Since, from the viewpoint of the equations (c) to (g), in order to correct decentering aberrations caused by the image-stabilizing lens subunit, it is necessary to appropriately control the various shared values of aberration coefficients of the image-stabilizing lens subunit, it is preferable that the image-stabilizing lens subunit is composed of at least one negative lens and at least one positive lens. By this arrangement, it becomes easy to control the various shared values of aberration coefficients of the image-stabilizing lens subunit. Thus, it becomes easy to correct decentering aberrations, so that the various decentering aberrations, such as decentering coma and decentering curvature of field, can be prevented from easily occurring during the image stabilizing operation.

Further, from the viewpoint of the equation (l), in order to correct decentering chromatic aberrations caused by the image-stabilizing lens subunit, it is necessary to appropriately control the various shared values of chromatic aberration coefficients of the image-stabilizing lens subunit. Accordingly, the zoom lens is made to satisfy the following condition (4):

$$10 < (vn2 - vp2) \quad (4)$$

where vn2 is, when the image-stabilizing lens subunit includes only one negative lens, an Abbe number of the negative lens included in the image-stabilizing lens subunit or, when the image-stabilizing lens subunit includes a plurality of negative lenses, a mean value of Abbe numbers of all the negative lenses included in the image-stabilizing lens subunit, and vp2 is, when the image-stabilizing lens subunit includes only one positive lens, an Abbe number of the positive lens included in the image-stabilizing lens subunit or, when the image-stabilizing lens subunit includes a plurality of positive lenses, a mean value of Abbe numbers of all the positive lenses included in the image-stabilizing lens subunit.

If the condition (4) is not satisfied, it becomes difficult to control the various chromatic aberration coefficients of the image-stabilizing lens subunit. Thus, it becomes difficult to correct decentering chromatic aberrations, so that the asymmetry of color becomes apt to occur during the image stabilizing operation.

In the following, the lens construction common to both the embodiments in a case where the image-stabilizing lens subunit has a positive refractive power and in a case where the image-stabilizing lens subunit has a negative refractive power will be described.

From the viewpoint of the equations (c) to (g), in order to correct decentering aberrations caused by the image-stabilizing lens subunit, it is necessary to appropriately control the various shared values of aberration coefficients of a lens subunit disposed on the image side of the image-stabilizing lens subunit in the fourth lens unit. Accordingly, the lens subunit disposed on the image side of the image-stabilizing lens subunit in the fourth lens unit is made to be composed of at least one negative lens and a plurality of positive lenses. If the lens subunit disposed on the image side of the image-stabilizing lens subunit is not made to be composed of at least one negative lens and a plurality of positive lenses, it becomes difficult to control the various shared values of aberration coefficients. Thus, it becomes difficult to correct decentering aberrations, so that the various decentering aberrations, such as decentering coma and decentering curvature of field, become apt to occur.

Further, from the viewpoint of the equation (l), in order to correct decentering chromatic aberrations caused by the image-stabilizing lens subunit, it is necessary to appropriately control the various shared values of chromatic aberration coefficients of the lens subunit disposed on the image side of the image-stabilizing lens subunit in the fourth lens unit.

Accordingly, it is desirable that the zoom lens is made to satisfy the following condition (5):

$$10 < (vp(4R) - vn(4R)) \quad (5)$$

where vp(4R) is a mean value of Abbe numbers of all the positive lenses included in the lens subunit disposed on the image side of the image-stabilizing lens subunit in the fourth lens unit, and vn (4R) is, when the lens subunit disposed on the image side of the image-stabilizing lens subunit in the fourth lens unit includes only one negative lens, an Abbe number of the negative lens included in the lens subunit disposed on the image side of the image-stabilizing lens subunit in the fourth lens unit or, when the lens subunit disposed on the image side of the image-stabilizing lens subunit in the fourth lens unit includes a plurality of negative lenses, a mean value of Abbe numbers of all the negative lenses included in the lens subunit disposed on the image side of the image-stabilizing lens subunit in the fourth lens unit.

Thus, such achromatism is desirable that a mean value of Abbe numbers of the positive lenses is larger than an Abbe number of the negative lens or a mean value of Abbe numbers of the negative lenses, and the difference therebetween exceeds "10".

If the condition (5) is not satisfied, it becomes difficult to control the various chromatic aberration coefficients of the lens subunit disposed on the image side of the image-stabilizing lens subunit in the fourth lens unit. Thus, it becomes difficult to correct decentering chromatic aberrations of the image-stabilizing lens subunit, so that the asymmetry of color becomes apt to occur during the image stabilizing operation.

Further, in the present embodiment, the aperture stop SP is disposed in a space close to the image-stabilizing lens subunit on the object side or the image side thereof, so that it becomes possible for an off-axial ray to pass through approximately the central portion of the image-stabilizing lens subunit. Thus, since it is possible to restrain, as much as possible, an optical path of the off-axial ray from varying when the image-stabilizing lens subunit is moved for decentering, in particular, the variations of decentering aberrations related to an off-axial ray, such as primary decentering curvature of field (PE), primary decentering distortion (VE1) and primary decentering surplus distortion (VE2), are mitigated.

Further, in the present embodiment, an optical system for change over the focal length of the entire zoom lens, i.e., a focal-length changeover subunit, can be detachably inserted into the fourth lens unit on the optical axis on the image side of the image-stabilizing lens subunit. In other words, an optical system for shifting the range of variable magnification toward the telephoto side or the wide-angle side can be made to be located on the image side of the image-stabilizing lens subunit by such a unit switching method as to detachably insert a lens unit, such as a built-in extender. In that instance, it is unnecessary to change the control of the image-stabilizing lens subunit before and after the shift of the range of variable magnification. Since the disposition of lens units on the object side of the image-stabilizing lens subunit does not change before and after the changeover of the focal length due to the insertion or detachment of the focal-length changeover subunit, the amount of decentering E of the image-stabilizing lens subunit required for obtaining a desired correction angle θ also does not change, so that it is unnecessary to change the control of the image-stabilizing lens subunit.

Further, in the present embodiment, the third lens unit is composed of at least one negative lens and at least one positive lens, and the differences in refractive index and Abbe number between such both lens elements are respectively set to appropriate values. Accordingly, while it is, of course, possible to correct the variation of chromatic aberration and spherical aberration caused by zooming, it is possible to lessen spherical aberration and chromatic aberration at the wide-angle end born by the fourth lens unit in the entire zoom lens, so that the influence of decentering aberration on the fourth lens unit also can be mitigated.

As has been described, according to the invention, the refractive power arrangement of the entire lens system, the arrangement of the magnification varying lens units, the arrangement of the image-stabilizing lens subunit and the arrangement of the lens subunit disposed on the image side of the image-stabilizing lens subunit are appropriately set. Accordingly, it is possible to attain an image-stabilizing zoom lens excellent in optical performance even during the image stabilizing operation with the influence of the decentering movement of the image-stabilizing lens subunit on the optical performance minimized while reducing the image-stabilizing lens subunit in size and weight.

NUMERICAL EXAMPLE 1

Numerical data of the numerical example 1 of the image-stabilizing zoom lens are shown in Table-1.

TABLE 1

$f = 8.50 - 127.50$    $Fno = 1:1.7 - 2.0$    $2\omega = 65.8° - 4.9°$

| | | | |
|---|---|---|---|
| r1 = −251.088 | d1 = 2.00 | n1 = 1.81265 | v1 = 25.4 |
| r2 = 157.249 | d2 = 7.22 | | |
| r3 = 234.983 | d3 = 10.06 | n2 = 1.43985 | v2 = 95.0 |
| r4 = −158.211 | d4 = 7.14 | | |
| r5 = 162.538 | d5 = 8.51 | n3 = 1.49845 | v3 = 81.5 |
| r6 = −316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |
| r13 = −41.835 | d13 = 0.80 | n7 = 1.77621 | v7 = 49.6 |
| r14 = 60.569 | d14 = 1.99 | | |
| r15 = 33.469 | d15 = 5.53 | n8 = 1.85501 | v8 = 23.9 |
| r16 = −41.646 | d16 = 1.17 | | |
| r17 = −28.573 | d17 = 0.80 | n9 = 1.77621 | v9 = 49.6 |
| r18 = 133.163* | d18 = Variable | | |
| r19 = −27.765 | d19 = 0.80 | n10 = 1.77621 | v10 = 49.6 |
| r20 = 41.769 | d20 = 2.81 | n11 = 1.85501 | v11 = 23.9 |
| r21 = −859.593 | d21 = Variable | | |
| r22 = ∞ | d22 = 4.55 | n12 = 1.58482 | v12 = 40.8 |
| r23 = −44.513 | d23 = 1.00 | | |
| r24 = Stop | d24 = 1.00 | | |
| r25 = 879.665 | d25 = 8.06 | n13 = 1.62033 | v13 = 63.3 |
| r26 = −28.968 | d26 = 0.42 | | |
| r27 = −28.554 | d27 = 1.15 | n14 = 1.72310 | v14 = 29.5 |
| r28 = −55.128 | d28 = 1.50 | | |
| r29 = 33.506 | d29 = 16.00 | n15 = 1.58482 | v15 = 40.8 |
| r30 = −31.852 | d30 = 1.50 | n16 = 1.83945 | v16 = 42.7 |
| r31 = 31.852 | d31 = 16.00 | n17 = 1.51976 | v17 = 52.4 |
| r32 = −647.299 | d32 = 1.50 | | |
| r33 = 109.155 | d33 = 5.85 | n18 = 1.51976 | v18 = 52.4 |
| r34 = −32.897 | d34 = 1.00 | | |
| r35 = −52.506 | d35 = 1.15 | n19 = 1.83945 | v19 = 42.7 |
| r36 = 24.243 | d36 = 8.04 | n20 = 1.51976 | v20 = 52.4 |
| r37 = −71.061 | d37 = 2.00 | | |
| r38 = 67.141 | d38 = 6.96 | n21 = 1.48915 | v21 = 70.2 |
| r39 = −24.280 | d39 = 1.15 | n22 = 1.72538 | v22 = 34.7 |
| r40 = −106.741 | d40 = 0.20 | | |
| r41 = 45.382 | d41 = 6.33 | n23 = 1.48915 | v23 = 70.2 |
| r42 = −50.326 | d42 = 4.50 | | |
| r43 = ∞ | d43 = 30.00 | n24 = 1.60718 | v24 = 38.0 |
| r44 = ∞ | d44 = 16.20 | n25 = 1.51825 | v25 = 64.2 |
| r45 = ∞ | | | |

*Aspheric Surface

In the numerical data, ri is the radius of curvature of the i-th lens surface, when counted from the object side, di is the i-th lens thickness or air separation, when counted from the object side, and ni and vi are respectively the refractive index and Abbe number of material of the i-th lens element, when counted from the object side.

The air separations d10, d18 and d21 each are variable, and the values of the air separations d10, d18 and d21 obtained when the focal length is 8.50, 51.00 and 127.50, respectively, are shown in Table-2. These values apply also to the numerical example 2 and the numerical example 3 equally.

TABLE 2

| Variable Separation | Focal Length | | |
|---|---|---|---|
| | 8.50 | 51.00 | 127.50 |
| d10 | 1.32 | 41.58 | 50.12 |
| d18 | 51.65 | 7.31 | 5.67 |
| d21 | 4.00 | 8.08 | 1.18 |

Each of the eleventh surface (r11) and the eighteenth surface (r18) is an aspheric surface.

The shape of an aspheric surface is expressed in the coordinates with an X axis in the optical axis direction and an H axis in the direction perpendicular to the optical axis, the direction in which light advances being taken as positive, by the following equation:

$$X = \frac{H^2/R}{1+\sqrt{1-(1+k)(H/R)^2}} + BH^4 + CH^6 + DH^8 + EH^{10}$$

where R is the radius of osculating sphere, i.e., the radius of reference sphere, and k, B, C, D and E are aspheric coefficients.

The value of the radius R of reference sphere and the values of the aspheric coefficients k, B, C, D and E are shown in Table-3. In Table-3, for example, "3.2131D$^{-6}$" means "3.2131×10$^{-6}$". These values apply also to the numerical example 2 and the numerical example 3 equally.

Figure 2:
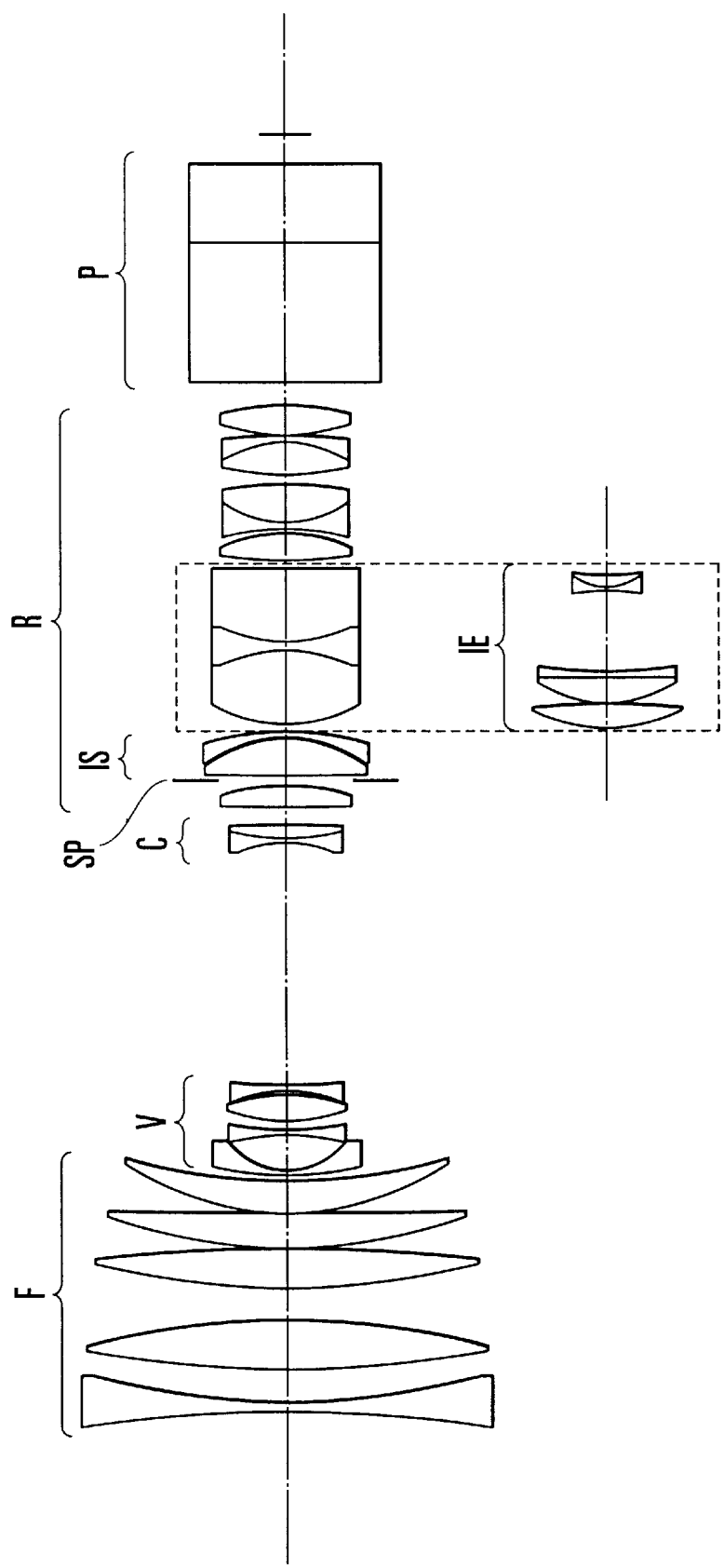
FIG. 2 is a sectional view showing the construction of a zoom lens at the wide-angle end according to a numerical example 1 of the invention.

TABLE 3 r11:
Radius R of reference sphere = 78.91221
Aspheric coefficients
k = −3.23637D$^{-2}$
B = 3.21318D$^{-6}$
C = −3.97113D$^{-9}$
D = −1.48889D$^{11}$
E = 3.06352D$^{14}$
r18:
Radius R of reference sphere = 133.16287
Aspheric coefficients
k = −3.66073D$^{-2}$
B = −1.07011D$^{-7}$
C = 9.22594D$^{-9}$
D = −1.68952D$^{10}$
E = 4.38262D$^{13}$ FIG. 2 is a sectional view showing the construction of the image-stabilizing zoom lens at the wide-angle end according to the numerical example 1 of the invention. In FIG. 2, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 2.

The surfaces r29 to r32 represent a lens subunit for exclusive use for unit magnification for satisfying the focal length f=8.5 mm at the wide-angle end of the zoom lens. The focal length at the wide-angle end of the zoom lens can be shifted to the telephoto side or the wide-angle side by placing a focal-length changeover subunit (IE) exclusively in place of the lens subunit for exclusive use for unit magnification.

Figure 3:
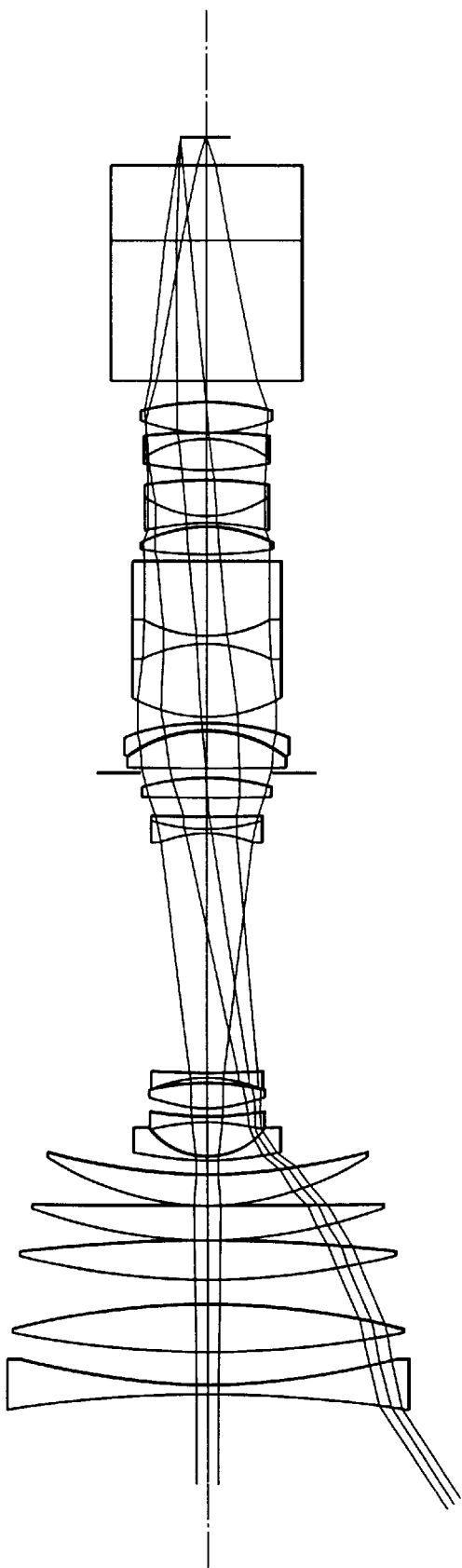
FIG. 3 is an optical path diagram for explaining the position of a fourth lens unit in the numerical example 1.
Figure 4:
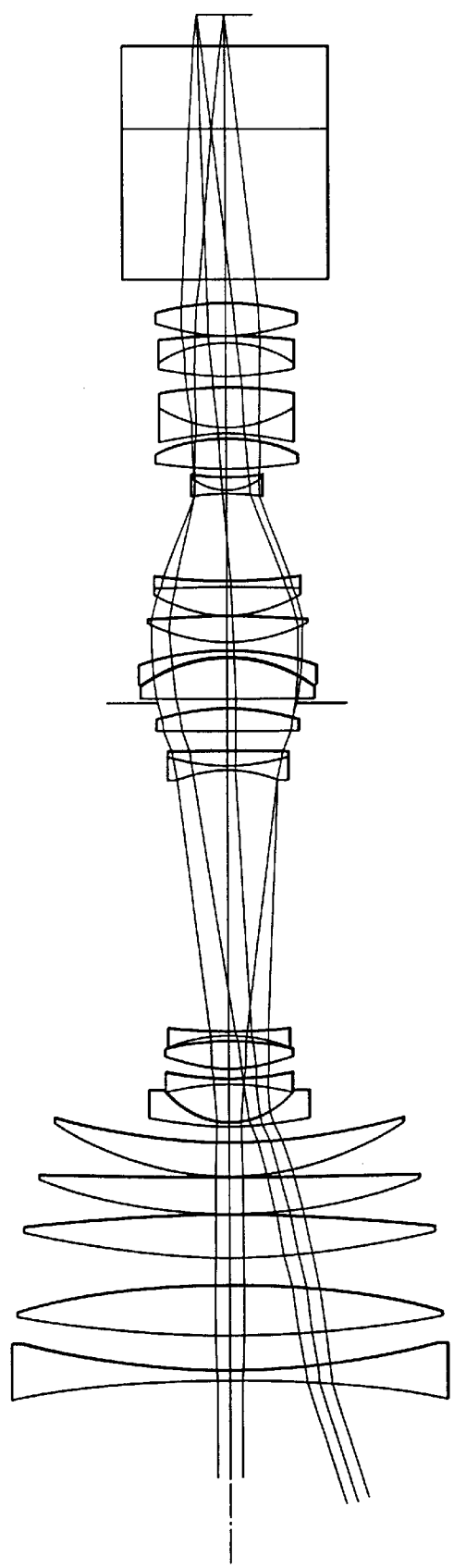
FIG. 4 is an optical path diagram for explaining the position of the fourth lens unit, in which a focal-length changeover subunit is alternatively included, in the numerical example 1.
Figure 5A:
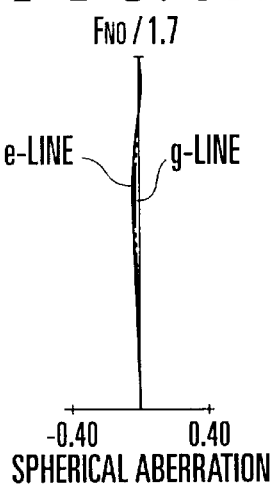
FIGS. 5A to 5C are aberration diagrams showing longitudinal aberrations at the wide-angle end in the zoom lens according to the numerical example 1.
Figure 5B:
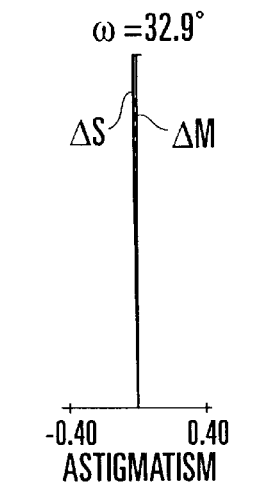
Figure 5C:
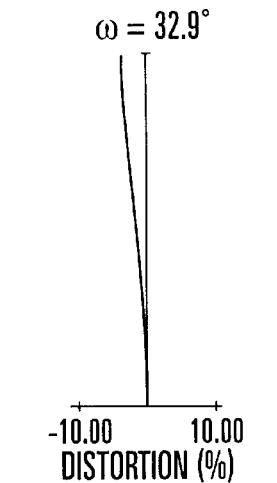
Figure 6A:
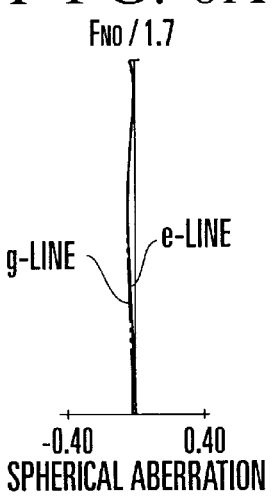
FIGS. 6A to 6C are aberration diagrams showing longitudinal aberrations at the middle focal length in the zoom lens according to the numerical example 1.
Figure 6B:
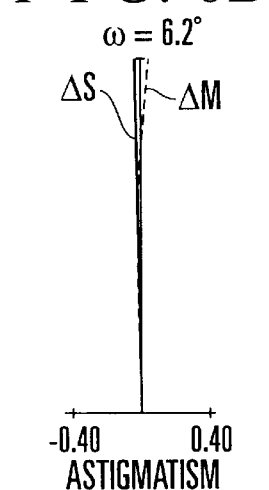
Figure 6C:
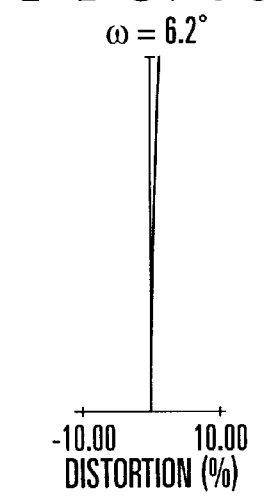
Figure 7A:
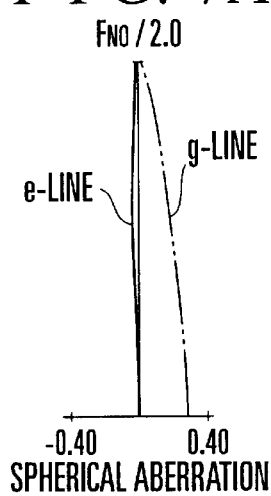
FIGS. 7A to 7C are aberration diagrams showing longitudinal aberrations at the telephoto end in the zoom lens according to the numerical example 1.
Figure 7B:
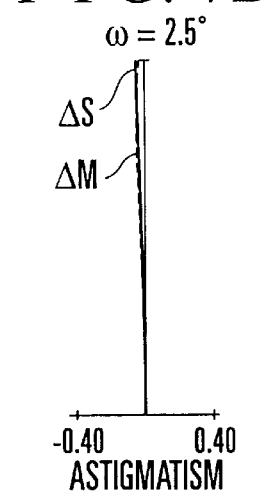
Figure 7C:
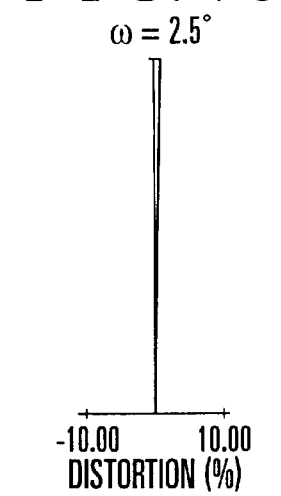

The fourth lens unit of the image-stabilizing zoom lens in the present embodiment is composed of an image-stabilizing lens subunit (IS) of positive refractive power and a plurality of lens elements, and the image-stabilizing lens subunit is, as shown in FIG. 3, disposed within a diverging light flux exiting from the third lens unit. Further, as shown in FIG. 4, even when the focal-length changeover subunit is alternatively placed into the fourth lens unit, the image-stabilizing lens subunit is located within a diverging light flux exiting from the third lens unit.

The image-stabilizing lens subunit has a function of moving in directions approximately perpendicular to the optical axis so as to stabilize an image. The image-stabilizing lens subunit is composed of one positive lens and one negative lens. When a converted inclination angle of incidence of a light flux on the image-stabilizing lens subunit is denoted by α, a converted inclination angle of exit of a light flux from the image-stabilizing lens subunit denoted by α', an Abbe number of the positive lens of the image-stabilizing lens subunit is denoted by νp, and an Abbe number of the negative lens of the image-stabilizing lens subunit is denoted by νn, the above-mentioned conditions (1) and (2) are satisfied as shown by the following values:

(α'−α)=0.500

(νp−νn)=33.8

Further, the lens subunit disposed on the image side of the image-stabilizing lens subunit in the fourth lens unit is composed of six positive lenses and three negative lenses. A mean value of Abbe numbers of the six positive lenses is 56.4, and a mean value of Abbe numbers of the three negative lenses is 40.0. Thus, such effective achromatism is attained that the mean value of Abbe numbers of the positive lenses is larger than that of the negative lenses by more than 15.

Further, the various decentering aberration coefficients, factors, etc., corresponding to the above equations (c) to (h) and (l) are listed in Table-4 with the image-stabilizing lens subunit denoted by p, and the lens subunit disposed on the image side of the image-stabilizing lens subunit denoted by q. By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

TABLE 4

| $\alpha_p$ | −0.6706 | $L_p$ | −0.0261 | $L_q$ | −0.0587 | TE | −0.0007 |
|---|---|---|---|---|---|---|---|
| $\alpha_p'$ | −0.1702 | $T_p$ | −0.0010 | $T_q$ | −0.0110 | IIE | −0.0367 |
| $\overline{\alpha_p}$ | −0.1851 | $I_p$ | 0.3463 | $I_q$ | −1.6396 | IIIE | −0.0560 |
| $\overline{\alpha_p'}$ | −0.1740 | $II_p$ | 0.2783 | $II_q$ | −0.3548 | PE | 0.1606 |
|  |  | $III_p$ | 0.0949 | $III_q$ | −0.1441 | VE1 | 0.0051 |
|  |  | $P_p$ | 0.0558 | $P_q$ | 0.2461 | VE2 | 0.0131 |
|  |  | $V_p$ | 0.0058 | $V_q$ | 0.0343 | ΔE | −1.0008 |

FIGS. 5A to 5C through FIGS. 7A to 7C are aberration diagrams showing the various longitudinal aberrations at the wide-angle end, at the focal length f of 51.0 mm and at the telephoto end, respectively, in the image-stabilizing zoom lens according to the numerical example 1.

FIGS. 8A to 8C through FIGS. 10A to 10C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 1.

FIGS. 11A to 11C through FIGS. 13A to 13C are aberration diagrams showing lateral aberrations, with the image height being ±4 mm and 0 mm, when the image-stabilizing lens subunit has shifted 1.5 mm at the wide-angle end, at the focal length f of 51.0 mm and at the telephoto end, respectively, in the image-stabilizing zoom lens according to the numerical example 1.

NUMERICAL EXAMPLE 2

Numerical data of the numerical example 2 of the image-stabilizing zoom lens are shown in Table-5.

TABLE 5

| f = 8.50 – 127.50 | Fno = 1:1.7 – 2.0 | 2ω = 65.8° – 49° | |
|---|---|---|---|
| r1 = −251.088 | d1 = 2.00 | n1 = 1.81265 | v1 = 25.4 |
| r2 = 157.249 | d2 = 7.22 | | |
| r3 = 234.933 | d3 = 10.06 | n2 = 1.43985 | v2 = 95.0 |
| r4 = −158.211 | d4 = 7.14 | | |
| r5 = 162.538 | d5 = 8.51 | n3 = 1.49845 | v3 = 81.5 |
| r6 = −316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |
| r13 = −41.835 | d13 = 0.80 | n7 = 1.77621 | v7 = 49.6 |
| r14 = 60.569 | d14 = 1.99 | | |
| r15 = 33.469 | d15 = 5.53 | n8 = 1.85501 | v8 = 23.9 |
| r16 = −41.646 | d16 = 1.17 | | |
| r17 = −28.573 | d17 = 0.80 | n9 = 1.77621 | v9 = 49.6 |
| r18 = 133.163* | d18 = Variable | | |
| r19 = −27.765 | d19 = 0.80 | n10 = 1.77621 | v10 = 49.6 |
| r20 = 41.769 | d20 = 2.81 | n11 = 1.85501 | v11 = 23.9 |
| r21 = −859.593 | d21 = Variable | | |
| r22 = Stop | d22 = 2.00 | | |
| r23 = 577.569 | d23 = 8.33 | n12 = 1.62033 | v12 = 63.3 |
| r24 = −24.023 | d24 = 0.16 | | |
| r25 = −24.101 | d25 = 1.15 | n13 = 1.76859 | v13 = 26.5 |
| r26 = −42.336 | d26 = 1.00 | | |
| r27 = 248.115 | d27 = 4.34 | n14 = 1.81264 | v14 = 25.4 |
| r28 = −69.463 | d28 = 1.00 | | |
| r29 = 78.599 | d29 = 6.93 | n15 = 1.52033 | v15 = 58.9 |
| r30 = −37.521 | d30 = 1.15 | n16 = 1.83945 | v16 = 42.7 |
| r31 = 352.514 | d31 = 30.00 | | |
| r32 = 56.401 | d32 = 5.76 | n17 = 1.62286 | v17 = 60.3 |
| r33 = −74.260 | d33 = 0.20 | | |
| r34 = 659.428 | d34 = 1.15 | n18 = 1.83945 | v18 = 42.7 |
| r35 = 22.477 | d35 = 6.44 | n19 = 1.51976 | v19 = 52.4 |
| r36 = 787.695 | d36 = 0.20 | | |
| r37 = 58.641 | d37 = 7.46 | n20 = 1.48915 | v20 = 70.2 |
| r38 = −24.321 | d38 = 1.15 | n21 = 1.83932 | v21 = 37.2 |
| r39 = −980.856 | d39 = 0.20 | | |
| r40 = 64.004 | d40 = 6.22 | n22 = 1.48915 | v22 = 70.2 |
| r41 = −35.807 | d41 = 4.50 | | |
| r42 = ∞ | d42 = 30.00 | n23 = 1.60718 | v23 = 38.0 |
| r43 = ∞ | d43 = 16.20 | n24 = 1.51825 | v24 = 64.2 |
| r44 = ∞ | | | |

*Aspheric Surface

Figure 14:
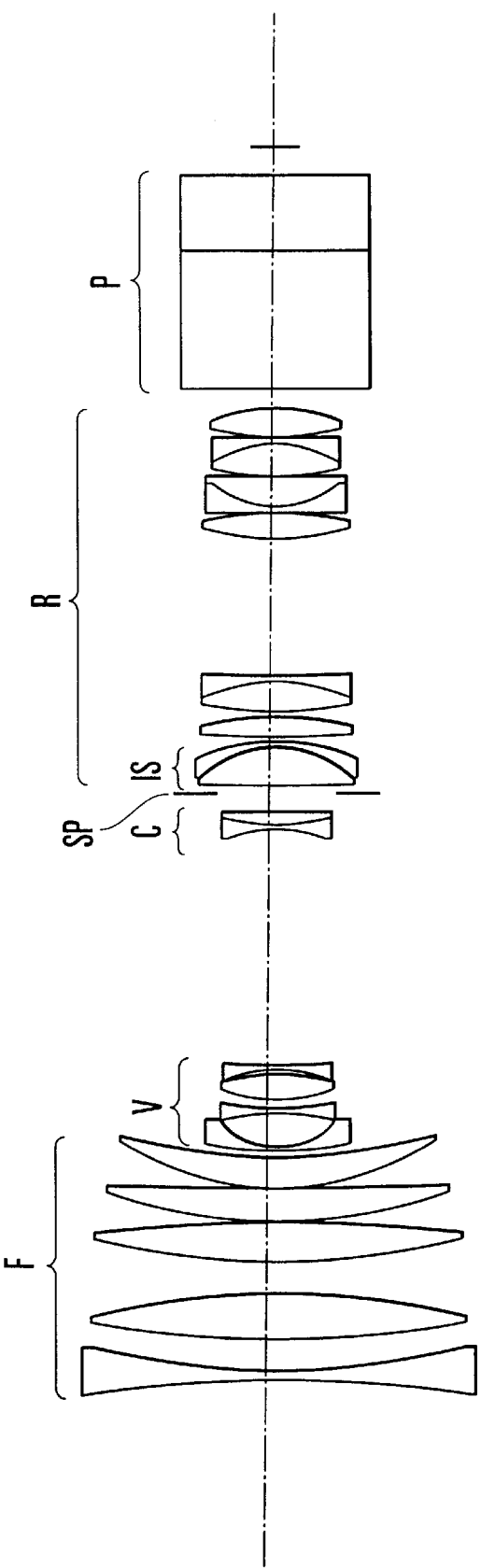
FIG. 14 is a sectional view showing the construction of a zoom lens at the wide-angle end according to a numerical example 2 of the invention.

FIG. 14 is a sectional view showing the construction of the image-stabilizing zoom lens at the wide-angle end according to the numerical example 2 of the invention. In FIG. 14, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 14.

The surfaces r23 to r26 represent an image-stabilizing lens subunit (IS), which has a positive refractive power. The surfaces r27 and r28 represent a lens element of positive refractive power, and the surfaces r29 to r31 represent a cemented lens element of negative composite refractive power. On the image side of the surface r31, there is provided a relatively large space, into which the focal-length changeover subunit (IE) can be inserted to shift the focal length of the entire zoom lens to the telephoto side or the wide-angle side.

Figure 15:
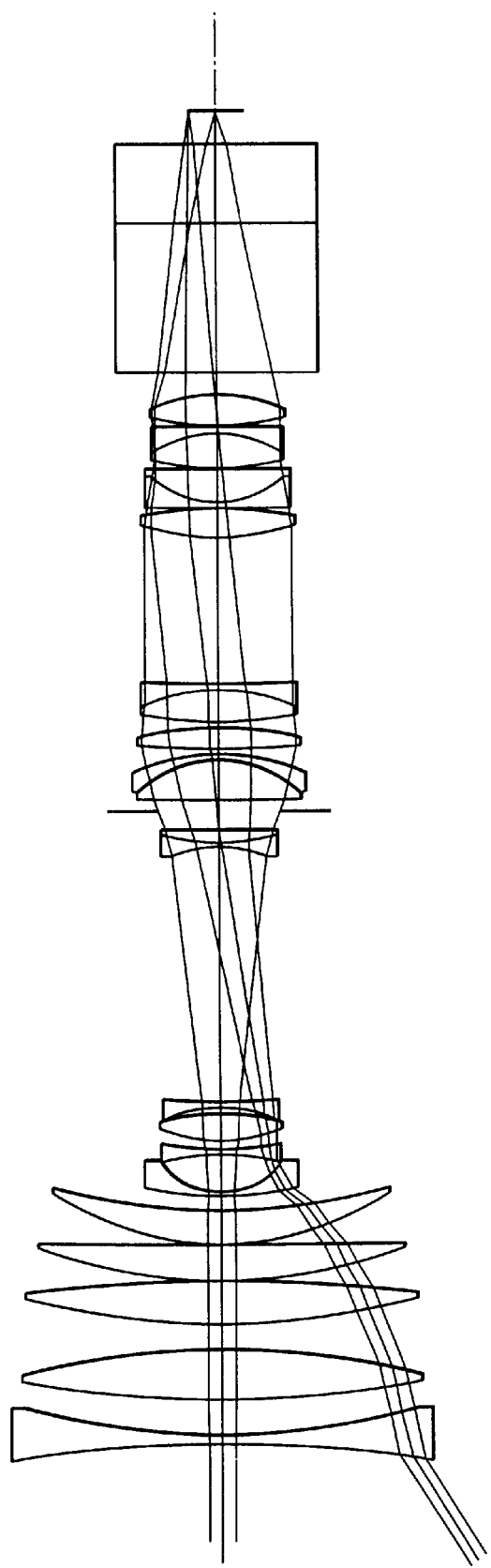
FIG. 15 is an optical path diagram for explaining the position of a fourth lens unit in the numerical example 2.
Figure 16A:
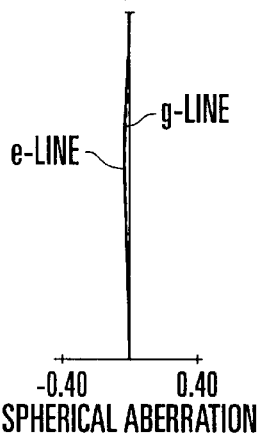
FIGS. 16A to 16C are aberration diagrams showing longitudinal aberrations at the wide-angle end in the zoom lens according to the numerical example 2.
Figure 16B:
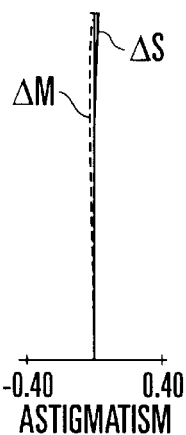
Figure 16C:
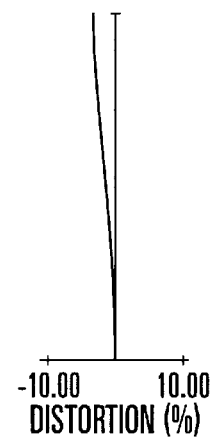
Figure 17A:
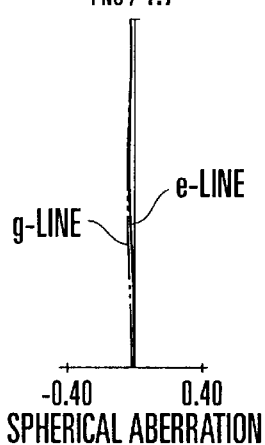
FIGS. 17A to 17C are aberration diagrams showing longitudinal aberrations at the middle focal length in the zoom lens according to the numerical example 2.
Figure 17B:
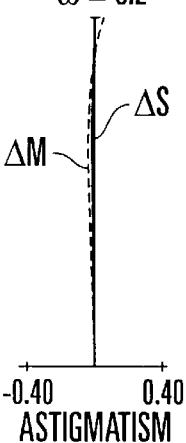
Figure 17C:
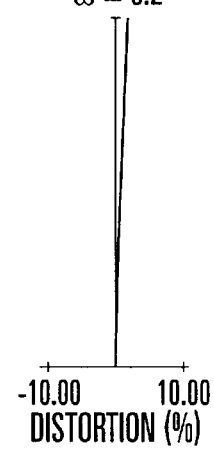
Figure 18A:
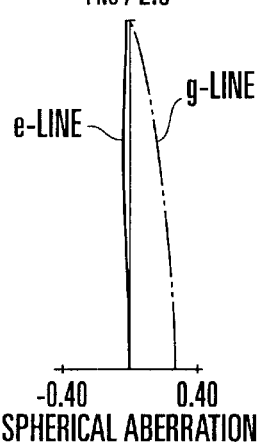
FIGS. 18A to 18C are aberration diagrams showing longitudinal aberrations at the telephoto end in the zoom lens according to the numerical example 2.
Figure 18B:
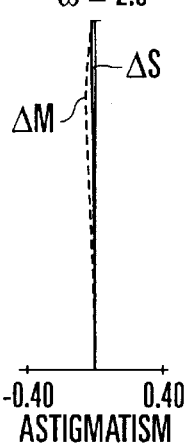
Figure 18C:
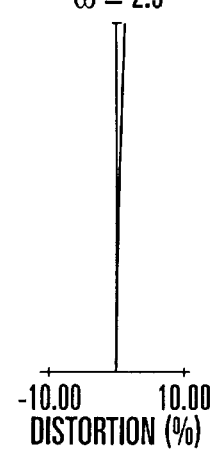

The fourth lens unit of the image-stabilizing zoom lens in the present embodiment is composed of the image-stabilizing lens subunit (IS) of positive refractive power and a plurality of lens elements, and the image-stabilizing lens subunit is, as shown in FIG. 15, disposed within a diverging light flux exiting from the third lens unit. The image-stabilizing lens subunit has a function of moving in directions approximately perpendicular to the optical axis so as to stabilize an image. The image-stabilizing lens subunit is composed of one positive lens and one negative lens. When a converted inclination angle of incidence of a light flux on the image-stabilizing lens subunit is denoted by α, a converted inclination angle of exit of a light flux from the image-stabilizing lens subunit denoted by α', an Abbe number of the positive lens of the image-stabilizing lens subunit is denoted by vp, and an Abbe number of the negative lens of the image-stabilizing lens subunit is denoted by vn, the above-mentioned conditions (1) and (2) are satisfied as shown by the following values:

(α'−α)=0.675

(vp−vn)=36.8

Further, the lens subunit disposed on the image side of the image-stabilizing lens subunit in the fourth lens unit is composed of six positive lenses and three negative lenses. A mean value of Abbe numbers of the six positive lenses is 56.2, and a mean value of Abbe numbers of the three negative lenses is 40.8. Thus, such effective achromatism is attained that the mean value of Abbe numbers of the positive lenses is larger than that of the negative lenses by more than 15.

Further, the various decentering aberration coefficients, factors, etc., corresponding to the above equations (c) to (h) and (l) are listed in Table-6 with the image-stabilizing lens subunit denoted by p, and the lens subunit disposed on the image side of the image-stabilizing lens subunit denoted by q.

TABLE 6

| $α_p$ | −1.2650 | $L_p$ | −0.0415 | $L_q$ | 0.0324 | TE | −0.0031 |
|---|---|---|---|---|---|---|---|
| $α_p'$ | −0.5902 | $T_p$ | −0.0020 | $T_q$ | −0.0125 | IIIE | 0.0287 |
| $\overline{α_p}$ | −0.2043 | $I_p$ | 6.7056 | $I_q$ | −2.3573 | IIIE | −0.0826 |
| $\overline{α_p'}$ | −0.1841 | $II_p$ | 1.2227 | $II_q$ | −0.2903 | PE | 0.2701 |
| | | $III_p$ | 0.1607 | $III_q$ | −0.0622 | VE1 | −0.0008 |
| | | $P_p$ | 0.0751 | $P_q$ | 0.2596 | VE2 | 0.0206 |
| | | $V_p$ | 0.0111 | $V_q$ | 0.0247 | ΔE | −1.3495 |

By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

FIGS. 16A to 16C through FIGS. 18A to 18C are aberration diagrams showing the various longitudinal aberrations at the wide-angle end, at the focal length f of 51.0 mm and at the telephoto end, respectively, in the image-stabilizing zoom lens according to the numerical example 2.

FIGS. 19A to 19C through FIGS. 21A to 21C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 2.

FIGS. 22A to 22C through FIGS. 24A to 24C are aberration diagrams showing lateral aberrations, with the image height being ±4 mm and 0 mm, when the image-stabilizing lens subunit has shifted 1.5 mm at the wide-angle end, at the focal length f of 51.0 mm and at the telephoto end, respectively, in the image-stabilizing zoom lens according to the numerical example 2.

NUMERICAL EXAMPLE 3

Numerical data of the numerical example 3 of the image-stabilizing zoom lens are shown in Table-7.

TABLE 7

| f = 8.50 – 127.50 | Fno = 1:1.7 – 2.0 | 2ω = 65.8° – 4.9° | |
|---|---|---|---|
| r1 = –251.088 | d1 = 2.00 | n1 = 1.81265 | v1 = 25.4 |
| r2 = 157.249 | d2 = 7.22 | | |
| r3 = 234.983 | d3 = 10.06 | n2 = 1.43985 | v2 = 95.0 |
| r4 = –158.211 | d4 = 7.14 | | |
| r5 = 162.538 | d5 = 8.51 | n3 = 1.49845 | v3 = 81.5 |
| r6 = –316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |
| r13 = –41.835 | d13 = 0.80 | n7 = 1.77621 | v7 = 49.6 |
| r14 = 60.569 | d14 = 1.99 | | |
| r15 = 33.469 | d15 = 5.53 | n8 = 1.85501 | v8 = 23.9 |
| r16 = –41.646 | d16 = 1.17 | | |
| r17 = –28.573 | d17 = 0.80 | n9 = 1.77621 | v9 = 49.6 |
| r18 = 133.163* | d18 = Variable | | |
| r19 = –27.765 | d19 = 0.80 | n10 = 1.77621 | v10 = 49.6 |
| r20 = 41.769 | d20 = 2.81 | n11 = 1.85501 | v11 = 23.9 |
| r21 = –859.593 | d21 = Variable | | |
| r22 = Stop | d22 = 1.00 | | |
| r23 = 244.163 | d23 = 8.93 | n12 = 1.59446 | v12 = 68.3 |
| r24 = –21.523 | d24 = 0.10 | | |
| r25 = –21.479 | d25 = 1.15 | n13 = 1.82600 | v13 = 23.7 |
| r26 = –33.920 | d26 = 1.00 | | |
| r27 = 98.581 | d27 = 4.68 | n14 = 1.81264 | v14 = 25.4 |
| r28 = –83.599 | d28 = 0.20 | | |
| r29 = 64.365 | d29 = 6.48 | n15 = 1.50349 | v15 = 56.4 |
| r30 = –42.853 | d30 = 1.15 | n16 = 1.88815 | v16 = 40.8 |
| r31 = 99.533 | d31 = 35.00 | | |
| r32 = 179.072 | d32 = 5.22 | n17 = 1.51825 | v17 = 64.1 |
| r33 = –40.529 | d33 = 0.20 | | |
| r34 = –89.900 | d34 = 1.15 | n18 = 1.83945 | v18 = 42.7 |
| r35 = 37.244 | d35 = 5.85 | n19 = 1.53430 | v19 = 48.8 |
| r36 = –87.624 | d36 = 0.20 | | |
| r37 = 51.541 | d37 = 7.87 | n20 = 1.48915 | v20 = 70.2 |
| r38 = –27.529 | d38 = 1.15 | n21 = 1.92859 | v21 = 36.0 |
| r39 = –146.517 | d39 = 0.20 | | |
| r40 = 51.769 | d40 = 6.05 | n22 = 1.48915 | v22 = 70.2 |
| r41 = –54.477 | d41 = 4.50 | | |
| r42 = ∞ | d42 = 30.00 | n23 = 1.60718 | v23 = 38.0 |
| r43 = ∞ | d43 = 16.20 | n24 = 1.51825 | v24 = 64.2 |
| r44 = ∞ | | | |

*Aspheric Surface

Figure 25:
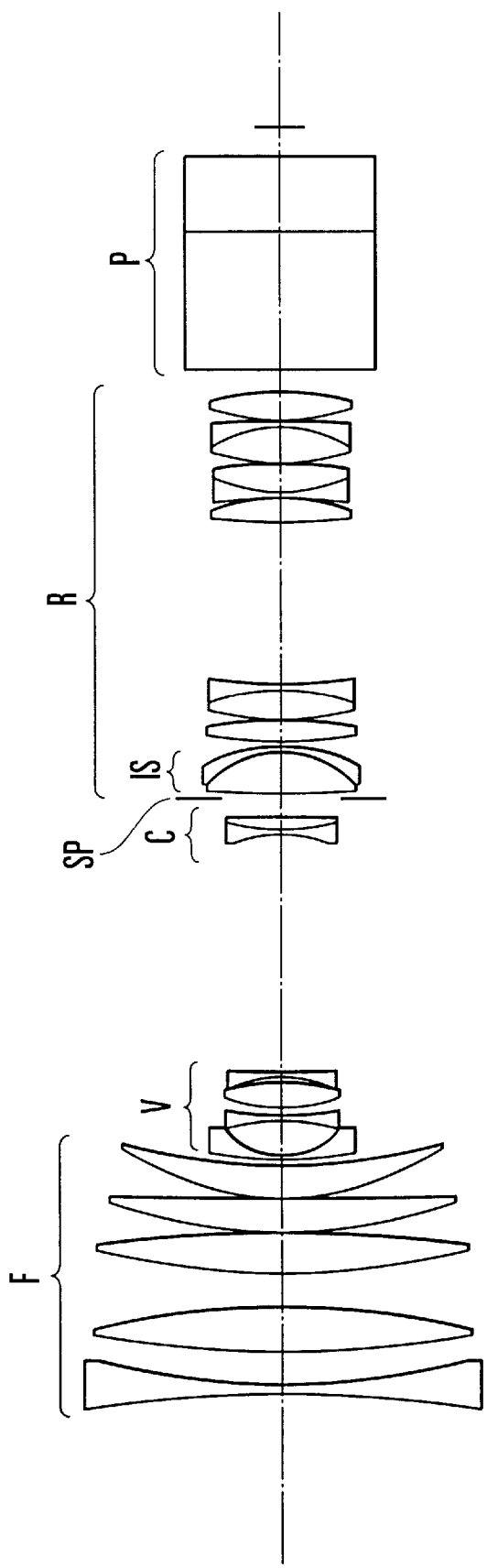
FIG. 25 is a sectional view showing the construction of a zoom lens at the wide-angle end according to a numerical example 3 of the invention.

FIG. 25 is a sectional view showing the construction of the image-stabilizing zoom lens at the wide-angle end according to the numerical example 3 of the invention. In FIG. 25, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 25.

The surfaces r23 to r26 represent an image-stabilizing lens subunit (IS), which has a positive refractive power. The surfaces r27 and r28 represent a lens element of positive refractive power, and the surfaces r29 to r31 represent a cemented lens element of negative composite refractive power. On the image side of the surface r31, there is provided a relatively large space, into which the focal-length changeover subunit (IE) can be inserted to shift the focal length of the entire zoom lens to the telephoto side or the wide-angle side.

Figure 26:
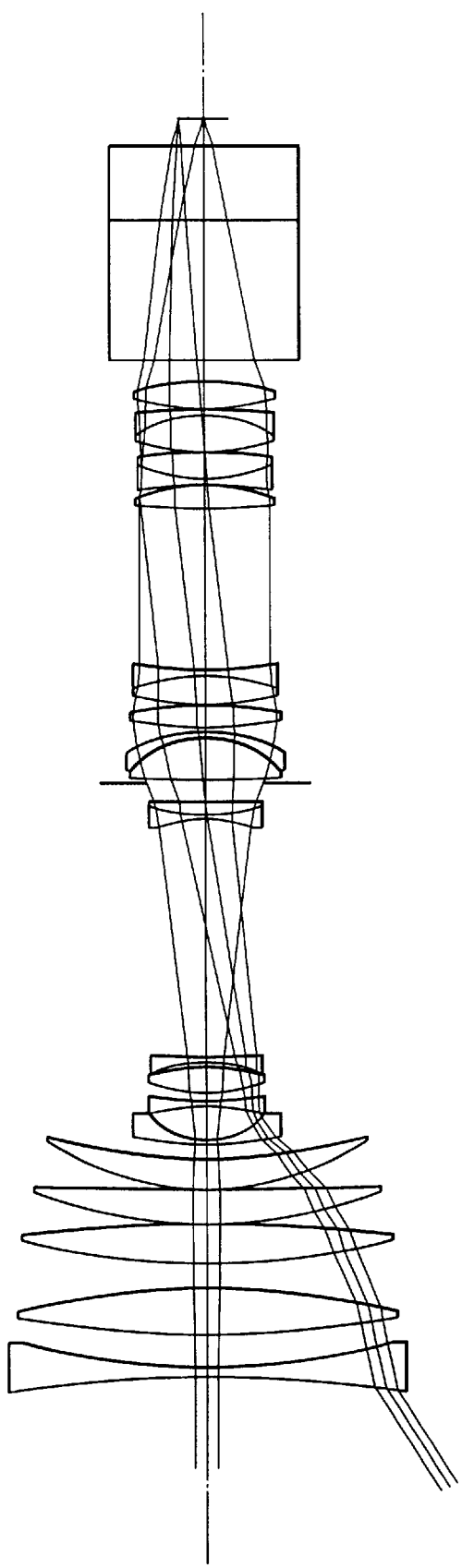
FIG. 26 is an optical path diagram for explaining the position of a fourth lens unit in the numerical example 3.
Figure 27A:
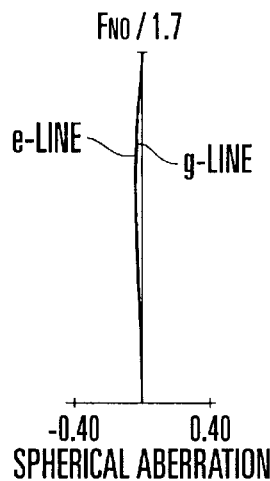
FIGS. 27A to 27C are aberration diagrams showing longitudinal aberrations at the wide-angle end in the zoom lens according to the numerical example 3.
Figure 27B:
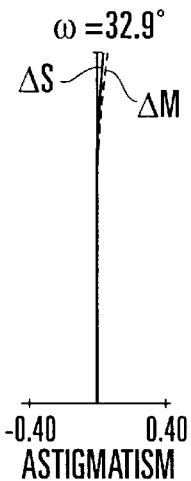
Figure 27C:
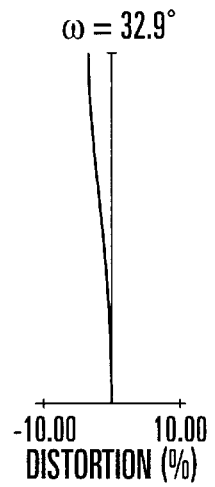
Figure 28A:
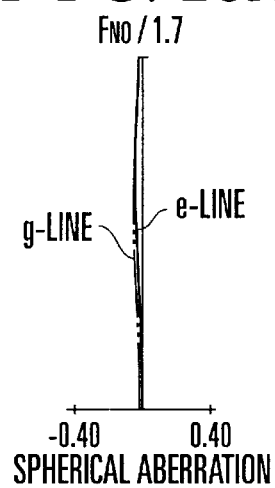
FIGS. 28A to 28C are aberration diagrams showing longitudinal aberrations at the middle focal length in the zoom lens according to the numerical example 3.
Figure 28B:
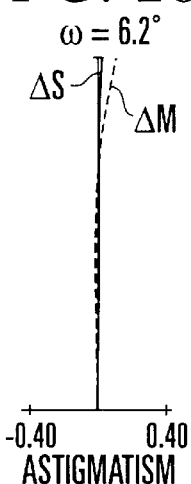
Figure 28C:
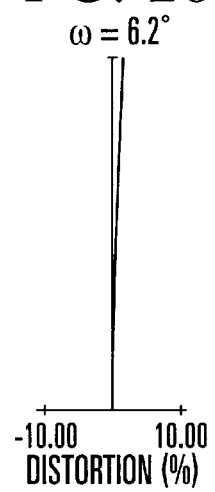
Figure 29A:
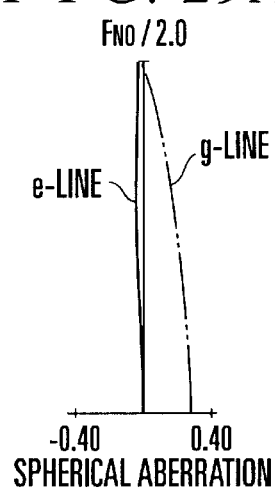
FIGS. 29A to 29C are aberration diagrams showing longitudinal aberrations at the telephoto end in the zoom lens according to the numerical example 3.
Figure 29B:
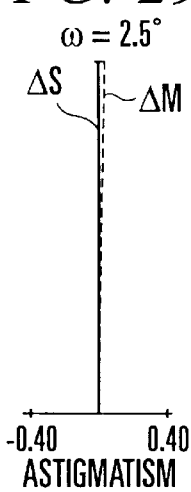
Figure 29C:
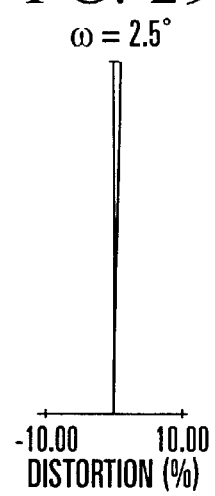

The fourth lens unit of the image-stabilizing zoom lens in the present embodiment is composed of the image-stabilizing lens subunit (IS) of positive refractive power and a plurality of lens elements, and the image-stabilizing lens subunit is, as shown in FIG. 26, disposed within a diverging light flux exiting from the third lens unit. The image-stabilizing lens subunit has a function of moving in directions approximately perpendicular to the optical axis so as to stabilize an image. The image-stabilizing lens subunit is composed of one positive lens and one negative lens. When a converted inclination angle of incidence of a light flux on the image-stabilizing lens subunit is denoted by α, a converted inclination angle of exit of a light flux from the image-stabilizing lens subunit denoted by α', an Abbe number of the positive lens of the image-stabilizing lens subunit is denoted by vp, and an Abbe number of the negative lens of the image-stabilizing lens subunit is denoted by vn, the above-mentioned conditions (1) and (2) are satisfied as shown by the following values:

(α'−α)=0.798

(vp−vn)=44.6

Further, the lens subunit disposed on the image side of the image-stabilizing lens subunit in the fourth lens unit is composed of six positive lenses and three negative lenses. A mean value of Abbe numbers of the six positive lenses is 55.9, and a mean value of Abbe numbers of the three negative lenses is 39.9. Thus, such effective achromatism is attained that the mean value of Abbe numbers of the positive lenses is larger than that of the negative lenses by more than 15.

Further, the various decentering aberration coefficients, factors, etc., corresponding to the above equations (c) to (h) and (l) are listed in Table-8 with the image-stabilizing lens subunit denoted by p, and the lens subunit disposed on the image side of the image-stabilizing lens subunit denoted by q.

TABLE 8

| $\alpha_p$ | −1.2650 | $L_p$ | −0.0572 | $L_q$ | 0.0479 | TE | −0.0013 |
|---|---|---|---|---|---|---|---|
| $\alpha_p'$ | −0.4669 | $T_p$ | −0.0022 | $T_q$ | −0.0114 | IIE | −0.0677 |
| $\bar{\alpha}_p$ | −0.2043 | $I_p$ | 6.7751 | $I_q$ | −2.3500 | IIIE | −0.1101 |
| $\bar{\alpha}_p'$ | −0.1825 | $II_p$ | 1.2402 | $II_q$ | −0.3808 | PE | 0.3233 |
| | | $III_p$ | 0.1738 | $III_q$ | −0.1064 | VE1 | 0.0042 |
| | | $P_p$ | 0.0946 | $P_q$ | 0.2552 | VE2 | 0.0249 |
| | | $V_p$ | 0.0116 | $V_q$ | 0.0285 | ΔE | −1.5962 |

By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

FIGS. 27A to 27C through FIGS. 29A to 29C are aberration diagrams showing the various longitudinal aberrations at the wide-angle end, at the focal length f of 51.0 mm and at the telephoto end, respectively, in the image-stabilizing zoom lens according to the numerical example 3.

FIGS. 30A to 30C through FIGS. 32A to 32C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 3.

FIGS. 33A to 33C through FIGS. 35A to 35C are aberration diagrams showing lateral aberrations, with the image height being ±4 mm and 0 mm, when the image-stabilizing lens subunit has shifted 1.0 mm at the wide-angle end, at the focal length f of 51.0 mm and at the telephoto end, respectively, in the image-stabilizing zoom lens according to the numerical example 3.

NUMERICAL EXAMPLE 4

Numerical data of the numerical example 4 of the image-stabilizing zoom lens are shown in Table-9.

TABLE 9

| f = 8.50 − 127.50 | Fno = 1:1.7 − 2.0 | 2ω = 65.8° − 4.9° | |
|---|---|---|---|
| r1 = −251.088 | d1 = 2.00 | n1 = 1.81265 | v1 = 25.4 |
| r2 = 157.249 | d2 = 7.22 | | |
| r3 = 234.983 | d3 = 10.06 | n2 = 1.43985 | v2 = 95.0 |
| r4 = −158.211 | d4 = 7.14 | | |
| r5 = 162.538 | d5 = 8.51 | n3 = 1.49845 | v3 = 81.5 |
| r6 = −316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |

TABLE 9-continued

| r13 = −41.835 | d13 = 0.80 | n7 = 1.77621 | v7 = 49.6 |
|---|---|---|---|
| r14 = 60.569 | d14 = 1.99 | | |
| r15 = 33.469 | d15 = 5.53 | n8 = 1.85501 | v8 = 23.9 |
| r16 = −41.646 | d16 = 1.17 | | |
| r17 = −28.573 | d17 = 0.80 | n9 = 1.77621 | v9 = 49.6 |
| r18 = 133.163* | d18 = Variable | | |
| r19 = −27.765 | d19 = 0.80 | n10 = 1.77621 | v10 = 49.6 |
| r20 = 41.769 | d20 = 2.81 | n11 = 1.85501 | v11 = 23.9 |
| r21 = −859.593 | d21 = Variable | | |
| r22 = Stop | d22 = 1.00 | | |
| r23 = ∞ | d23 = 4.77 | n12 = 1.51976 | v12 = 52.4 |
| r24 = −29.997 | d24 = 0.10 | | |
| r25 = 10119.580 | d25 = 3.06 | n13 = 1.58482 | v13 = 40.8 |
| r26 = −55.852 | d26 = 0.10 | | |
| r27 = 222.578 | d27 = 6.34 | n14 = 1.48915 | v14 = 70.2 |
| r28 = −25.903 | d28 = 1.10 | n15 = 1.80642 | v15 = 35.0 |
| r29 = 572.440 | d29 = 0.10 | | |
| r30 = 44.407 | d30 = 4.49 | n16 = 1.62033 | v16 = 63.3 |
| r31 = −111.118 | d31 = 3.00 | | |
| r32 = −145.684 | d32 = 1.10 | n17 = 1.88815 | v17 = 40.8 |
| r33 = 54.946 | d33 = 0.20 | | |
| r34 = 43.066 | d34 = 3.26 | n18 = 1.81643 | v18 = 22.8 |
| r35 = 106.473 | d35 = 33.6 | | |
| r36 = 594.450 | d36 = 4.86 | n19 = 1.60548 | v19 = 60.6 |
| r37 = −34.281 | d37 = 3.32 | | |
| r38 = −23.957 | d38 = 1.10 | n20 = 1.80642 | v20 = 35.0 |
| r39 = −78.850 | d39 = 5.08 | n21 = 1.48915 | v21 = 70.2 |
| r40 = −23.578 | d40 = 0.10 | | |
| r41 = 138.426 | d41 = 6.28 | n22 = 1.48915 | v22 = 70.2 |
| r42 = −26.525 | d42 = 1.10 | n23 = 1.88815 | v23 = 40.8 |
| r43 = −256.639 | d43 = 0.10 | | |
| r44 = 40.576 | d44 = 4.83 | n24 = 1.67340 | v24 = 47.2 |
| r45 = −203.039 | d45 = 4.50 | | |
| r46 = ∞ | d46 = 30.00 | n25 = 1.60718 | v25 = 38.0 |
| r47 = ∞ | d47 = 16.20 | n26 = 1.51825 | v26 = 64.2 |
| r48 = ∞ | | | |

*: Aspheric Surface

In the numerical data, ri is the radius of curvature of the i-th lens surface, when counted from the object side, di is the i-th lens thickness or air separation, when counted from the object side, and ni and vi are respectively the refractive index and Abbe number of material of the i-th lens element, when counted from the object side.

The air separations d10, d18 and d21 each are variable, and the values of the air separations d10, d18 and d21 obtained when the focal length is 8.50, 51.00 and 127.50, respectively, are shown in Table-10. These values apply also to the numerical example 5 and the numerical example 6 equally.

TABLE 10

| Variable | Focal Length | | |
|---|---|---|---|
| Separation | 8.50 | 51.00 | 127.50 |
| d10 | 1.32 | 41.58 | 50.12 |
| d18 | 51.65 | 7.31 | 5.67 |
| d21 | 4.50 | 8.58 | 1.68 |

Each of the eleventh surface (r11) and the eighteenth surface (r18) is an aspheric surface.

The shape of an aspheric surface is expressed in the coordinates with an X axis in the optical axis direction and an H axis in the direction perpendicular to the optical axis, the direction in which light advances being taken as positive, by the following equation:

$$X = \frac{H^2/R}{1+\sqrt{1-(1+k)(H/R)^2}} + BH^4 + CH^6 + DH^8 + EH^{10}$$

where R is the radius of osculating sphere, i.e., the radius of reference sphere, and k, B, C, D and E are aspheric coefficients.

The value of the radius R of reference sphere and the values of the aspheric coefficients k, B, C, D and E are shown in Table-11. In Table-11, for example, "3.2131D$^{-6}$" means "3.2131×10$^{-6}$". These values apply also to the numerical example 5 and the numerical example 6 equally.

Figure 36A:
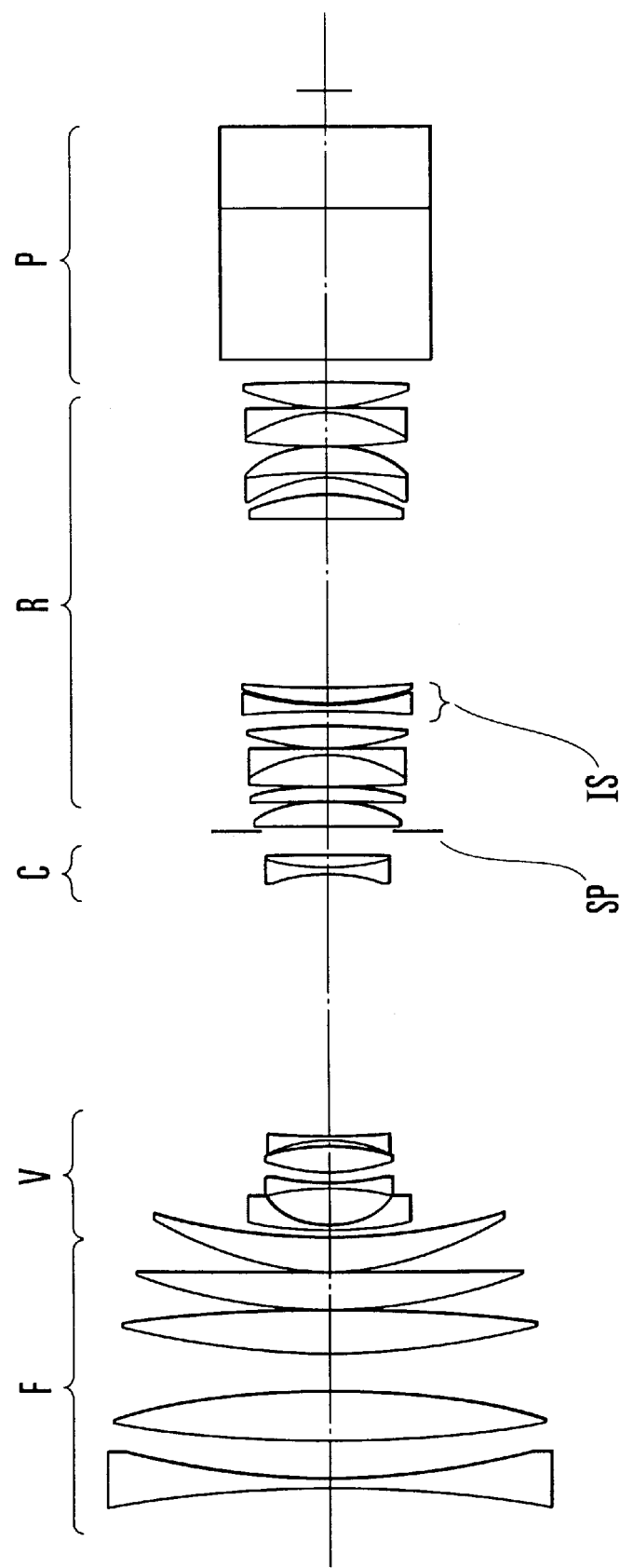
FIG. 36A is a sectional view showing the construction of a zoom lens at the wide-angle end according to a numerical example 4 of the invention.

TABLE 11 r11:
Radius R of reference sphere = 78.91221
Aspheric coefficients
k = −3.23637D$^{-2}$
B = 3.21318D$^{-6}$
C = −3.97113D$^{-9}$
D = −1.48889D$^{11}$
E = 3.06352D$^{14}$
r18:
Radius R of reference sphere = 133.16287
Aspheric coefficients
k = −3.66073D$^{-2}$
B = −1.07011D$^{-7}$
C = 9.22594D$^{-9}$
D = −1.68952D$^{10}$
E = 4.38262D$^{13}$ FIG. 36A is a sectional view showing the construction of the image-stabilizing zoom lens at the wide-angle end according to the numerical example 4 of the invention. In FIG. 36A, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 36A.

Figure 36B:
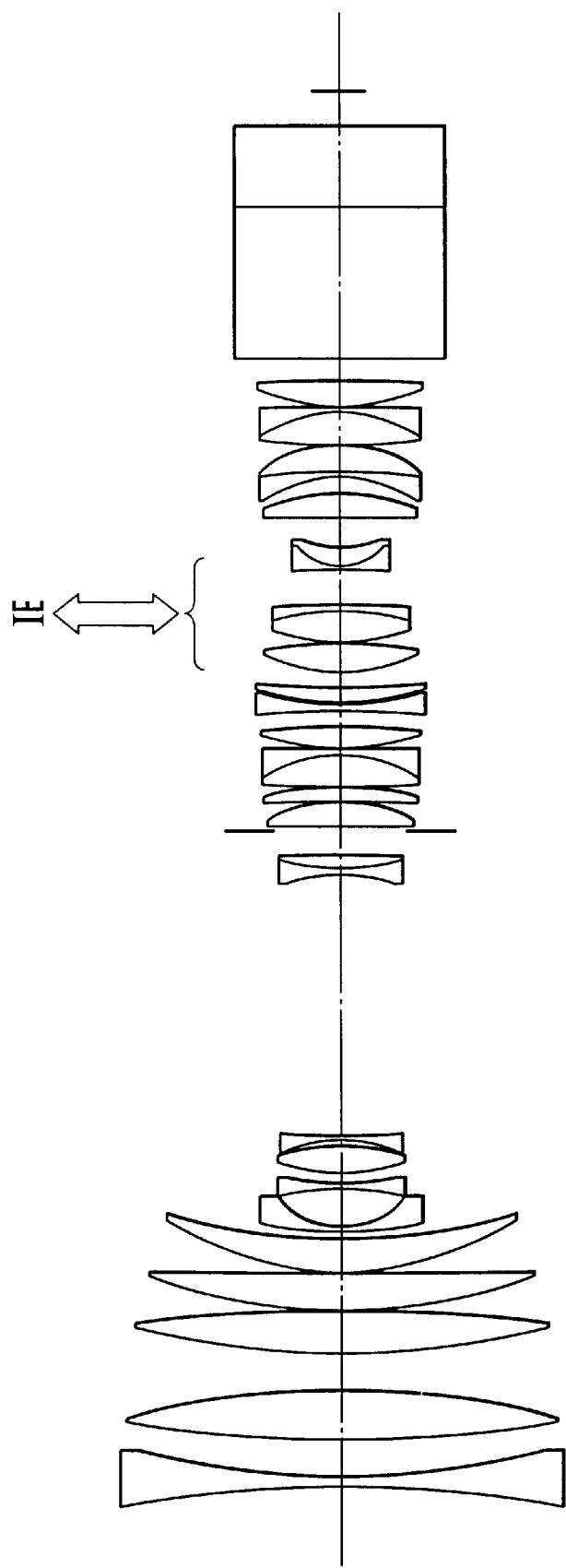
FIG. 36B is a sectional view showing the zoom lens according to the numerical example 4, in which a focal-length changeover subunit is inserted.

The air separation d35 is an extender inserting interval, which the focal-length changeover subunit (IE) can be selectively inserted into or detached from, as shown in FIG. 36B, to shift the focal length at the wide-angle end of the zoom lens to the telephoto side or the wide-angle side.

Figure 37:
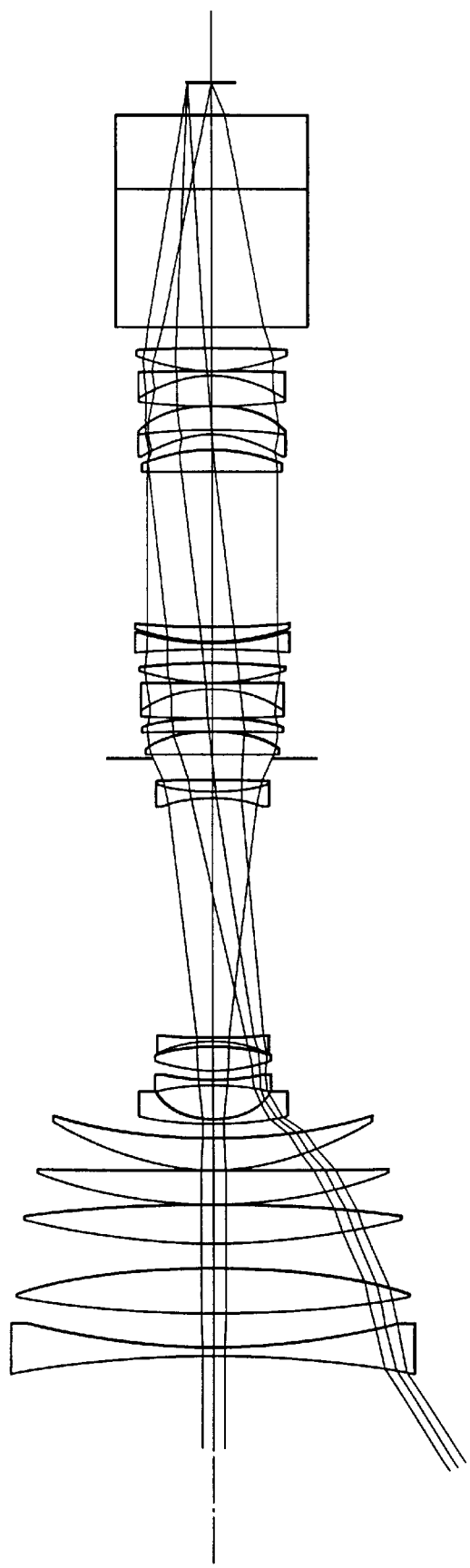
FIG. 37 is an optical path diagram for explaining the position of a fourth lens unit in the numerical example 4.
Figure 38:
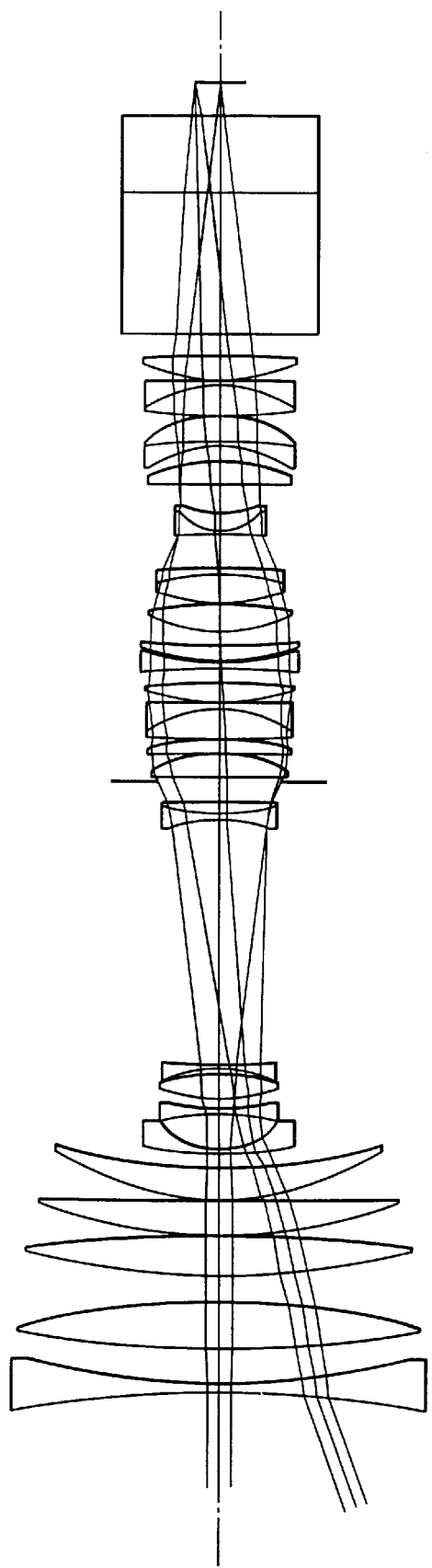
FIG. 38 is an optical path diagram for explaining the position of the fourth lens unit, in which the focal-length changeover subunit is inserted, in the numerical example 4.

The fourth lens unit of the image-stabilizing zoom lens in the present embodiment is composed of an image-stabilizing lens subunit (IS) of negative refractive power and a plurality of lens elements, and the image-stabilizing lens subunit is, as shown in FIG. 37, disposed within a diverging light flux exiting from the third lens unit. Further, as shown in FIG. 38, even when the focal-length changeover subunit is alternatively placed into the fourth lens unit, the image-stabilizing lens subunit is located within a diverging light flux exiting from the third lens unit.

The image-stabilizing lens subunit has a function of moving in directions approximately perpendicular to the optical axis so as to stabilize an image. The image-stabilizing lens subunit is composed of one negative lens and one positive lens. When a converted inclination angle of incidence of a light flux on the image-stabilizing lens subunit is denoted by α2, a converted inclination angle of exit of a light flux from the image-stabilizing lens subunit denoted by α2', an Abbe number of the negative lens of the image-stabilizing lens subunit is denoted by vn2, and an Abbe number of the positive lens of the image-stabilizing lens subunit is denoted by vp2, the above-mentioned conditions (3) and (4) are satisfied as shown by the following values:

(α2'−α2)=−0.499

(vn2−vp2)=18.0

Further, the lens subunit disposed on the image side of the image-stabilizing lens subunit in the fourth lens unit is composed of four positive lenses and two negative lenses. A mean value of Abbe numbers of the four positive lenses is 62.1, and a mean value of Abbe numbers of the two negative lenses is 37.9. Thus, such effective achromatism is attained that the mean value of Abbe numbers of the positive lenses is larger than that of the negative lenses by more than 24.

Further, the various decentering aberration coefficients, factors, etc., corresponding to the above equations (c) to (h) and (l) are listed in Table-12 with the image-stabilizing lens subunit denoted by p, and the lens subunit disposed on the image side of the image-stabilizing lens subunit denoted by q.

TABLE 12

| $\alpha_p'$ | 0.4566 | $L_p$ | −0.0013 | $L_q$ | −0.0662 | TE | 0.0031 |
|---|---|---|---|---|---|---|---|
| $\alpha_p$ | −0.0424 | $T_p$ | −0.0003 | $T_q$ | −0.0103 | IIIE | 0.0393 |
| $\bar{\alpha}_p$ | −0.1546 | $I_p$ | 1.5326 | $I_q$ | −4.3099 | IIIE | 0.0120 |
| $\bar{\alpha}_p'$ | −0.1901 | $II_p$ | 0.5797 | $II_q$ | −1.3907 | PE | −0.0597 |
| | | $III_p$ | −0.0216 | $III_q$ | −0.2829 | VE1 | −0.0183 |
| | | $P_p$ | −0.0474 | $P_q$ | 0.1631 | VE2 | −0.0131 |
| | | $V_p$ | −0.0159 | $V_q$ | 0.0377 | ΔE | 0.9979 |

By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

FIGS. 39A to 39C through FIGS. 41A to 41C are aberration diagrams showing the various longitudinal aberrations at the wide-angle end, at the focal length f of 51.0 mm and at the telephoto end, respectively, in the image-stabilizing zoom lens according to the numerical example 4.

FIGS. 42A to 42C through FIGS. 44A to 44C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 4.

FIGS. 45A to 45C through FIGS. 47A to 47C are aberration diagrams showing lateral aberrations, with the image height being ±4 mm and 0 mm, when the image-stabilizing lens subunit has shifted 1.0 mm at the wide-angle end, at the focal length f of 51.0 mm and at the telephoto end, respectively, in the image-stabilizing zoom lens according to the numerical example 4.

NUMERICAL EXAMPLE 5

Numerical data of the numerical example 5 of the image-stabilizing zoom lens are shown in Table-13.

TABLE 13 f = 8.50 – 127.50   Fno = 1:1.7 – 2.0   2ω = 65.8° – 4.9°

| | | | |
|---|---|---|---|
| r1 = −251.088 | d1 = 2.00 | n1 = 1.81265 | v1 = 25.4 |
| r2 = 157.249 | d2 = 7.22 | | |
| r3 = 234.983 | d3 = 10.06 | n2 = 1.43985 | v2 = 95.0 |
| r4 = −158.211 | d4 = 7.14 | | |
| r5 = 162.538 | d5 = 8.51 | n3 = 1.49845 | v3 = 81.5 |
| r6 = −316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |
| r13 = −41.835 | d13 = 0.80 | n7 = 1.77621 | v7 = 49.6 |
| r14 = 60.569 | d14 = 1.99 | | |
| r15 = 33.469 | d15 = 5.53 | n8 = 1.85501 | v8 = 23.9 |
| r16 = −41.646 | d16 = 1.17 | | |
| r17 = −28.573 | d17 = 0.80 | n9 = 1.77621 | v9 = 49.6 |
| r18 = 133.163* | d18 = Variable | | |
| r19 = −27.765 | d19 = 0.80 | n10 = 1.77621 | v10 = 49.6 |
| r20 = 41.769 | d20 = 2.81 | n11 = 1.85501 | v11 = 23.9 |
| r21 = −859.593 | d21 = Variable | | |
| r22 = Stop | d22 = 2.19 | | |
| r23 = −165.000 | d23 = 4.92 | n12 = 1.51976 | v12 = 52.4 |
| r24 = −29.358 | d24 = 0.10 | | |
| r25 = −79.596 | d25 = 2.95 | n13 = 1.51825 | v13 = 64.1 |
| r26 = −42.007 | d26 = 0.10 | | |
| r27 = 456.979 | d27 = 6.14 | n14 = 1.48915 | v14 = 70.2 |
| r28 = −29.188 | d28 = 1.10 | n15 = 1.81264 | v15 = 25.4 |
| r29 = −63.575 | d29 = 0.10 | | |
| r30 = 62.907 | d30 = 3.66 | n16 = 1.62033 | v16 = 63.3 |
| r31 = −135.146 | d31 = 3.00 | | |
| r32 = −133.657 | d32 = 1.10 | n17 = 1.85649 | v17 = 32.3 |
| r33 = 64.757 | d33 = 0.10 | | |
| r34 = 38.411 | d34 = 6.01 | n18 = 1.81643 | v18 = 22.8 |
| r35 = −107.898 | d35 = 0.39 | | |
| r36 = −87.511 | d36 = 1.00 | n19 = 1.92859 | v19 = 36.0 |
| r37 = 66.523 | d37 = 33.60 | | |
| r38 = 60.550 | d38 = 5.65 | n20 = 1.62286 | v20 = 60.3 |
| r39 = −42.888 | d39 = 0.56 | | |
| r40 = −42.752 | d40 = 1.10 | n21 = 1.83932 | v21 = 37.2 |
| r41 = 47.194 | d41 = 6.41 | n22 = 1.48915 | v22 = 70.2 |
| r42 = −37.624 | d42 = 0.10 | | |
| r43 = 469.010 | d43 = 4.97 | n23 = 1.51825 | v23 = 64.1 |
| r44 = −30.778 | d44 = 1.10 | n24 = 1.88815 | v24 = 40.8 |
| r45 = −83.016 | d45 = 0.10 | | |
| r46 = 52.007 | d46 = 3.74 | n25 = 1.51976 | v25 = 52.4 |
| r47 = −241.226 | d47 = 4.50 | | |
| r48 = ∞ | d48 = 30.00 | n26 = 1.60718 | v26 = 38.0 |
| r49 = ∞ | d49 = 16.20 | n27 = 1.51825 | v27 = 64.2 |
| r50 = ∞ | | | |

*Aspheric Surface

Figure 48:
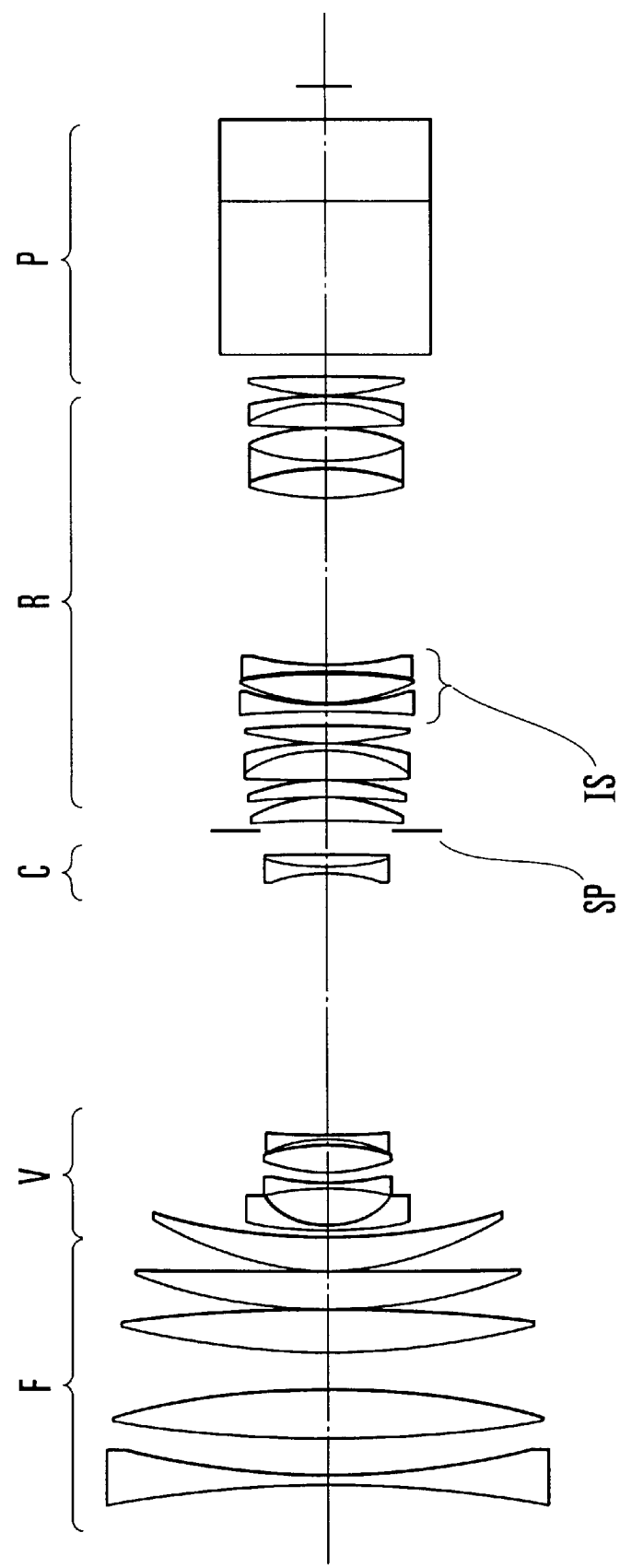
FIG. 48 is a sectional view showing the construction of a zoom lens at the wide-angle end according to a numerical example 5 of the invention.

FIG. 48 is a sectional view showing the construction of the image-stabilizing zoom lens at the wide-angle end according to the numerical example 5 of the invention. In FIG. 48, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 48.

The surfaces r32 to r37 represent an image-stabilizing lens subunit (IS), which has a negative refractive power. On the image side of the surface r37, there is provided a relatively large space, into which the focal-length changeover subunit (IE) can be inserted to shift the focal length of the entire zoom lens to the telephoto side or the wide-angle side.

Figure 49:
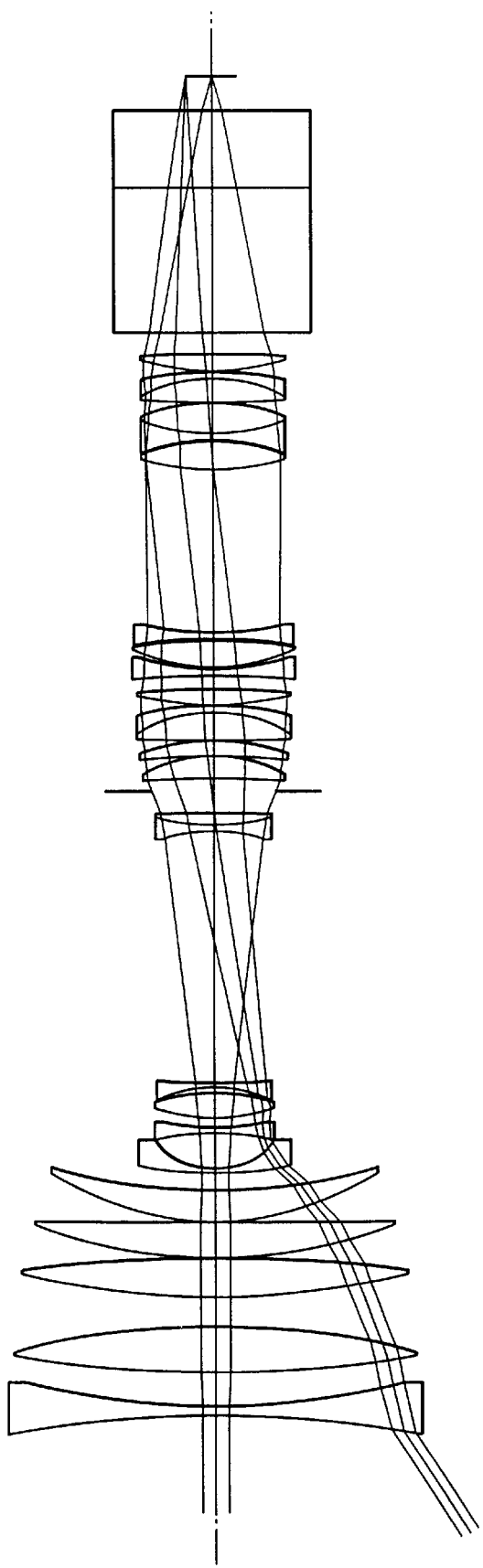
FIG. 49 is an optical path diagram for explaining the position of a fourth lens unit in the numerical example 5.

The fourth lens unit of the image-stabilizing zoom lens in the present embodiment is composed of the image-stabilizing lens subunit (IS) of negative refractive power and a plurality of lens elements, and is disposed as shown in FIG. 49.

The image-stabilizing lens subunit has a function of moving in directions approximately perpendicular to the optical axis so as to stabilize an image. The image-stabilizing lens subunit is composed of two negative lenses and one positive lens. When a converted inclination angle of incidence of a light flux on the image-stabilizing lens subunit is denoted by α2, a converted inclination angle of exit of a light flux from the image-stabilizing lens subunit denoted by α2', a mean value of Abbe numbers of the two negative lenses of the image-stabilizing lens subunit is denoted by vn2, and an Abbe number of the positive lens of the image-stabilizing lens subunit is denoted by vp2, the above-mentioned conditions (3) and (4) are satisfied as shown by the following values:

(α2'−α2)=−0.700

(vn2−vp2)=11.36

Further, the lens subunit disposed on the image side of the image-stabilizing lens subunit in the fourth lens unit is composed of four positive lenses and two negative lenses. A mean value of Abbe numbers of the four positive lenses is 61.8, and a mean value of Abbe numbers of the two negative lenses is 39.0. Thus, such effective achromatism is attained that the mean value of Abbe numbers of the positive lenses is larger than that of the negative lenses by more than 22.

Further, the various decentering aberration coefficients, factors, etc., corresponding to the above equations (c) to (h) and (l) are listed in Table-14 with the image-stabilizing lens subunit denoted by p, and the lens subunit disposed on the image side of the image-stabilizing lens subunit denoted by q.

TABLE 14

| | | | | | |
|---|---|---|---|---|---|
| $α_p'$ | 0.6825 | $L_p$ | 0.0205 | $L_q$ | −0.0865 | TE | 0.0014 |
| $α_p$ | −0.0171 | $T_p$ | 0.0013 | $T_q$ | −0.0140 | IIE | 0.0016 |
| $\bar{α}_p$ | −0.1299 | $I_p$ | −1.6522 | $I_q$ | 1.3256 | IIIE | 0.0156 |
| $\bar{α}_p'$ | −0.1865 | $II_p$ | 0.9089 | $II_q$ | −0.4749 | PE | −0.0807 |
| | | $III_p$ | 0.0001 | $III_q$ | −0.2296 | VE1 | 0.0031 |
| | | $P_p$ | −0.0633 | $P_q$ | 0.1771 | VE2 | −0.0182 |
| | | $V_p$ | −0.0216 | $V_q$ | −0.0018 | ΔE | 1.3991 |

By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

FIGS. 50A to 50C through FIGS. 52A to 52C are aberration diagrams showing the various longitudinal aberrations at the wide-angle end, at the focal length f of 51.0 mm and at the telephoto end, respectively, in the image-stabilizing zoom lens according to the numerical example 5.

FIGS. 53A to 53C through FIGS. 55A to 55C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 5.

FIGS. 56A to 56C through FIGS. 58A to 58C are aberration diagrams showing lateral aberrations, with the image height being ±4 mm and 0 mm, when the image-stabilizing lens subunit has shifted 1.0 mm at the wide-angle end, at the focal length f of 51.0 mm and at the telephoto end, respectively, in the image-stabilizing zoom lens according to the numerical example 5.

NUMERICAL EXAMPLE 6

Numerical data of the numerical example 6 of the image-stabilizing zoom lens are shown in Table-15.

TABLE 15

| f = 8.50 – 127.50 | Fno = 1:1.7 – 2.0 | 2ω = 65.8° – 4.9° | |
|---|---|---|---|
| r1 = −251.088 | d1 = 2.00 | n1 = 1.81265 | v1 = 25.4 |
| r2 = 157.249 | d2 = 7.22 | | |
| r3 = 234.983 | d3 = 10.06 | n2 = 1.43985 | v2 = 95.0 |
| r4 = −158.211 | d4 = 7.14 | | |
| r5 = 162.538 | d5 = 8.51 | n3 = 1.49845 | v3 = 81.5 |
| r6 = −316.010 | d6 = 0.20 | | |
| r7 = 108.347 | d7 = 7.30 | n4 = 1.62286 | v4 = 60.3 |
| r8 = 2254.334 | d8 = 0.20 | | |
| r9 = 61.427 | d9 = 6.65 | n5 = 1.62286 | v5 = 60.3 |
| r10 = 128.524 | d10 = Variable | | |
| r11 = 78.912* | d11 = 0.80 | n6 = 1.83945 | v6 = 42.7 |
| r12 = 15.768 | d12 = 7.79 | | |
| r13 = −41.835 | d13 = 0.80 | n7 = 1.77621 | v7 = 49.6 |
| r14 = 60.569 | d14 = 1.99 | | |
| r15 = 33.469 | d15 = 5.53 | n8 = 1.85501 | v8 = 23.9 |
| r16 = −41.646 | d16 = 1.17 | | |
| r17 = −28.573 | d17 = 0.80 | n9 = 1.77621 | v9 = 49.6 |
| r18 = 133.163* | d18 = Variable | | |
| r19 = −27.765 | d19 = 0.80 | n10 = 1.77621 | v10 = 49.6 |
| r20 = 41.769 | d20 = 2.81 | n11 = 1.85501 | v11 = 23.9 |
| r21 = −859.593 | d21 = Variable | | |
| r22 = Stop | d22 = 4.00 | | |
| r23 = −38.148 | d23 = 3.17 | n12 = 1.51976 | v12 = 52.4 |
| r24 = −25.086 | d24 = 0.10 | | |
| r25 = −158.911 | d25 = 3.70 | n13 = 1.51976 | v13 = 52.4 |
| r26 = −38.249 | d26 = 0.10 | | |
| r27 = 149.726 | d27 = 6.68 | n14 = 1.49845 | v14 = 81.5 |
| r28 = −30.878 | d28 = 1.10 | n15 = 1.81264 | v15 = 25.4 |
| r29 = −93.128 | d29 = 0.10 | | |
| r30 = 51.471 | d30 = 5.08 | n16 = 1.62033 | v16 = 63.3 |
| r31 = −83.953 | d31 = 3.00 | | |
| r32 = −114.184 | d32 = 1.10 | n17 = 1.77621 | v17 = 49.6 |
| r33 = 54.013 | d33 = 0.10 | | |
| r34 = 33.679 | d34 = 4.21 | n18 = 1.81643 | v18 = 22.8 |
| r35 = 101.957 | d35 = 1.94 | | |
| r36 = −262.800 | d36 = 1.00 | n19 = 1.77621 | v19 = 49.6 |
| r37 = 67.825 | d37 = 33.60 | | |
| r38 = 49.650 | d38 = 5.88 | n20 = 1.62033 | v20 = 63.3 |
| r39 = −48.118 | d39 = 0.14 | | |
| r40 = −49.206 | d40 = 1.10 | n21 = 1.83932 | v21 = 37.2 |
| r41 = 40.578 | d41 = 5.81 | n22 = 1.51825 | v22 = 64.1 |
| r42 = −54.230 | d42 = 0.10 | | |
| r43 = 152.889 | d43 = 5.35 | n23 = 1.51825 | v23 = 64.1 |
| r44 = −31.561 | d44 = 1.10 | n24 = 1.88815 | v24 = 40.8 |
| r45 = −85.801 | d45 = 0.10 | | |
| r46 = 60.984 | d46 = 3.43 | n25 = 1.51976 | v25 = 52.4 |
| r47 = −224.298 | d47 = 4.50 | | |
| r48 = ∞ | d48 = 30.00 | n26 = 1.60718 | v26 = 38.0 |
| r49 = ∞ | d49 = 16.20 | n27 = 1.51825 | v27 = 64.2 |
| r50 = ∞ | | | |

*Aspheric Surface

Figure 59:
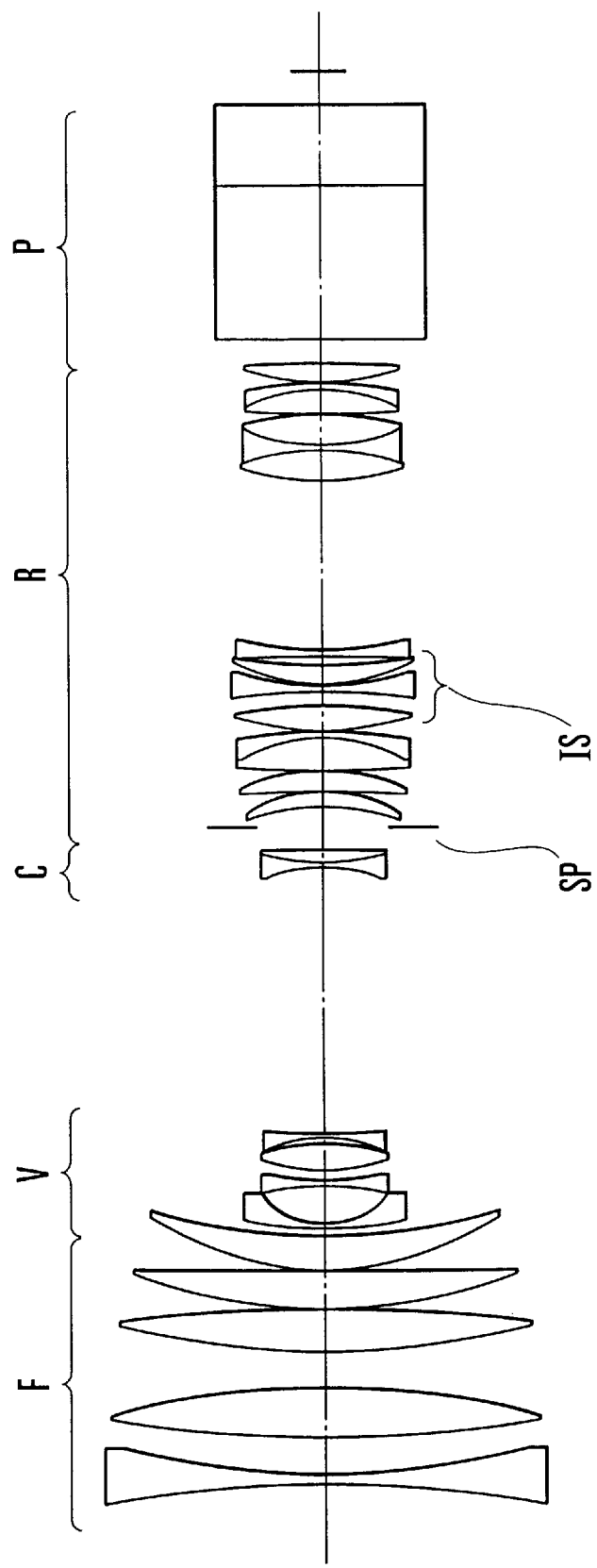
FIG. 59 is a sectional view showing the construction of a zoom lens at the wide-angle end according to a numerical example 6 of the invention.
Figure 60:
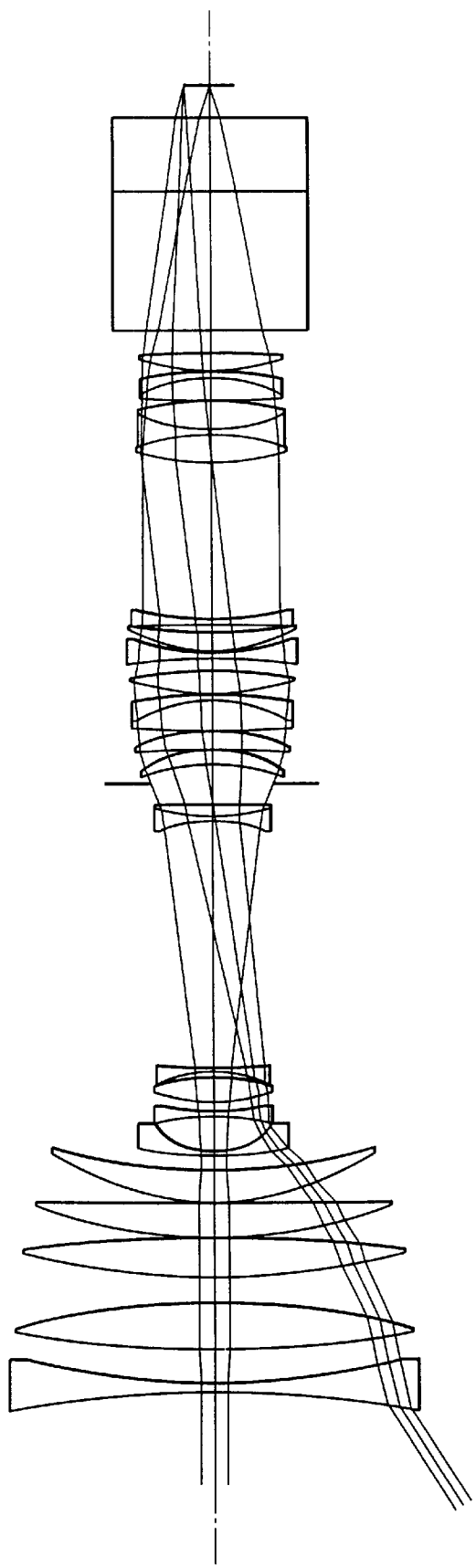
FIG. 60 is an optical path diagram for explaining the position of a fourth lens unit in the numerical example 6.
Figure 61A:
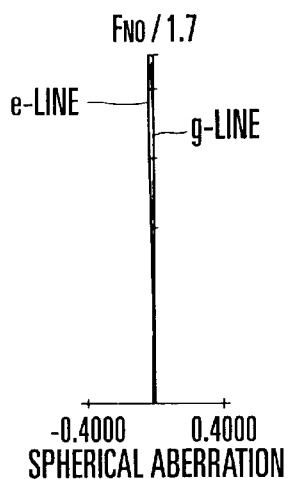
FIGS. 61A to 61C are aberration diagrams showing longitudinal aberrations at the wide-angle end in the zoom lens according to the numerical example 6.
Figure 61B:
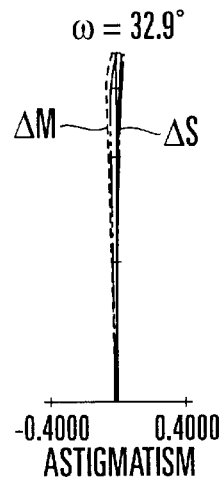
Figure 61C:
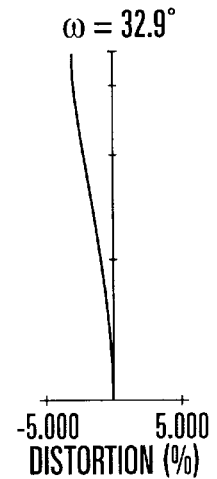
Figure 62A:
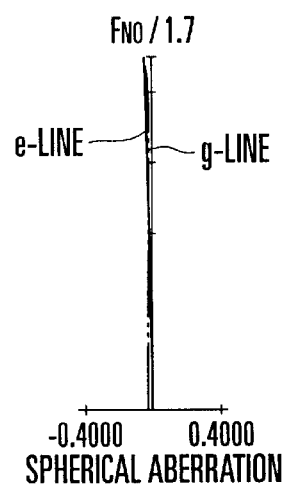
FIGS. 62A to 62C are aberration diagrams showing longitudinal aberrations at the middle focal length in the zoom lens according to the numerical example 6.
Figure 62B:
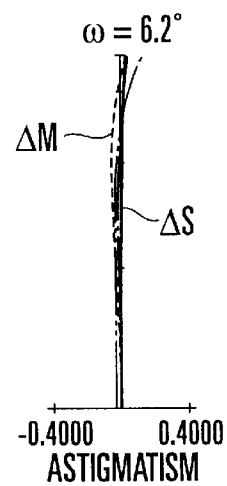
Figure 62C:
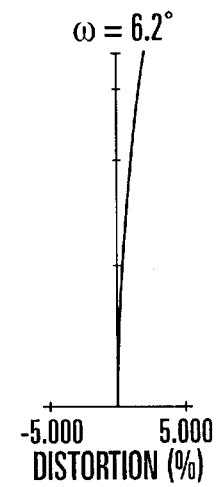
Figure 63A:
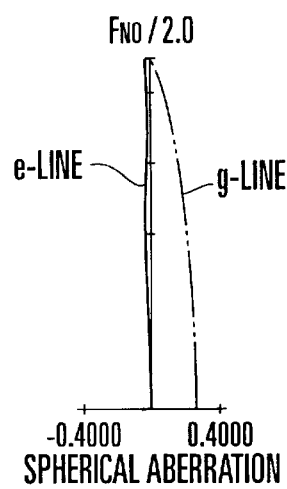
FIGS. 63A to 63C are aberration diagrams showing longitudinal aberrations at the telephoto end in the zoom lens according to the numerical example 6.
Figure 63B:
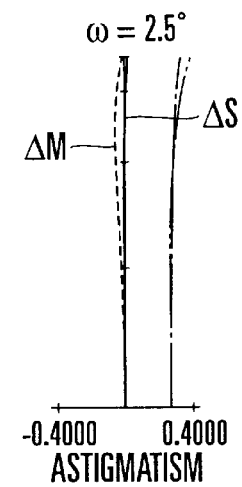
Figure 63C:
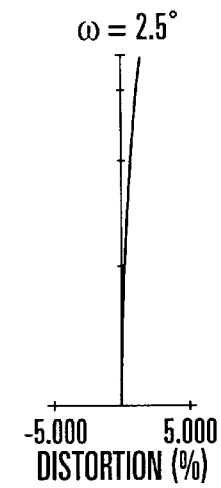

FIG. 59 is a sectional view showing the construction of the image-stabilizing zoom lens at the wide-angle end according to the numerical example 6 of the invention. In FIG. 59, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of negative refractive power, which is arranged to make a reciprocating motion along the optical axis so as to compensate for the shift of an image plane caused by the variation of magnification. The variator V and the compensator C constitute a magnification varying system.

Reference character SP denotes an aperture stop, and reference character R denotes a stationary relay lens unit, serving as a fourth lens unit, of positive refractive power as a whole. Reference character P denotes a color separation prism, an optical filter or the like, which is illustrated as a glass block in FIG. 59.

The surfaces r32 to r37 represent an image-stabilizing lens subunit (IS), which has a negative refractive power. On the image side of the surface r37, there is provided a relatively large space, into which the focal-length changeover subunit (IE) can be inserted to shift the focal length of the entire zoom lens to the telephoto side or the wide-angle side.

The fourth lens unit of the image-stabilizing zoom lens in the present embodiment is composed of the image-stabilizing lens subunit (IS) of negative refractive power and a plurality of lens elements, and is disposed as shown in FIG. 59. The image-stabilizing lens subunit has a function of moving in directions approximately perpendicular to the optical axis so as to stabilize an image. The image-stabilizing lens subunit is composed of two negative lenses and one positive lens. When a converted inclination angle of incidence of a light flux on the image-stabilizing lens subunit is denoted by α2, a converted inclination angle of exit of a light flux from the image-stabilizing lens subunit denoted by α2', a mean value of Abbe numbers of the two negative lenses of the image-stabilizing lens subunit is denoted by vn2, and an Abbe number of the positive lens of the image-stabilizing lens subunit is denoted by vp2, the above-mentioned conditions (3) and (4) are satisfied as shown by the following values:

(α2'−α2)=−0.900

(vn2−vp2)=26.8

Further, the lens subunit disposed on the image side of the image-stabilizing lens subunit in the fourth lens unit is composed of four positive lenses and two negative lenses. A mean value of Abbe numbers of the four positive lenses is 61.1, and a mean value of Abbe numbers of the two negative lenses is 39.0. Thus, such effective achromatism is attained that the mean value of Abbe numbers of the positive lenses is larger than that of the negative lenses by more than 22.

Further, the various decentering aberration coefficients, factors, etc., corresponding to the above equations (c) to (h) and (l) are listed in Table-16 with the image-stabilizing lens subunit denoted by p, and the lens subunit disposed on the image side of the image-stabilizing lens subunit denoted by q.

TABLE 16

| | | | | | | |
|---|---|---|---|---|---|---|
| $\alpha_p'$ | 0.8744 | $L_p$ | 0.0351 | $L_q$ | −0.0875 | TE | 0.0011 |
| $\alpha_p$ | 0.0256 | $T_p$ | 0.0015 | $T_q$ | −0.0144 | IIE | −0.0175 |
| $\overline{\alpha}_p$ | −0.1102 | $I_p$ | −3.7578 | $I_q$ | −1.6158 | IIIE | 0.0024 |
| $\overline{\alpha}_p'$ | −0.1854 | $II_p$ | 1.3076 | $II_q$ | −0.9258 | PE | −0.0753 |
| | | $III_p$ | 0.0408 | $III_q$ | −0.2797 | VE1 | −0.0012 |
| | | $P_p$ | −0.0942 | $P_q$ | 0.1752 | VE2 | −0.0236 |
| | | $V_p$ | −0.0250 | $V_q$ | −0.0028 | ΔE | 1.7999 |

By appropriately setting the converted inclination angles of incidence and exit on and from the image-stabilizing lens subunit, and the shared values of aberration coefficients of the image-stabilizing lens subunit and the lens subunit disposed on the image side of the image-stabilizing lens subunit, it is possible to make the decentering aberration coefficients of the image-stabilizing lens subunit very small.

FIGS. 61A to 61C through FIGS. 63A to 63C are aberration diagrams showing the various longitudinal aberrations at the wide-angle end, at the focal length f of 51.0 mm and at the telephoto end, respectively, in the image-stabilizing zoom lens according to the numerical example 6.

FIGS. 64A to 64C through FIGS. 66A to 66C are aberration diagrams showing lateral aberrations, with the image height being ±4 mm and 0 mm, at the wide-angle end, at the focal length f of 51.0 mm and at the telephoto end, respectively, in the image-stabilizing zoom lens according to the numerical example 6.

FIGS. 67A to 67C through FIGS. 69A to 69C are aberration diagrams showing lateral aberrations, with the image height being ±4 mm and 0 mm, when the image-stabilizing lens subunit has shifted 1.0 mm at the wide-angle end, at the focal length f of 51.0 mm and at the telephoto end, respectively, in the image-stabilizing zoom lens according to the numerical example 6.

Next, a photographing apparatus (television camera system) using, as a photographing optical system, the zoom lens according to any one of the numerical examples 1 to 6 will be described, as another embodiment of the invention, with reference to FIG. 70.

Figure 70:
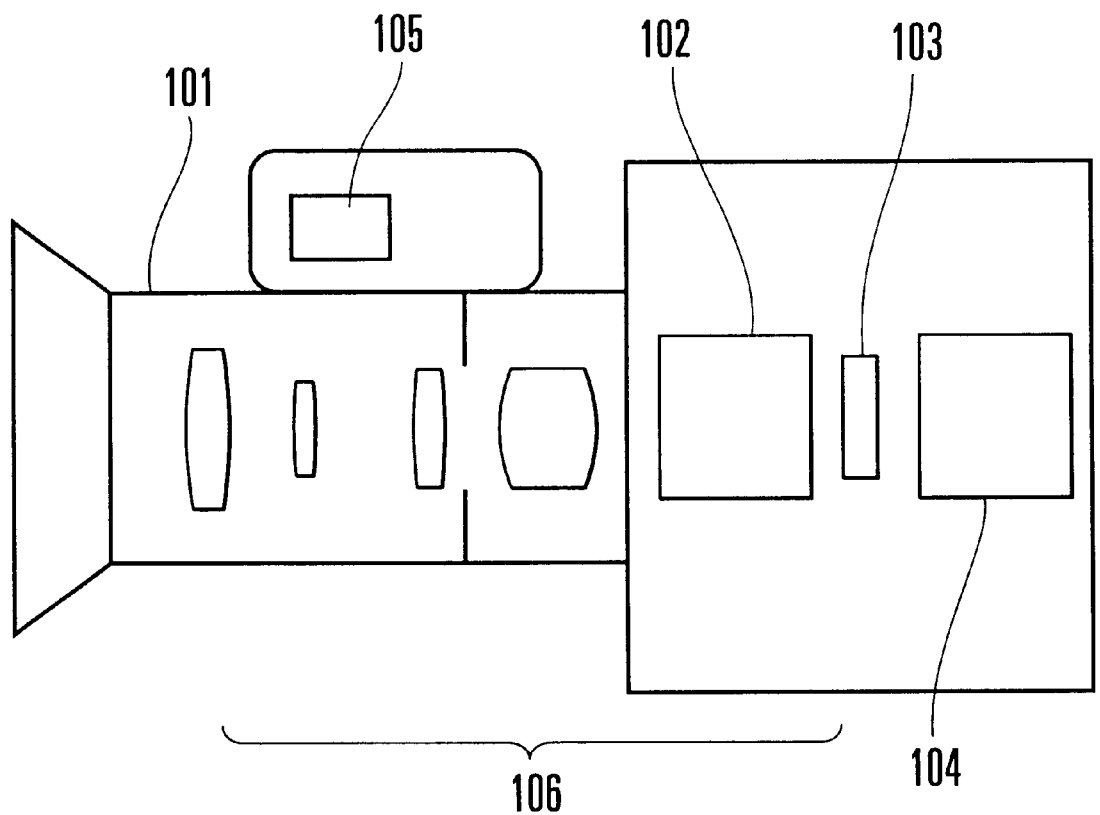
FIG. 70 is a schematic diagram showing a photographing apparatus using the zoom lens according to the invention.

In FIG. 70, reference numeral 106 denotes a photographing apparatus body including a lens, reference numeral 101 denotes a photographing optical system composed of the zoom lens according to any one of the numerical examples 1 to 6, reference numeral 102 denotes a glass block corresponding to a filter or color separation prism, reference numeral 103 denotes an image sensor, such as a CCD, for receiving light of an object image formed by the photographing optical system 101, reference numerals 104 and 105 denote CPUs for controlling the photographing apparatus and the lens.

With the zoom lens according to any one of the numerical examples 1 to 6 used for the photographing apparatus, such as a television camera, it is possible to attain a photographing apparatus having good optical performance even during an image stabilizing operation.

As has been described, according to the invention, in the so-called four-unit zoom lens, the refractive power arrangement of the entire lens system, the arrangement of the magnification varying lens units and the arrangement of the fourth lens unit are appropriately set. Accordingly, it is possible to attain an image-stabilizing zoom lens having high optical performance over the entire range of variable magnification even during an image stabilizing operation with the whole mechanism thereof reduced in size and weight.

What is claimed is:

1. A zoom lens comprising, in order from an object side to an image side:

a first lens unit of positive refractive power;

a second lens unit of negative refractive power arranged to move during variation of magnification;

a third lens unit of negative refractive power arranged to compensate for shift of an image plane due to the variation of magnification; and a fourth lens unit of positive refractive power, wherein said fourth lens unit has a focal-length changeover subunit arranged to be insertable onto and detachable from an optical axis of said zoom lens and provided for changing the focal length of said zoom lens, and an image-stabilizing lens subunit disposed on the object side of said focal-length changeover subunit, and said image-stabilizing lens subunit is movable in such a way as to have a component perpendicular to the optical axis so as to displace an image.

2. A zoom lens according to claim 1, wherein said image-stabilizing lens subunit has a positive refractive power.

3. A zoom lens according to claim 2, wherein said image-stabilizing lens subunit has at least one positive lens and at least one negative lens.

4. A zoom lens according to claim 3, wherein said image-stabilizing lens subunit is disposed within a diverging light flux exiting from said third lens unit, and the following condition is satisfied:

$$0.45 < (\alpha' - \alpha)$$

where α is a converted inclination angle of incidence of a ray entering said fourth lens unit, and α' is a converted inclination angle of exit of a ray exiting from said image-stabilizing lens subunit.

5. A zoom lens according to claim 4, wherein the following condition is satisfied:

$$30 < (\nu p - \nu n)$$

where νp is, when said image-stabilizing lens subunit includes only one positive lens, an Abbe number of the positive lens included in said image-stabilizing lens subunit or, when said image-stabilizing lens subunit includes a plurality of positive lenses, a mean value of Abbe numbers of all the positive lenses included in said image-stabilizing lens subunit, and νn is, when said image-stabilizing lens subunit includes only one negative lens, an Abbe number of the negative lens included in said image-stabilizing lens subunit or, when said image-stabilizing lens subunit includes a plurality of negative lenses, a mean value of Abbe numbers of all the negative lenses included in said image-stabilizing lens subunit.

6. A zoom lens according to claim 1, wherein said image-stabilizing lens subunit has a negative refractive power.

7. A zoom lens according to claim 6, wherein said image-stabilizing lens subunit has at least one negative lens and at least one positive lens.

8. A zoom lens according to claim 7, wherein the following condition is satisfied:

$$-0.45 > (\alpha 2' - \alpha 2)$$

where α2 is a converted inclination angle of incidence of a ray entering said image-stabilizing lens subunit, and α2' is a converted inclination angle of exit of a ray exiting from said image-stabilizing lens subunit.

9. A zoom lens according to claim 8, wherein the following condition is satisfied:

$$10 < (vn2 - vp2)$$

where vn2 is, when said image-stabilizing lens subunit includes only one negative lens, an Abbe number of the negative lens included in said image-stabilizing lens subunit or, when said image-stabilizing lens subunit includes a plurality of negative lenses, a mean value of Abbe numbers of all the negative lenses included in said image-stabilizing lens subunit, and vp2 is, when said image-stabilizing lens subunit includes only one positive lens, an Abbe number of the positive lens included in said image-stabilizing lens subunit or, when said image-stabilizing lens subunit includes a plurality of positive lenses, a mean value of Abbe numbers of all the positive lenses included in said image-stabilizing lens subunit.

10. A zoom lens according to claim 1, wherein a lens subunit disposed on the image side of said image-stabilizing lens subunit in said fourth lens unit includes a plurality of positive lenses and at least one negative lens.

11. A zoom lens according to claim 10, wherein the following condition is satisfied:

$$10 < (vp(4R) - vn(4R))$$

where vp(4R) is a mean value of Abbe numbers of all the positive lenses included in said lens subunit disposed on the image side of said image-stabilizing lens subunit in said fourth lens unit, and vn(4R) is, when said lens subunit disposed on the image side of said image-stabilizing lens subunit in said fourth lens unit includes only one negative lens, an Abbe number of the negative lens included in said lens subunit disposed on the image side of said image-stabilizing lens subunit in said fourth lens unit or, when said lens subunit disposed on the image side of said image-stabilizing lens subunit in said fourth lens unit includes a plurality of negative lenses, a mean value of Abbe numbers of all the negative lenses included in said lens subunit disposed on the image side of said image-stabilizing lens subunit in said fourth lens unit.

12. A zoom lens according to claim 1, further comprising an aperture stop disposed in a space close to said image-stabilizing lens subunit on the object side or the image side thereof.

13. A zoom lens according to claim 1, wherein said third lens unit includes at least one positive lens and at least one negative lens.

14. A photographing apparatus, comprising:
a zoom lens according to claim 1; and
a casing arranged to hold said zoom lens.

15. A zoom lens comprising, in order from an object side to an image side:
a first lens unit of positive refractive power;
a second lens unit of negative refractive power arranged to move during variation of magnification;
a third lens unit of negative refractive power arranged to compensate for shift of an image plane due to the variation of magnification; and
a fourth lens unit of positive refractive power,
wherein said fourth lens unit has an image-stabilizing lens subunit of positive refractive power including at least one positive lens and at least one negative lens and disposed within a diverging light flux exiting from said third lens unit, said image-stabilizing lens subunit being movable in such a way as to have a component perpendicular to an optical axis of said zoom lens so as to displace an image, and
the following condition is satisfied:

$$0.45 < (\alpha' - \alpha)$$

where $\alpha$ is a converted inclination angle of incidence of a ray entering said fourth lens unit, and $\alpha'$ is a converted inclination angle of exit of a ray exiting from said image-stabilizing lens subunit.

16. A photographing apparatus, comprising:
a zoom lens according to claim 15; and
a casing arranged to hold said zoom lens.

17. A zoom lens comprising, in order from an object side to an image side:
a first lens unit of positive refractive power;
a second lens unit of negative refractive power arranged to move during variation of magnification;
a third lens unit of negative refractive power arranged to compensate for shift of an image plane due to the variation of magnification; and
a fourth lens unit of positive refractive power,
wherein said fourth lens unit has an image-stabilizing lens subunit of negative refractive power, and
said image-stabilizing lens subunit is movable in such a way as to have a component perpendicular to an optical axis of said zoom lens so as to displace an image.

18. A zoom lens according to claim 17, wherein said image-stabilizing lens subunit includes at least one negative lens and at least one positive lens, and the following condition is satisfied:

$$-0.45 > (\alpha 2' - \alpha 2)$$

where $\alpha 2$ is a converted inclination angle of incidence of a ray entering said image-stabilizing lens subunit, and $\alpha 2'$ is a converted inclination angle of exit of a ray exiting from said image-stabilizing lens subunit.

19. A photographing apparatus, comprising:
a zoom lens according to claim 17; and
a casing arranged to hold said zoom lens.

* * * * *

UNITED STATES PATENT AND TRADEMARK OFFICE
CERTIFICATE OF CORRECTION

PATENT NO. : 6,560,016 B2
DATED : May 6, 2003
INVENTOR(S) : Fumiaki Usui et al.

It is certified that error appears in the above-identified patent and that said Letters Patent is hereby corrected as shown below:

Column 11,
Line 40, please delete "$\acute{α}_p$" and insert therefore -- $\ddot{\bar{α}}_p$ --

Column 30,
Table 14, line 51, should read -- $α_p$ 0.6825 $L_p$ 0.0205 $L_q$ -0.0865 TE 0.0014 --
Table 14, line 52, should read -- $\acute{α}_p$ -0.0171 $T_p$ 0.0013 $T_q$ -0.0140 IIE 0.0016 --

Column 33,
Table 16, line 3, should read -- $α_p$ 0.8744 $L_p$ 0.0351 $L_q$ -0.0875 TE 0.0011 --
Table 16, line 4, should read -- $\acute{α}_p$ -0.0256 $T_p$ 0.0015 $T_q$ -0.0144 IIE 0.0175 --

Signed and Sealed this

Thirteenth Day of January, 2004

JON W. DUDAS
*Acting Director of the United States Patent and Trademark Office*